United States Patent
Ko et al.

(10) Patent No.: US 9,385,823 B2
(45) Date of Patent: Jul. 5, 2016

(54) BROADCAST-SIGNAL TRANSMITTER/RECEIVER AND METHOD FOR TRANSMITTING/RECEIVING BROADCAST SIGNALS

(71) Applicant: LG Electronics Inc., Seoul (KR)

(72) Inventors: Woosuk Ko, Seoul (KR); Sangchul Moon, Seoul (KR); Seoyoung Back, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/542,007

(22) Filed: Nov. 14, 2014

(65) Prior Publication Data

US 2015/0078473 A1 Mar. 19, 2015

Related U.S. Application Data

(63) Continuation-in-part of application No. 13/885,971, filed as application No. PCT/KR2011/008288 on Nov. 2, 2011.

(60) Provisional application No. 61/420,331, filed on Dec. 7, 2010, provisional application No. 61/414,437, filed on Nov. 17, 2010.

(51) Int. Cl.
*H04L 27/00* (2006.01)
*H03K 9/00* (2006.01)
*H04B 1/00* (2006.01)
*H04H 20/71* (2008.01)
(Continued)

(52) U.S. Cl.
CPC ............... *H04H 20/71* (2013.01); *H04H 20/57* (2013.01); *H04L 1/007* (2013.01); *H04L 1/0042* (2013.01); *H04L 1/0048* (2013.01); *H04L 1/0065* (2013.01); *H04L 1/0071* (2013.01); *H04L 2001/0093* (2013.01)

(58) Field of Classification Search
USPC ............ 375/211, 219, 220, 221, 222, 240.26, 375/295, 299, 301, 316, 324, 325, 338, 346, 375/348, 347, 349, 350, 354
See application file for complete search history.

(56) References Cited

U.S. PATENT DOCUMENTS

2008/0002566 A1* 1/2008 Zhang ................. H04L 27/2613
370/208
2009/0213853 A1 8/2009 Kwon et al.
(Continued)

FOREIGN PATENT DOCUMENTS

WO 2009/028911 3/2009
WO 2009/028912 3/2009

*Primary Examiner* — Linda Wong
(74) *Attorney, Agent, or Firm* — Dentons US LLP

(57) ABSTRACT

As an aspect of the present invention, an embodiment of the invention provides a method of transmitting broadcast data, the method comprising: encoding transmission units for forward error correction, wherein the transmission units carry the broadcast data which carry a service or service component; mapping the encoded transmission units on constellations; MIMO encoding the mapped transmission units; time-interleaving the MIMO encoded transmission units; building signal frames including the time-interleaved transmission units; modulating the signal frames by Orthogonal Frequency Division Multiplexing, OFDM scheme; and transmitting the modulated signal frames, wherein the transmitted signal frames include preambles, the preambles having physical signaling data for the transmission units.

8 Claims, 59 Drawing Sheets

(51) Int. Cl.
*H04L 1/00* (2006.01)
*H04H 20/57* (2008.01)

(56) References Cited

U.S. PATENT DOCUMENTS

| | | | | |
|---|---|---|---|---|
| 2009/0225822 A1* | 9/2009 | Tupala | ............... | H04L 27/2659 375/226 |
| 2010/0310017 A1* | 12/2010 | Atungsiri | ............. | H04L 1/0668 375/340 |
| 2011/0013718 A1* | 1/2011 | Ko | ....................... | H04L 1/0045 375/295 |
| 2011/0110318 A1* | 5/2011 | Park | ...................... | H04H 20/28 370/329 |
| 2011/0131464 A1* | 6/2011 | Ko | ....................... | H04L 1/0041 714/752 |
| 2011/0305300 A1 | 12/2011 | Ko | | |
| 2013/0343468 A1* | 12/2013 | Ko | ....................... | H04H 20/42 375/240.25 |
| 2015/0043666 A1* | 2/2015 | Hwang et al. | ................. | 375/260 |

\* cited by examiner

FIG. 53

| Syntax | No. of bit s |
|---|---|
| Fast Acquisition Channel() { | |
| Num_Service | 8 |
| for ( i=0; i< Num_service ; i++){ | |
|    Service_id | 8 |
|    Section_DP_ID | 8 |
|    Num_Component | 8 |
|    reserved | 8 |
|    for (i=0; i< Num_component ; i++) { | |
|      Component_type | 8 |
|      DP_ID | 8 |
|      reserved | 8 |
|    } | |
| } | |
| CRC_32 | 32 |
| } | |

(a)

| Component Type | Note |
|---|---|
| 0x00 | Service |
| 0x01 | Video |
| 0x02 | Audio |
| 0x03 | Section |
| 0x04 | NRT |
| others | reserved |

| Profile | Service | Service ID | Section | Component type | DP ID |
|---|---|---|---|---|---|
| Advanced | UHD | 0x01 | DP 1 | AV | DP 1 |
|  |  |  | DP 2 | V | DP 2 |
|  |  |  |  | A | DP 3 |
| Hand-held | HD | 0x02 | DP 1 | AV | DP 1 |
|  | SD | 0x03 |  | V | DP 2 |
|  | HD | 0x04 | DP 2 | A | DP 3 |
| Base | HD | 0x04 | DP1 | AV | DP 1 |
|  | NRT | 0x05 | DP2 | NRT | DP 2 |

BROADCAST-SIGNAL TRANSMITTER/RECEIVER AND METHOD FOR TRANSMITTING/RECEIVING BROADCAST SIGNALS

This application is the continuation-in-part application of U.S. patent application Ser. No. 13/885,971 filed on May 16, 2013, which is the National Phase of PCT International Application No. PCT/KR2011/008288, which claims the priorities of U.S. Provisional Application 61/414,437, filed on Nov. 17, 2010 and U.S. Provisional Application 61/420,331, filed on Dec. 7, 2010, which are hereby incorporated by reference as if fully set forth herein.

FIELD OF THE INVENTION

The present invention relates to a method for transceiving broadcast signals and an apparatus for transceiving broadcast signals, and more particularly, to a method for transceiving broadcast signals, which can enhance data transmission efficiency and is compatible with conventional methods for transceiving broadcast signals, and a transceiving apparatus thereof.

BACKGROUND ART

A broadband wireless communication system is based on an orthogonal frequency division multiplexing (OFDM) scheme and an orthogonal frequency division multiple access (OFDMA) scheme, and transmits a physical channel signal using a plurality of subcarriers so as to implement high-speed data transmission.

Downlink data types transmitted from a base station (BS) to a mobile station (MS) can be largely classified into a multicasting/broadcasting data type and a unicast type. The multicasting/broadcasting data type can be used for the BS to transmit system information, configuration information, software update information, etc. to one or more groups including unspecific/specific MSs. The unicast data type may be used for the BS to transmit requested information to a specific MS, or may also be used to transmit a message including information (for example, configuration information) to be transferred only to a specific MS.

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

DETAILED DESCRIPTION OF THE INVENTION

Technical Problem

A technical object of one embodiment of the present invention is to provide a method and apparatus for transceiving broadcast signals, which can enhance data transmission efficiency in a digital broadcast system.

A further technical object of the present invention is to provide a method and apparatus for transceiving broadcast signals, which can maintain compatibility with a conventional broadcast system in addition to achieving the above described objects.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data.

Still another object of the present invention is to provide an apparatus for transmitting broadcast signals, an apparatus for receiving broadcast signals and methods for transmitting and receiving broadcast signals to signal signaling information necessary to provide broadcast signals.

Technical Solution

As an aspect of the present invention, an embodiment of the invention provides a method of transmitting broadcast data, the method comprising: encoding transmission units for forward error correction, wherein the transmission units carry the broadcast data which carry a service or service component; mapping the encoded transmission units on constellations; MIMO encoding the mapped transmission units; time-interleaving the MIMO encoded transmission units; building signal frames including the time-interleaved transmission units; modulating the signal frames by Orthogonal Frequency Division Multiplexing, OFDM scheme; and transmitting the modulated signal frames, wherein the transmitted signal frames include preambles, the preambles having physical signaling data for the transmission units. The preambles include a normal preamble part or robust preamble part, wherein the normal preamble part and the robust preamble part are used for different reception modes, respectively. The robust preamble part is used for mobile reception. The physical signaling data includes information indicating whether or not channel information data for fast service acquisition is in a corresponding signal frame, and the channel information data includes binding information between the service and the transmission units, and the channel information data is located after the physical signaling data. The signal frames are included in a superframe, and wherein the superframe includes a signal frame for fixed reception and a signal frame for mobile reception.

Effects of the Invention

As is apparent from the above description, in a digital broadcast system, it is possible to enhance data transmission efficiency and increase robustness in terms of transmission and reception of broadcast signals, by virtue of provision of a MIMO system.

Further, according to the present invention, in a digital broadcast system, it is possible to decode MIMO receiving signals efficiently using MIMO processing of the present invention even under a diverse broadcast environment.

In addition, according to the present invention, a broadcast system using MIMO of the present invention can achieve the above described advantages while maintaining compatibility with a conventional broadcast system not using MIMO.

Further, according to the present invention, it is possible to provide a method and apparatus for transceiving broadcast signals, which can receive digital broadcast signals without error even under an indoor environment or using mobile reception equipment.

The present invention can process data according to service characteristics to control QoS for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

FIG. 53 illustrates field information included in a FAC transmitted by a broadcast signal transmitter according to one embodiment of the present invention.

FIG. 56 shows an exemplary table of FAC field information in a case in which a broadcast signal transmitter according to one embodiment transmits signal frame having the signal frame structure described above over an RF channel.

BEST MODE FOR CARRYING OUT THE INVENTION

Figure 1:
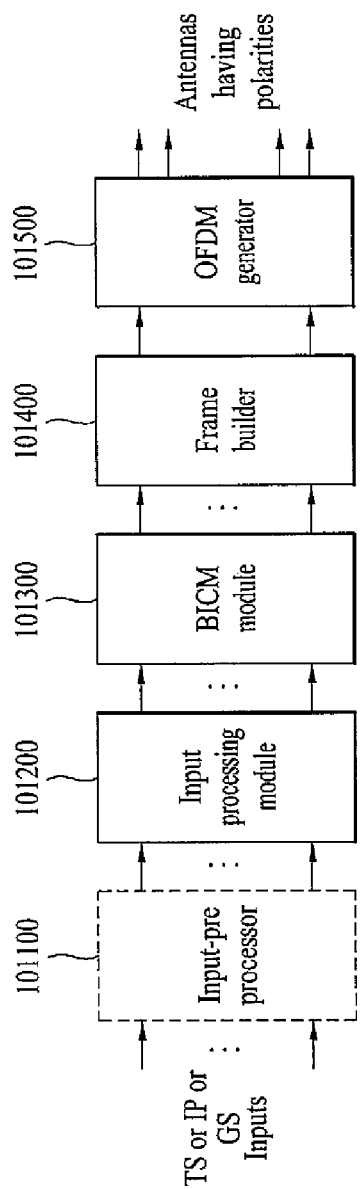
FIG. 1 shows a broadcast signal transmitter using MIMO according to an embodiment of the present invention.

Hereinafter, although the preferred embodiments of the present invention will be described in detail with reference to the accompanying drawings and contents as described with relation to the accompanying drawings, it is to be understood that the present invention is not limited to the embodiments.

Various technologies have been introduced to increase transmission efficiency and to perform robust communication in a digital broadcast system. One of such technologies is a method of using a plurality of antennas at a transmitting side or a receiving side. This method may be classified into a Single-Input Single-Output (SISO) scheme in which transmission is performed through a single antenna and reception is performed through a single antenna, a Single-Input Multi-Output (SIMO) scheme in which transmission is performed through a single antenna and reception is performed through multiple antennas, a Multi-Input Single-Output (MISO) scheme in which transmission is performed through multiple antennas and reception is performed through a single antenna, and a Multi-Input Multi-Output (MIMO) scheme in which transmission is performed through multiple antennas and reception is performed through multiple antennas. Although the multiple antennas may be exemplified by 2 antennas for ease of explanation in the following description, the description of the present invention may be applied to systems that use 2 or more antennas.

The SISO scheme corresponds to a general broadcast system that uses 1 transmission antenna and 1 reception antenna.

The SIMO scheme corresponds to a broadcast system that uses 1 transmission antenna and a plurality of reception antennas.

The MISO scheme corresponds to a broadcast system that uses a plurality of transmission antennas and 1 reception antenna to provide transmit diversity. An example of the MISO scheme is an Alamouti scheme. In the MISO scheme, it is possible to receive data through 1 antenna without performance loss. Although a reception system can receive the same data through a plurality of reception antennas in order to improve performance, this case will be described as belonging to MISO cases in this specification.

A MIMO scheme corresponds to a broadcast system that uses a plurality of transmit (Tx) antennas and a plurality of receive (Rx) antennas to provide transmission/reception (Tx/Rx) diversity and high transmission efficiency. In the MIMO scheme, signals are processed in different ways in time and space dimensions and a plurality of data streams is transmitted through parallel paths that simultaneously operate in the same frequency band to achieve diversity effects and high transmission efficiency.

The performance of a system that employs the MIMO technology depends on characteristics of a transmission channel. The efficiency of such a system is high, especially, when the system has independent channel environments. That is, the performance of the system that employs the MIMO technology may improve when channels of all antennas ranging from antennas of the transmitting side and antennas of the receiving side are independent channels that have no correlation to each other. However, in a channel environment in which the correlations between channels of transmission and reception antennas are very high as in a line-of-sight (LOS) environment, the performance of the system that employs the MIMO technology may be significantly reduced or the system may not be able to operate.

In addition, if the MIMO scheme is applied to a broadcast system that uses the SISO and MISO schemes, it is possible to increase data transmission efficiency. However, in addition to the above problems, there is a need to maintain compatibility to allow a receiver having a single antenna to receive services. Accordingly, the present invention suggests a method for solving such existing problems.

In addition, the present invention can provide a broadcast signal transmitter/receiver and a broadcast transmission and reception method for a conventional terrestrial broadcast system and a system that can transmit and receive additional broadcast signals (or enhanced broadcast signals), for example, mobile broadcast signals, while sharing an RF frequency band with a terrestrial broadcast system such as DVB-T2.

To accomplish this, in the present invention, it is possible to use a video coding method having scalability in which a basic video component which has low image quality although it is robust to a communication environment and an extended video component which is slightly weak to a communication environment although it can provide a high-quality image can be distinguishably transmitted. Although the present invention will be described with reference to SVC as a video coding method having scalability, the present invention may be applied to any other video coding methods. Embodiment of the present invention will be described in more detail with reference to the drawings.

A broadcast signal transmitter and receiver of the present invention can perform MISO processing and MIMO processing on a plurality of signals that are transmitted and received through a plurality of antennas. The following is a description of a broadcast signal transmitter and receiver that performs signal processing on 2 signals that are transmitted and received through 2 antennas.

FIG. 1 shows a broadcast signal transmitter using MIMO according to an embodiment of the present invention.

As shown in FIG. 1, the broadcast signal transmitter according to the present invention may include an input processor 101100, an input processing module 101200, a Bit Interleaved Coded Modulation (BICM) encoder 101300, a frame builder 101400, and an Orthogonal Frequency-Division Multiplexing (OFDM) generator (or transmitter) 101500. The broadcast signal transmitter according to the present invention may receive a plurality of MPEG-TS streams or a General Stream Encapsulation (GSE) stream (or GS stream).

The input processor 101100 may generate a plurality of PLPs (physical layer pipes) on a service basis in order to give robustness to a plurality of input streams, i.e., a plurality of MPEG-TS streams or GSE streams.

PLPs are data units that are identified in the physical layer. Specifically, a PLP is data having the same physical layer attribute which is processed in the transmission path and may be mapped on a cell by cell basis in a frame. In addition, a PLP may be considered a physical layer Time Division Multiplexing (TDM) channel that carries one or a plurality of services. Specifically, a path through which such a service is transmitted is transmitted or a stream identifiable in the physical layer which is transmitted through the path is referred to as a PLP.

Thereafter, the input processing module 101200 may generate a Base Band (BB) frame including a plurality of generated PLPs. The BICM module 101300 may add redundancy to the BB frame to correct an error in a transmission channel and may interleave PLP data included in the BB frame.

The frame builder 101400 may accomplish a transmission frame structure by mapping the plurality of PLPs to a transmission frame and adding signaling information thereto. The OFDM generator 101500 may demodulate input data from the frame builder according to OFDM to divide the input data into a plurality of paths such that the input data is transmitted through a plurality of antennas.

Figure 2:
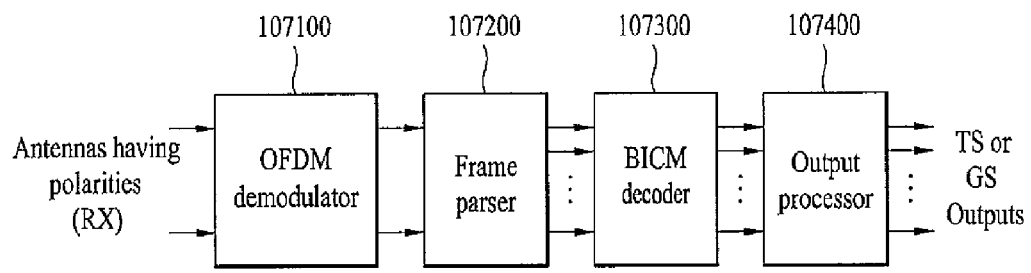
FIG. 2 shows a broadcast signal receiver according to an embodiment of the present invention.

FIG. 2 shows a broadcast signal receiver according to an embodiment of the present invention.

As shown in FIG. 2, the broadcast signal receiver may include an OFDM demodulator 107100, a frame parser 107200, a BICM decoder 107300, and an output processor 107400. The OFDM demodulator 107100 may convert signals received through a plurality of receive antennas into signals in the frequency domain. The frame parser 107200 may output PLPs for a necessary service from among the converted signals. The BICM decoder 107300 may correct an error generated according to a transmission channel. The output processor 107400 may perform procedures necessary to generate output TSs or GSs. Here, dual polarity signals may be input as input antenna signals and one or more streams may be output as the TXs or GSs.

Figure 3:
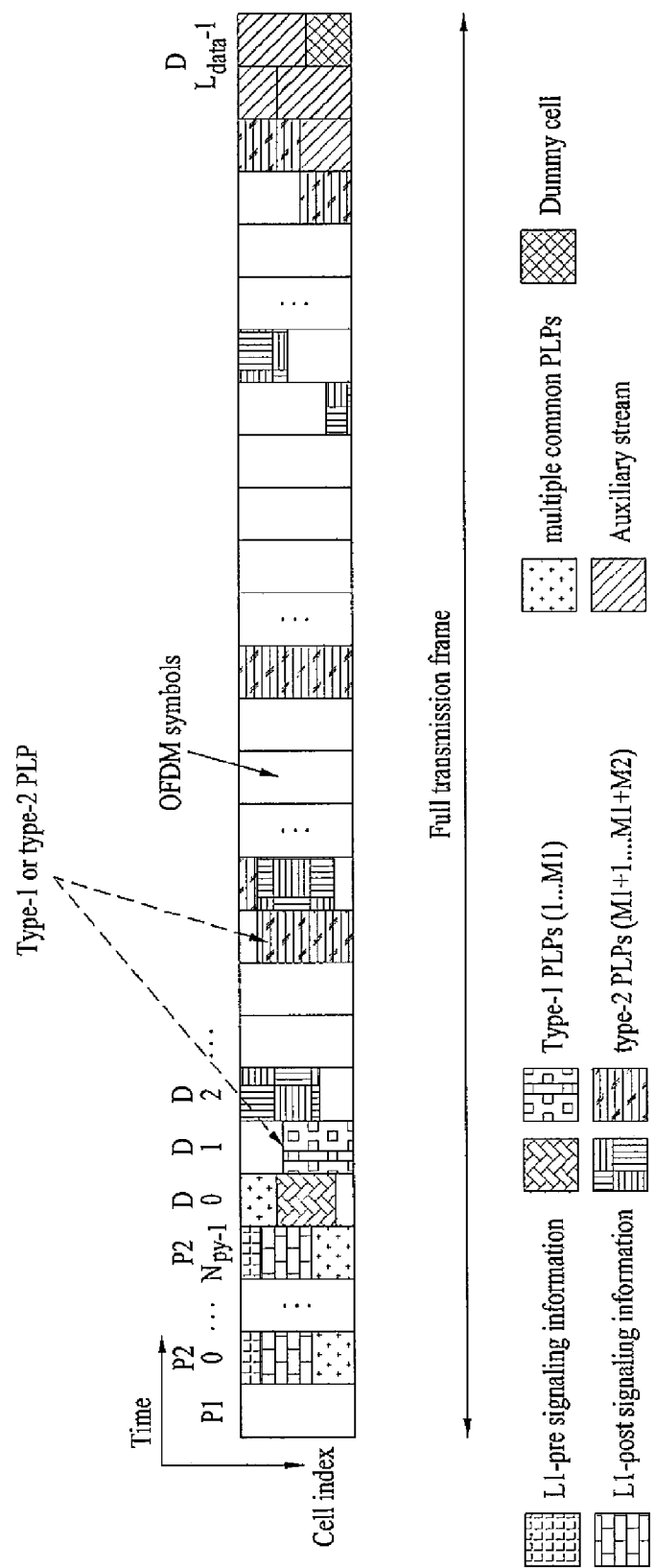
FIG. 3 shows an additional frame structure based on PLP according to an embodiment of the present invention.

FIG. 3 shows an additional frame structure based on PLP according to an embodiment of the present invention.

As shown in FIG. 3, a frame according to an embodiment of the present invention may include a preamble area and a data area. The preamble area may include a P1 symbol and a P2 symbol and the data area may include a plurality of data symbols. The P1 symbol may transmit P1 signaling information and P2 symbol may transmit L1-signaling information.

In this case, a preamble symbol may be additionally allocated to the preamble. This additional preamble symbol is referred to as an Additional Preamble 1 (AP1). In an embodiment of the present invention, one or more AP1 symbols may be added to a frame in order to improve detection performance of a mobile broadcast signal under very low SNR or time-selective fading conditions. AP1 signaling information transmitted through the AP1 symbol may include an additional transmission parameter.

AP1 signaling information according to an embodiment of the present invention includes pilot pattern information in a frame. Thus, according to an embodiment of the present invention the broadcast signal receiver does not transmit P2 symbol, if L1 signaling information is spread in data symbols of the data area, pilot pattern information can be discovered by using the AP1 signaling information before L1 signaling information in the data area is decoded.

Also, if the L1-signaling information in the data area of a frame is spread, AP1 signaling information can include information necessary for the broadcast signal receiver to decode signaling information spread in a frame of the data area. According to the present invention, a preamble area of a frame includes a P1 symbol, more than one AP1 symbols, and more than one P2 symbols. And the data area comprises a plurality of data symbols, also known as data OFDM symbol. A P2 symbol is optional and whether it is inserted is determined by signaling AP1 signaling information through AP1 symbols according to an embodiment of the present invention.

In an embodiment of the present invention, a P1 insertion module in the OFDM generator OFDM generator 101500 of the broadcast signal transmitter may insert the P1 symbol and the AP1 symbol into every symbol. That is, the P1 insertion module may insert 2 or more preamble symbols into every frame. In another embodiment, an AP1 insertion module may be added downstream of (or next to) the P1 insertion module and the AP1 insertion module may insert the AP1 symbol. If 2 or more preamble symbols are used as in the present invention, there are advantages in that robustness to burst fading that may occur in a mobile fading environment is further increased and signal detection performance is also improved.

The P1 symbol may transmit P1 signaling information associated with a basic transmission parameter and transmission type and a corresponding preamble identifier and the receiver may detect the frame using the P1 symbol. A plurality of P2 symbols may be provided and may carry L1 signaling information and signaling information such as a command PLP. The L1 signaling information may include L1-pre signaling information and L1-post signaling information, the L1-pre signaling information may include information necessary to receive and decode the L1-post signaling information. Also, the L1-post signaling information may include parameters necessary for the receiver to encode PLP data.

As shown in FIG. 3, the L1-post signaling information may be located next to L1-pre signaling information.

The L1-post signaling information may include a configurable block, a dynamic block, an extension block, a cyclic redundancy check (CRC) block, and an L1 padding block.

The configurable block may include information equally applied to one transmission frame and the dynamic block may include characteristic information corresponding to a currently transmitted frame.

The extension block may be used when the L1-post signaling information is extended, and the CRC block may include information used for error correction of the L1-post signaling information and may have 32 bits. The padding block may be used to adjust sizes of information respectively included in a plurality of encoding blocks to be equal when the L1-post signaling information is transmitted while being divided into the encoding blocks and has a variable size.

The common PLP may include network information such as a NIT (Network Information Table) or PLP information and service information such as an SDT (Service Description Table) or an EIT (Event Information Table). The preamble of the present invention may include only the P1 symbol, the L1-pre signaling information, and the L1-post signaling information or may include all of the P1 symbol, the L1-pre signaling information, the L1-post signaling information, and the common PLP according to designer intention. A plurality of data symbols located next to the P1 symbol may include a plurality of PLPs. The plurality of PLPs may include audio, video, and data TS streams and PSI/SI information such as a Program Association Table (PAT) and a Program Map Table (PMT). In the present invention, a PLP that transmits PSI/SI information may be referred to as a base PLP or a signaling PLP. The PLPs may include a type-1 PLP that is transmitted through one sub-slice per frame and a type-2 PLP that is transmitted through two sub-slices per frame. The plurality of PLPs may transmit one service and may also transmit service components included in one service. When the PLPs transmit service components, the transmitting side may transmit signaling information which indicates that the PLPs transmit service components. In addition, additional data (or an enhanced broadcast signal) in addition to basic data may be transmitted through a specific PLP while sharing an RF frequency band with the conventional terrestrial broadcast system according to an embodiment of the present invention. In this case, the transmitting side may define a system or a signal that is currently transmitted through signaling information of the P1 symbol described above. The following description is given with reference to the case in which the additional data is video data. That is, as shown in FIG. 3, PLP M1 112100 and PLP (M1+M2) 112200 which are type 2 PLPs may be transmitted while including additional video data. In addition, in the present invention, a frame that transmits such additional video data may be referred to as an additional frame and a frame that transmits basic data may be referred to as a basic frame (or T2 frame).

In addition, a frame that can transmit not only additional data but also data associated with a new broadcast system different from the conventional terrestrial broadcast system may be referred to as an additional frame. In this case, a frame that transmits a conventional terrestrial broadcast may be referred to as a terrestrial broadcast frame and an additional frame may transmit additional data or basic data associated with the new broadcast system.

Figure 4:
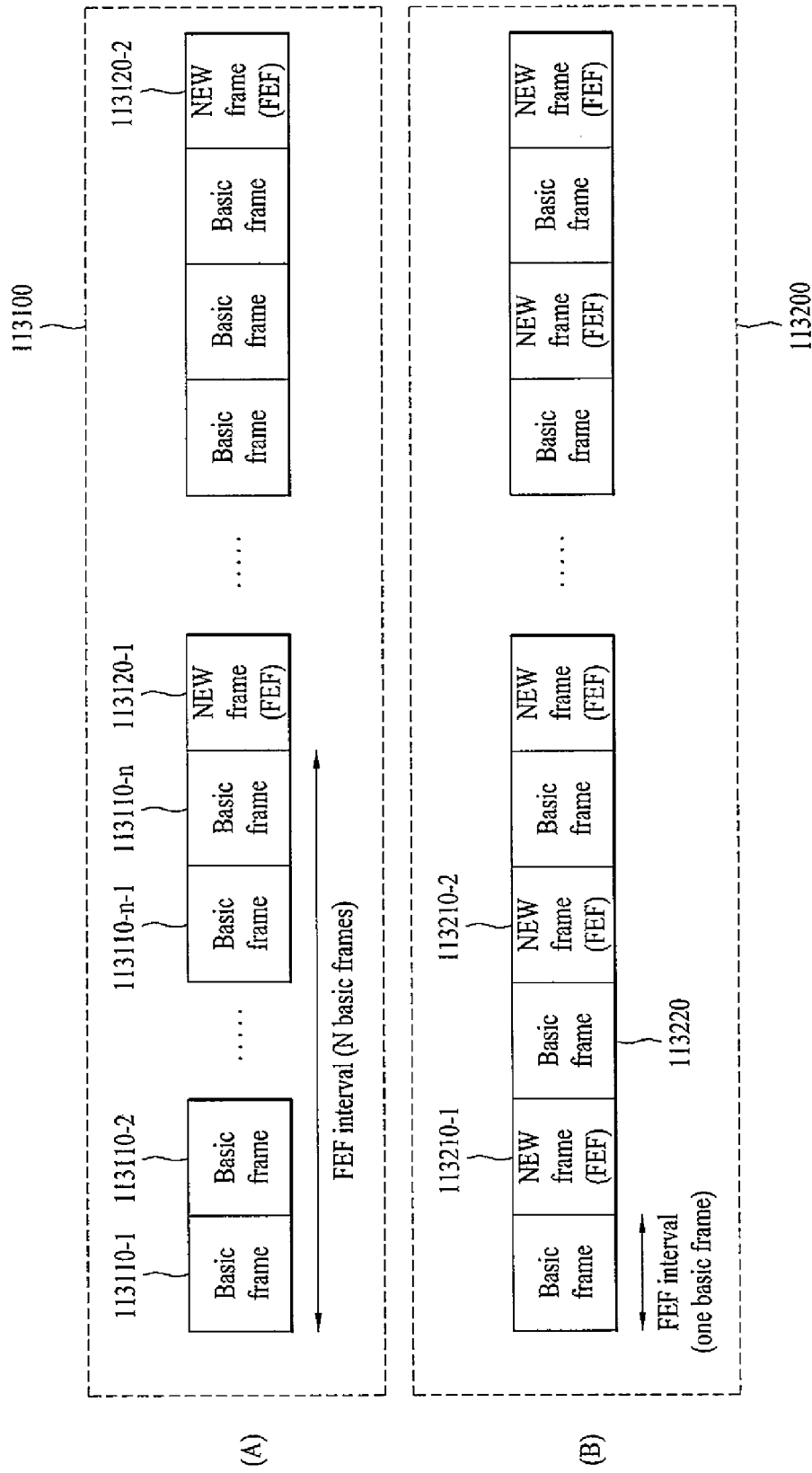
FIG. 4 shows an additional frame structure based on FEF according to an embodiment of the present invention.

FIG. 4 illustrates a structure of an additional frame based on FEF according to an embodiment of the present invention.

Specifically, FIG. 4 shows the case in which a Future Extension Frame (FEF) is used in order to transmit additional video data. In the present invention, a frame that transmits basic video data may be referred to as a basic frame and an FEF that transmits additional video data may be referred to as an additional frame.

FIG. 4 shows structures of superframes 11100 and 113200 in each of which a basic frame and an additional frame are multiplexed. Frames 113100-1 to 113100-*n* that are not shaded 13 DC 51170683.1 from among frames included in the superframe 113100 are basic frames and shaded frames 113120-1 and 113120-2 are additional frames.

FIG. 4(A) shows the case in which the ratio of basic frames to additional frames is N:1. In this case, the time required for the receiver to receive a next additional frame 113120-2 after receiving one additional frame 113120-1 may correspond to N basic frames.

FIG. 4(B) shows the case in which the ratio of basic frames to additional frames is 1:1. In this case, the proportion of additional frames in the superframe 113200 may be maximized and therefore the additional frames may have a structure very similar to that of the basic frames in order to maximize the extent of sharing with the basic frames. In addition, in this case, the time required for the receiver to receive a next additional frame 113210-2 after receiving one additional frame 113210-1 corresponds to 1 basic frame 113220 and therefore the superframe period is shorter than that of FIG. 4(A).

Figure 5:
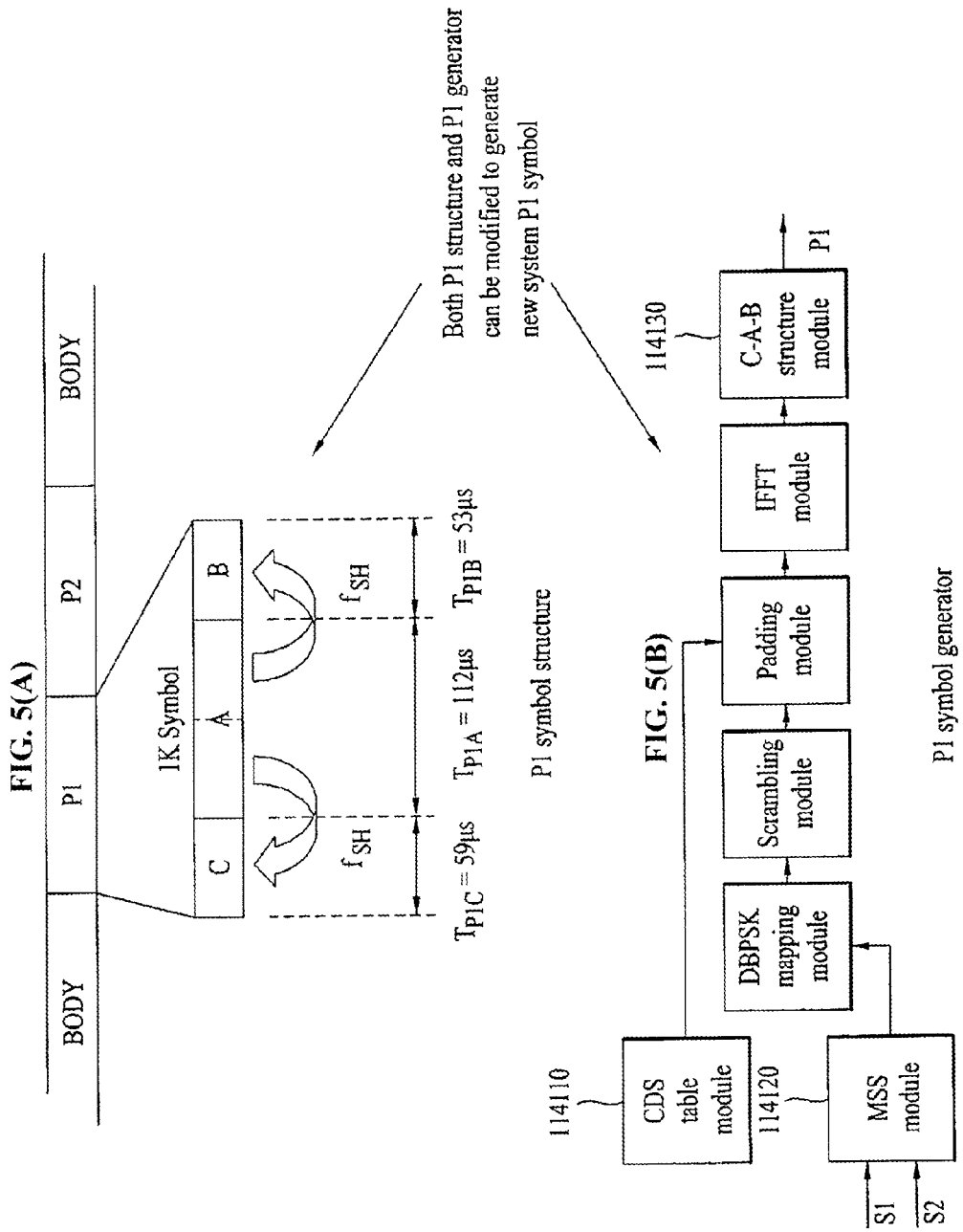
FIGS. 5 A and B show a process of generating a P1 symbol in order to perceive an additional frame according to an embodiment of the present invention.

FIGS. 5(A) and 5(B) illustrate a P1 symbol generation procedure for identifying additional frames according to an embodiment of the present invention.

In the case in which additional video data is transmitted through additional frames which are distinguished from basic frames as shown in FIG. 4, there is a need to transmit additional signaling information for enabling the receiver to identify and process an additional frame. An additional frame of the present invention may include a P1 symbol for transmitting such additional signaling information and the P1 symbol may be referred to as a new_system_P1 symbol. This new_system_P1 symbol may be different from a P1 symbol that is used in a conventional frame and a plurality of new_system_P1 symbols may be provided. In an embodiment, the new_system_P1 symbol may be located before a first P2 symbol in a preamble area of the frame.

In the present invention, a P1 symbol of a conventional frame may be modified and used to generate the minimum Hamming distance. The present invention suggests a method in which a minimum Hamming distance is generated by modifying the structure of the P1 symbol of the conventional frame or is generated by changing the symbol generator 114100 that generates symbols.

FIG. 5(A) shows the structure of the P1 symbol of the conventional frame. In the present invention, the structure of the P1 symbol of the conventional frame shown in FIG. 5(A) may be modified to generate a minimum Hamming distance. In this case, the minimum Hamming distance may be generated by changing a frequency displacement f_SH for the prefix and postfix of the conventional P1 symbol or changing the length (specifically, the size of T_P1C or T_P1B) of the P1 symbol. However, in the case in which the minimum Hamming distance is generated by modifying the structure of the P1 symbol, there is a need to appropriately modify parameters (the sizes of T_P1C and T_P1B and f_SH) used in the P1 symbol structure.

FIG. 5(B) shows the P1 symbol generator that generates P1 symbols. In the present invention, the P1 symbol generator shown in FIG. 5(B) may be modified to generate a minimum Hamming distance. In this case, a minimum Hamming distance may be generated using a method which changes the distribution of active carriers used for a P1 symbol in a CDS table module 114110, an MSS module 114120, and a C-A-B structure module 114130 included in the P1 symbol generator (for example, a method in which the CDS table module 114110 uses a different Complementary Set of Sequence (CSS)) or a method which changes a pattern for information that is transmitted through a P1 symbol (for example, a method in which the MSS module 114120 uses a different Complementary Set of Sequence (CSS)).

In addition, the AP1 symbol of the present invention described above with reference to FIG. 3 may be generated through the procedure described above with reference to FIG. 5.

In addition, the present invention proposes a MIMO system using scalable video coding (SVC). SVC is a video coding method developed to cope with a variety of terminals and communication environments and variations in the terminals and communication environments. SVC can code a video hierarchically such that desired definition is generated and transmit additional video data having a base layer from which video data about an image having basic definition can be restored and an enhancement layer from which an image having higher definition can be restored. Accordingly, a receiver can acquire the basic definition image by receiving and decoding only the video data of the base layer, or obtain the higher definition image by decoding the video data of the base layer and the video data of the enhancement layer according to characteristics thereof. In the following description, the base layer can include video data corresponding to the base layer and the enhancement layer can include video data corresponding to the enhancement layer. In the following, video data may not be a target of SVC, the base layer can include data capable of providing a fundamental service including basic video/audio/data corresponding to the base layer, and the enhancement layer can include data capable of providing a higher service including higher video/audio/data corresponding to the enhancement layer.

The present invention proposes a method of transmitting the base layer of SVC through a path through which signals can be received according to SISO or MISO using SVC and transmitting the enhancement layer of SVC through a path through which signals can be received according to MIMO in the broadcast system of the present invention. That is, the present invention provides a method by which a receiver having a single antenna acquires an image with basic definition by receiving the base layer using SISO or MISO and a receiver having a plurality of antennas acquires an image with higher definition by receiving the base layer and the enhancement layer using MIMO.

A description will be given of a method of transmitting the MIMO broadcast data including the base layer and the enhancement layer in association with terrestrial broadcast frames for transmitting terrestrial broadcast signals.

(1) Method of Transmitting MIMO Broadcast Data Using Predetermined PLP

It is possible to transmit the MIMO broadcast data included in a predetermined PLP while distinguishing the predetermined PLP from a PLP including terrestrial broadcast data. In this case, the predetermined PLP is used to transmit the MIMO broadcast data, and signaling information for describing the predetermined PLP may be additionally transmitted to prevent an error in the conventional receiving system. In the following, the predetermined PLP including the MIMO broadcast data may be referred to as a MIMO broadcast PLP and the PLP including the terrestrial broadcast data may be referred to as a terrestrial broadcast PLP.

As MIMO broadcast data may not be implemented in a terrestrial broadcast receiver, it is necessary to have additional information for signalling to distinguish terrestrial PLP and MIMO broadcast PLP. In this case, signaling can use a reserved field in the L1 signaling information of the terrestrial broadcast system. When a plurality of antennas are used for transmitting MIMO broadcast data on the transmitting side, the terrestrial broadcast data can be transmitted by MISO. The present invention, in order to perceive PLP, utilizes L1-post signaling information.

(2) Method of Transmitting MIMO Broadcast Data Using Predetermined Frame

It is possible to include the MIMO broadcast data generated as described above in a predetermined frame and to transmit the predetermined frame including the MIMO broadcast data while distinguishing the predetermined frame from a terrestrial broadcast frame. In this case, the predetermined frame is used to transmit the MIMO broadcast data, and signaling information for describing the predetermined frame may be additionally transmitted to prevent an error in the conventional receiving system.

(3) Method of Transmitting MIMO Broadcast PLP Using Terrestrial Broadcast Frame and MIMO Broadcast Frame PLPs including MIMO broadcast data may be transmitted through a terrestrial broadcast frame and a MIMO broadcast frame. Since a MIMO broadcast PLP may be present in the terrestrial broadcast frame (or basic frame), distinguished from the above-mentioned embodiments, it is necessary to signal the relationship between connected PLPs present in the terrestrial broadcast frame and the MIMO broadcast frame. To achieve this, the MIMO broadcast frame may also include L1 signaling information, and information about the MIMO broadcast PLP present in the broadcast frame may be transmitted along with L1 signaling information of the terrestrial broadcast frame.

MIMO broadcast PLP data in different frames are connected by using PLP fields including L1-post signaling information. According to an embodiment of the present invention, the receiving system includes as L1-post signaling information PLP_ID information, PLP+TYPE information, PLP_PAYLOAD_TYPE information, PLP_GROYP_ID information, uses those information to check the PLP connection between MIMO broadcast PLP data. It then acquires services by continuously decoding desired MIMO broadcast PLP data.

The terrestrial broadcast PLP in the terrestrial broadcast frames can be transmitted as a preset mode and also as mentioned a new mode to support the MIMO system can be transmitted. According to an embodiment of the present invention, the MIMO broadcast PLP in the terrestrial broadcast frames as a base layer can be transmitted by MISO or SISO method and MIMO broadcast PLP in MIMO broadcast frames as an enhancement layer can be transmitted by the MIMO method.

Figure 6:
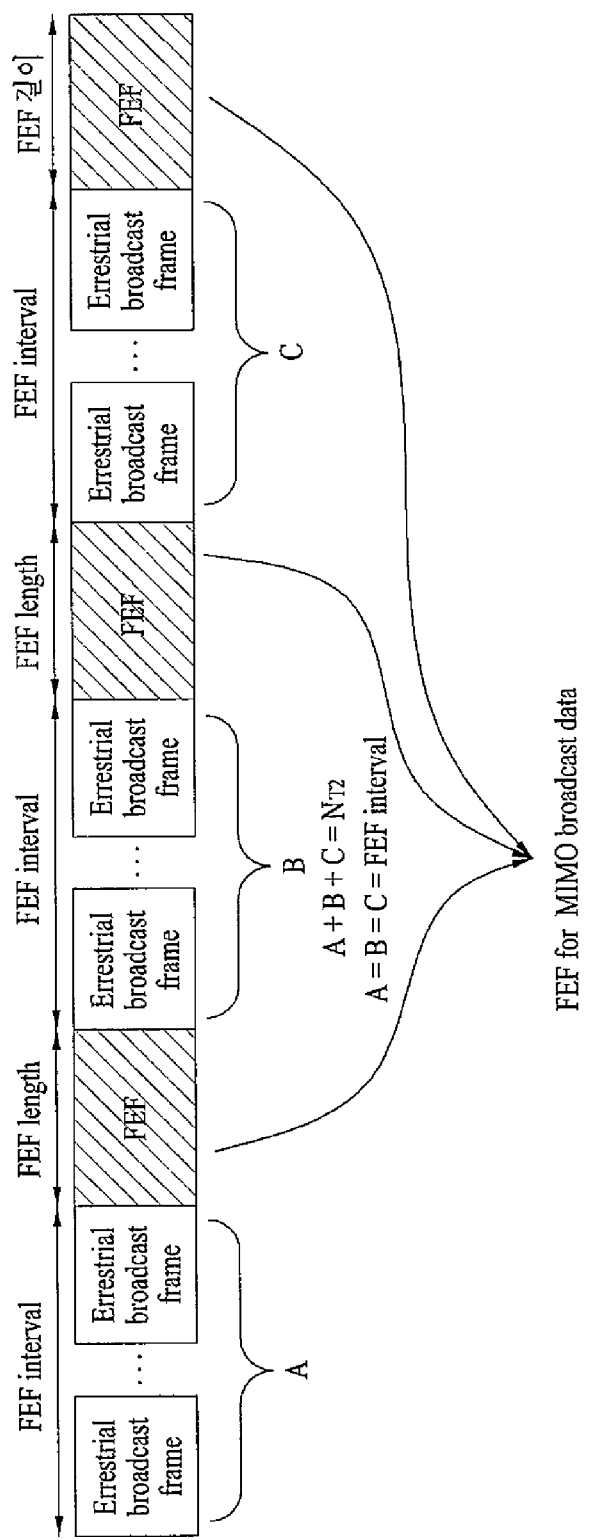
FIG. 6 shows a conceptual diagram of a broadcast signal transmitting method according to an embodiment of the present invention.

FIG. 6 shows a conceptual diagram for a method of transmitting broadcast signals.

As shown in FIG. 6, terrestrial broadcast data and MIMO broadcast data in frame units can be distinctively transmitted. The FEF length of a MIMO broadcast frame (FEF) can be allocated in between terrestrial broadcast frames in an FEF interval. In this case, MIMO system data can co-exist in a frequency band within the terrestrial broadcast system, and malfunction can be prevented by the broadcast signal receiver perceiving a frame through L1 signaling and ignoring MIMO broadcast frames. In that case, the MIMO system can use some of the thruput by FEF related parameters such as FEF_TYPR, FEF_LENGTH, FEF_INTERVAL defined by the L1-post signaling information.

Figure 7:
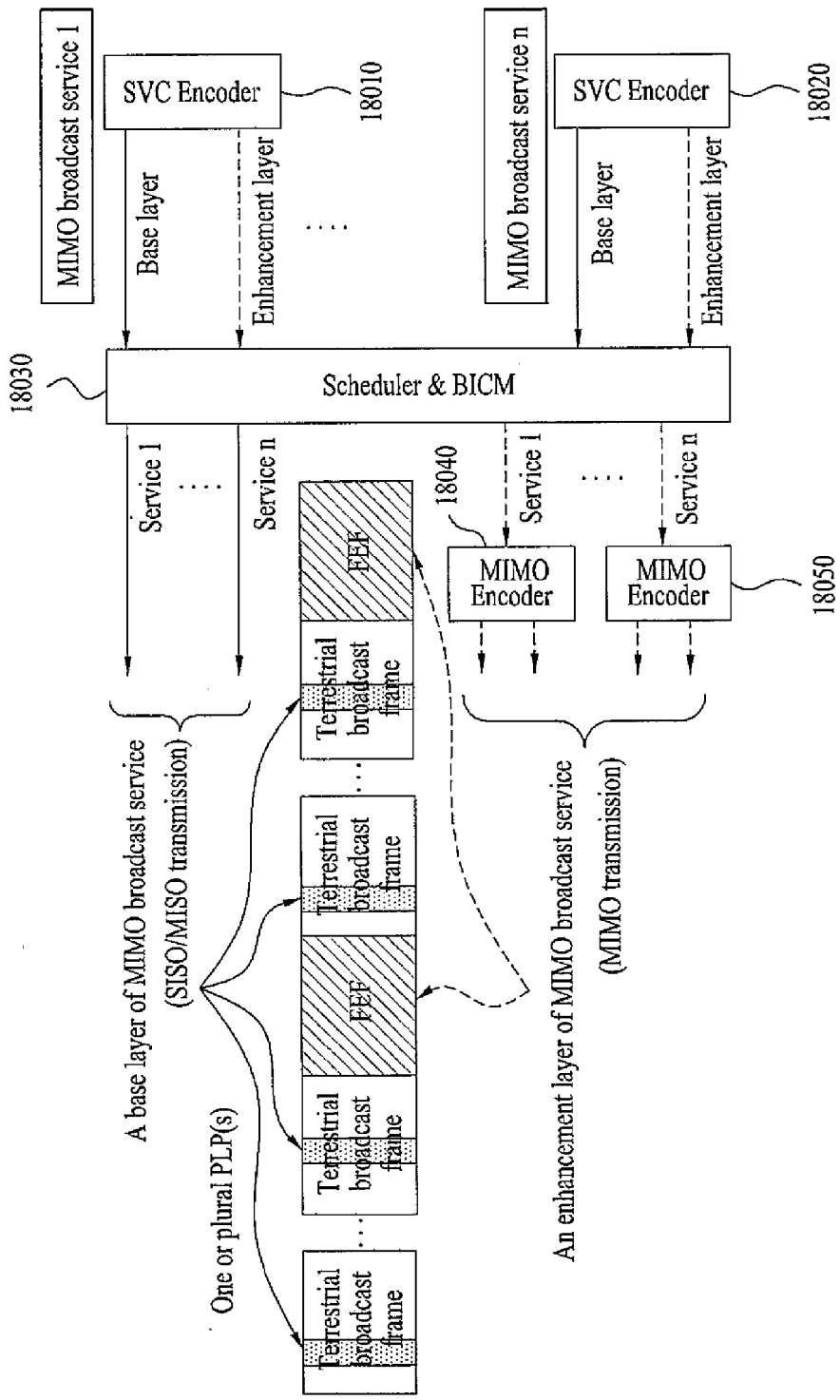
FIG. 7 shows a conceptual diagram of a broadcast signal transmitting method according to another embodiment of the present invention.

FIG. 7 shows a conceptual diagram for a broadcast signal transmitting method according to another embodiment of the present invention.

FIG. 7 indicates, as shown in the method 3, transmitting the broadcast signals of the MIMO broadcast system in terrestrial broadcast system. The MIMO broadcast services (MIMO broadcast service 1~n) encodes each SVC encoder (18010, 18020) through a base layer and enhancement layer. Scheduler&BICM (Bit Interleaved Coding and Modulation) module (18030) allocates the base layers of the MIMO broadcast services with the terrestrial broadcast frames and the enhancement layers with MIMO encoders (18040, 18050). The enhancement layers encodes by each MIMO encoder (18040, 18050) and transmits to the MIMO broadcast frame of the MIMO broadcast system. The base layers are transmitted in the terrestrial broadcast frames and in that case, SISO or MISO supported by the terrestrial broadcast system.

When broadcast signals including the terrestrial broadcast frames and the MIMO broadcast frames, as mentioned in the method 1 and 3, signaling information is created and the terrestrial broadcast receiver perceives terrestrial broadcast PLP in the terrestrial broadcast frames. Thus, the receiver can acquire the terrestrial broadcast services without malfunctioning. Also, the MIMO broadcast receiver can acquire and provide the MIMO broadcast service corresponding to the base layer only by the terrestrial broadcast frame. It can acquire and provide the MIMO broadcast service corresponding to the base layer and enhancement layer by acquiring the MIMO broadcast PLP of the terrestrial broadcast frame and MIMO broadcast frame of the MIMO broadcast frame.

The MIMO broadcast PLP in the terrestrial broadcast frame can only be transmitted by MISO/MIMO. In that case, the MIMO broadcast PLP, as the system demands, can include a code rate of new error correction codes (such as ¼, ⅓, ½), and new time interleaving mode and can only transmit to a base layer.

The MIMO broadcast PLP of the MIMO broadcast frame includes PLP of the SISO, MISO, and MIMO methods. In that case, PLP of the SISO/MISO methods or a base layer in a carrier can be transmitted and PLP of the MIMO method or the carrier can transmit the enhancement layer. The rate of PLP of the SISO/MISO methods, or carrier and PLP of the MIMO method, or carrier can be varied from 0 to 100%. The ract can be determined for each frame accordingly.

Figure 8:
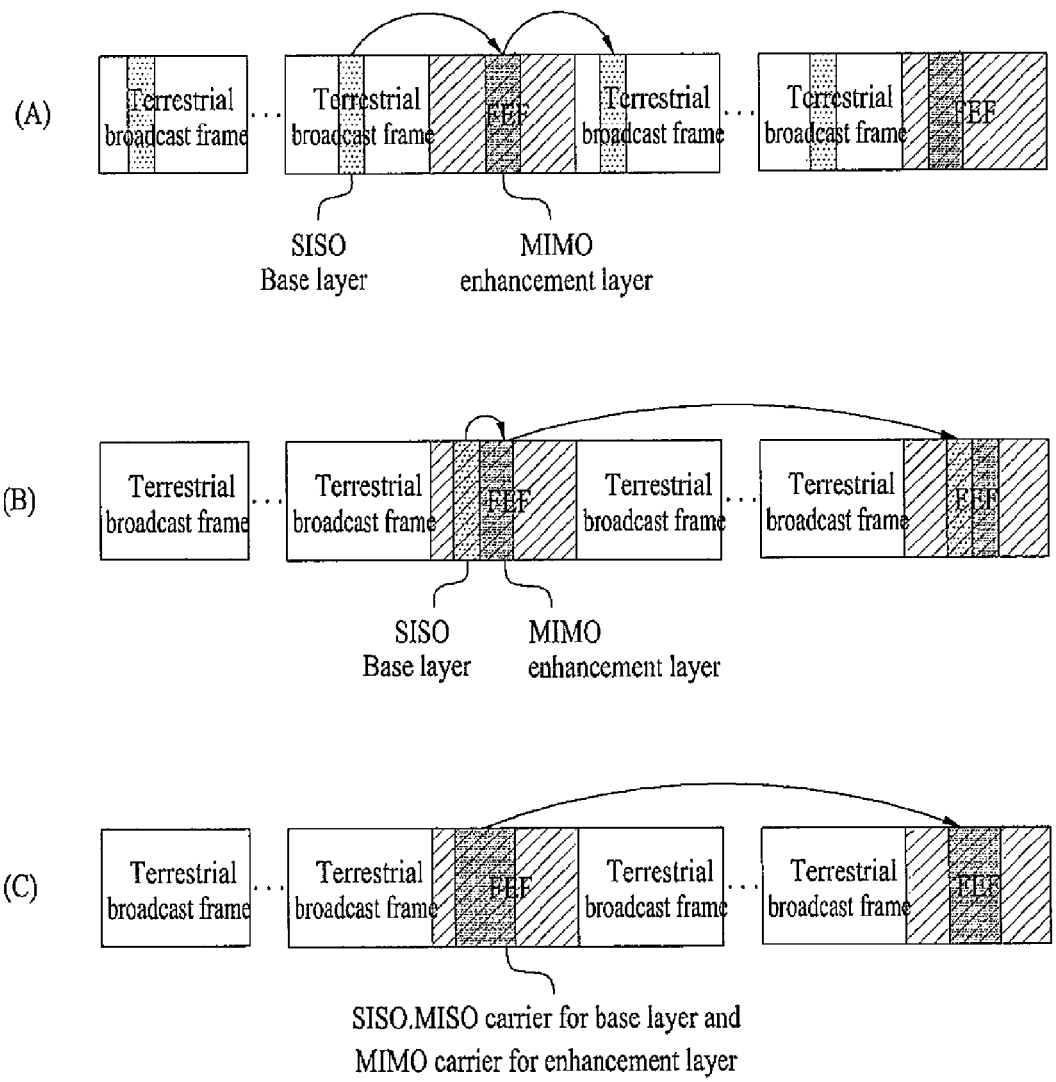
FIG. 8 shows a broadcast signal transmitted by a national broadcast system with a MIMO system applied using SVC.

FIG. 8 shows broadcast signals transmitted by a broadcast system being applied by a MIMO system using a SVC.

FIG. 8 shows a broadcast signal that allocates terrestrial data and MIMO broadcast data to a frame or PLP by using the SVC and generating a base and enhancement layer.

FIG. 8 A shows a broadcast signal transmitted by a broadcast system being applied by a MIMO transmitting system by using the SVC.

The broadcast system in FIG. 8 A transmits broadcast signals including a terrestrial broadcast frame and MIMO broadcast frame. The MIMO broadcast PLP in FIG. 8 A can exist in a terrestrial broadcast frame or a MIMO broadcast frame. The MIMO broadcast PLP in the terrestrial broadcast frame as a base layer can be transmitted by the SISO or MISO method and the MIMO broadcast PLP in the MIMO broadcast frame as an enhancement layer can be transmitted by the SISO, MISO, or MIMO method.

FIG. 8 B shows a broadcast signal being applied by a MIMO transmitting system using a SVC.

In FIG. 8 B, the broadcast system transmits broadcast signals including the terrestrial broadcast frame and the MIMO broadcast frame. The MIMO broadcast PLP in FIG. 8 B only exists in the MIMO broadcast frame. In that case, the MIMO broadcast PLP includes PLP with a base layer and PLP with an enhancement layer. The PLP with the base layer can be transmitted by the SISO or MISO method, and the PLP with the enhancement layer can be transmitted by the SISO, MISO, or MIMO method. The rate of the PLP with base layer and the PLP with enhancement layer can be varied from 0 to 100%.

FIG. 8 C shows a broadcast signal transmitted by a broadcast system being applied by a MIMO transmitting system using a SVC.

The broadcast system of FIG. 8 C transmits broadcast signals including terrestrial broadcast frames and MIMO broadcast frames. The MIMO broadcast data exists only in the MIMO broadcast frame. But, as opposed to FIG. 8 B, a base layer and an enhancement layer are not transmitted by PLP but carriers.

Various technologies are introduced to improve transmission efficiency and perform robust communication in a digital broadcast system. One of the technologies is a method of using a plurality of antennas at a transmitting side or a receiving side. This method may be divided into SISO (Single-Input Single-Output), SIMO (Single-Input Multi-Output), MISO (Multi-Input Single-Output) and MIMO (Multi-Input Multi-Output). While multiple antennas are described as two antennas in the following, the present invention is applicable to systems using two or more antennas.

In an embodiment, MIMO can use spatial multiplexing (SM) and Golden code (GC) schemes, which will be described in detail.

A modulation scheme in broadcast signal transmission may be represented as M-QAM (Quadrature Amplitude Modulation) in the following description. That is, BPSK (Binary Phase Shift Keying) can be represented by 2-QAM when M is 2 and QPSK (Quadrature Phase Shift Keying) can be represented by 4-QAM when M is 4. M can indicate the number of symbols used for modulation.

A description will be given of a case in which a MIMO system transmits two broadcast signals using two transmit antennas and receives two broadcast signals using two receive antennas as an example.

Figure 9:
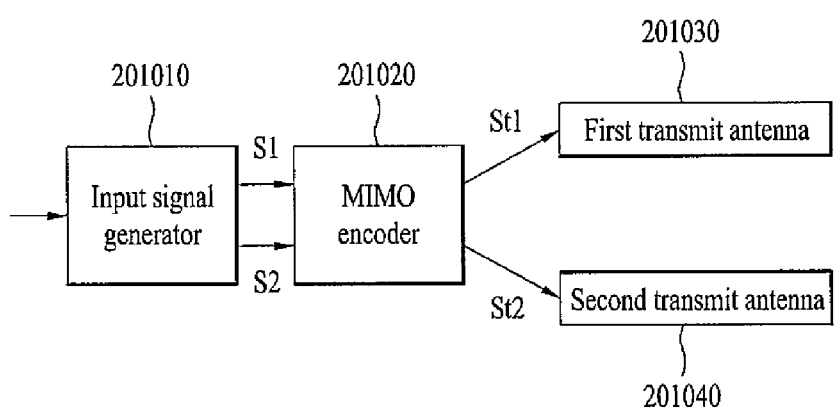
FIG. 9 shows a MIMO transmitting/receiving system according to an embodiment of the present system.

FIG. 9 illustrates MIMO transmission and reception systems according to an embodiment of the present invention.

As shown in FIG. 9, the MIMO transmission system includes an input signal generator 201010, a MIMO encoder 201020, a first transmit antenna 201030, and a second transmit antenna 201040. In the following, the input signal generator 201010 may be referred to as a divider and the MIMO encoder 201020 may be referred to as a MIMO processor.

Although not shown in the drawings, the MIMO reception system may include a first receive (Rx) antenna, a second receive (Rx) antenna, a MIMO decoder, and an output signal generator. In the following description, the output signal generator may also be referred to as a merger and the MIMO decoder may also be referred to as an ML detector.

In the MIMO transmission system, the input signal generator 201010 generates a plurality of input signals for transmission through a plurality of antennas. In the following, the input signal generator 201010 may be referred to as a divider. Specifically, the input signal generator 201010 may divide an input signal for transmission into 2 input signals and output the first input signal S1 and the second input signal S2 for MIMO transmission.

The MIMO encoder 201020 may perform MIMO encoding on the plurality of input signals S1 and S2 and output a first transmission signal St1 and a second transmission signal St2 for MIMO transmission and the output transmission signals may be transmitted through a first antenna 201030 and a second antenna 201040 via required signal processing and modulation procedures. The MIMO encoding 201020 may perform encoding on a per symbol basis. The SM scheme or the GC scheme may be used as the MIMO encoding method. In the following, the MIMO encoder may be referred to as a MIMO processor. Specifically, the MIMO encoder may process a plurality of input signals according to a MIMO matrix and a parameter value of the MIMO matrix which are described below.

The input signal generator 201010 is an element that outputs a plurality of input signals for MIMO encoding and may also be an element such as a demultiplexer or a frame builder depending on the transmission system. The input signal generator 201010 may also be included in the MIMO encoder 201020 such that the MIMO encoder 201020 generates a plurality of input signals and performs encoding on the plurality of input signals. The MIMO encoder 201020 may be a device that performs MIMO encoding or MIMO processing on a plurality of signals and outputs the encoded or processed signals so as to acquire diversity gain and multiplexing gain of the transmission system.

Since signal processing should be performed on a plurality of input signals after the input signal generator 201010, a plurality of devices may be provided next to the input signal generator 201010 to process signals in parallel or one device including one memory may be provided to sequentially process signals or to simultaneously process signals in parallel.

The MIMO reception system receives a first reception signal Sr1 and a second reception signal Sr2 using a first receive antenna and a second receive antenna. The MIMO decoder 201070 then processes the first reception signal and the second reception signal and outputs a first output signal and a second output signal. The MIMO decoder 201070 processes the first reception signal and the second reception signal according to the MIMO encoding method used by the MIMO encoder 201020. As an ML detector, the MIMO decoder 201070 outputs a first output signal and a second output signal using information regarding the channel environment, reception signals, and the MIMO matrix used by the MIMO encoder in the transmission system. In an embodiment, when ML detection is performed, the first output signal and the second output signal may include probability information of bits rather than bit values and may also be converted into bit values through FEC decoding.

The MIMO decoder of the MIMO reception system processes the first reception signal and the second reception signal according to the QAM type of the first input signal and the second input signal processed in the MIMO transmission system. Since the first reception signal and the second reception signal received by the MIMO reception system are signals that have been transmitted after being generated by performing MIMO encoding on the first input signal and the second input signal of the same QAM type or different QAM types, the MIMO reception system may determine a combination of QAM types of the reception signals to perform MIMO decoding on the reception signals. Accordingly, the MIMO transmission system may transmit information identifying the QAM type of each transmission signal in the transmission signal and the QAM type identification information may be included in a preamble portion of the transmission signal. The MIMO reception system may determine the combination of the QAM types of the reception signals from the QAM type identification information of the transmission signals and perform MIMO decoding on the reception signals based on the determination.

The following is a description of a MIMO encoder and a MIMO encoding method that have low system complexity, high data transmission efficiency, and high signal reconstruction (or restoration) performance in various channel environments according to an embodiment of the present invention.

The SM scheme is a method in which data is simultaneously transmitted through a plurality of antennas without MIMO encoding. In this case, the receiver can acquire information from data that is simultaneously received through a plurality of receive antennas. The SM scheme has an advantage in that the complexity of a Maximum Likelihood (ML) decoder that the receiver uses to perform signal reconstruction (or restoration) is relatively low since the decoder only needs to check a combination of received signals. However, the SM scheme has a disadvantage in that transmit diversity cannot be achieved at the transmitting side. In the case of the SM scheme, the MIMO encoder bypasses a plurality of input signals. In the following, such a bypass process may be referred to as MIMO encoding.

The GC scheme is a method in which data is transmitted through a plurality of antennas after the data is encoded according to a predetermined rule (for example, according to an encoding method using golden code). When the number of the antennas is 2, transmit diversity is acquired at the transmitting side since encoding is performed using a 2×2 matrix. However, there is a disadvantage in that the complexity of the ML decoder of the receiver is high since the ML decoder needs to check 4 signal combinations.

The GC scheme has an advantage in that it is possible to perform more robust communication than using the SM scheme since transmit diversity is achieved. However, such a comparison has been made when only the GC scheme and the SM scheme are used for data processing for data transmission and, if data is transmitted using additional data coding (which may also be referred to as outer coding), transmit diversity of the GC scheme may fail to yield additional gain. This failure easily occurs especially when such outer coding has a large minimum Hamming distance. For example, the transmit diversity of the GC scheme may fail to yield additional gain compared to the SM scheme when data is transmitted after being encoded by adding redundancy for error correction using a Low Density Parity Check (LDPC) code having a large minimum Hamming distance. In this case, it may be advantageous for the broadcast system to use the SM scheme having low complexity.

Figure 10:
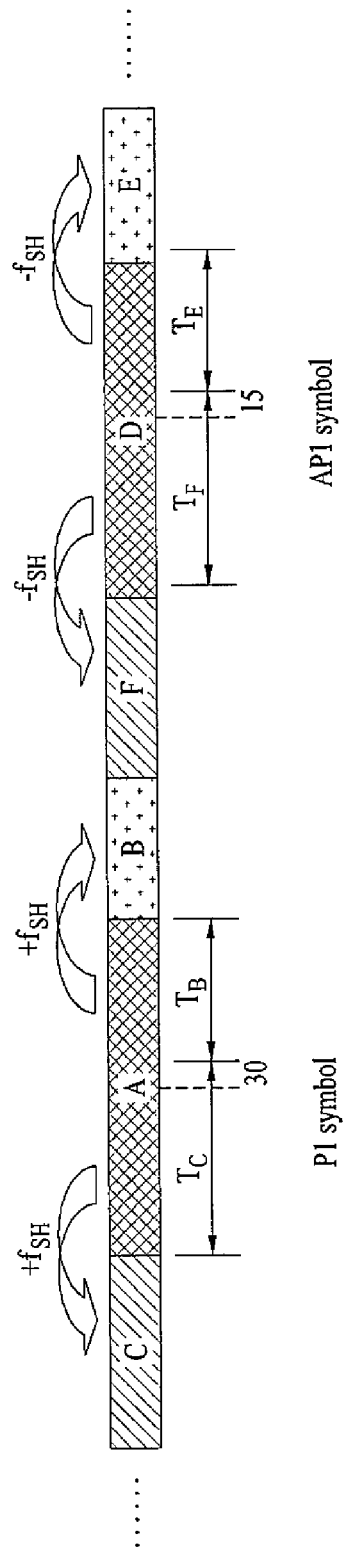
FIG. 10 shows a structure of a P1 symbol and AP1 symbol according to an embodiment of the present invention.

FIG. 10 shows an exemplary structure of a P1 symbol and an exemplary structure of an AP1 symbol according to an embodiment of the present invention.

P1 symbol is generated by having each of a front portion and an end portion of an effective (or valid) symbol copied, by having a frequency shift performed as much as $+f_{sh}$, and by having the frequency-shifted copies respectively positioned at a front portion (C) and an end portion (B) of the effective symbol (A). In the present invention, the C portion will be referred to as a prefix, and the B portion will be referred to as a postfix. More specifically, P1 symbol is configured of a prefix portion, an effective symbol portion, and a postfix portion.

In the same manner, AP1 symbol is generated by having each of a front portion and an end portion of an effective (or valid) symbol copied, by having a frequency shift performed as much as $-f_{sh}$, and by having the frequency-shifted copies respectively positioned at a front portion (F) and an end portion (E) of the effective symbol (D). In the present invention, the F portion will be referred to as a prefix, and the E portion will be referred to as a postfix. More specifically, AP1 symbol is configured of a prefix portion, an effective symbol portion, and a postfix portion.

Herein, the two frequency-shift values $+f_{sh}$, $-f_{sh}$, which are used in the P1 symbol and the AP1 symbol, may have the same absolute value yet be given opposite signs. More specifically, the frequency-shift is performed in opposite directions. And, the lengths C and F, which are copied to the front portion of the effective symbol, may be set to have different values. And, the lengths B and E, which are copied to the end portion of the effective symbol, may be set to have different values. Alternatively, the lengths C and F may be set to have different values, and the lengths B and E may be set to have the same value, or vice versa. According to another embodiment of the present invention, an effective symbol length of the P1 symbol and an effective symbol length of the AP1 symbol may be differently determined. And, according to yet another embodiment of the present invention, a CSS (Complementary Set Sequence) may be used for tone selection and data scrambling within the AP1 may be scrambled by AP1.

According to the embodiment of the present invention, the lengths of C and F, which are copied to the front portion of the effective (or valid) symbol, may be set to have different values, and the lengths of B and E, which are copied to the end portion of the effective (or valid) symbol, may also be set to have different values.

The C,B,F,E lengths according to the present invention may be obtained by using Equation 1 shown below.

Length of $C(T_C)$={Length of $A(T_A)$/2+30}

Length of $B(T_B)$={Length of $A(T_A)$/2−30}

Length of $E(T_F)$={Length of $D(T_D)$/2+15}

Length of $E(T_E)$={Length of $D(T_D)$/2−15}  [Expression 1]

As shown in Equation 1, P1 symbol and AP1 symbol have the same frequency shift value. However, each of the P1 symbol and the AP1 symbol are given opposite signs. Additionally, in order to determine the lengths of C and B, the present invention determines an offset value being added to or subtracted from a value corresponding to the length of A $(T_A)$/2. And, in order to determine the lengths of F and E, the present invention determines an offset value being added to or subtracted from a value corresponding to the length of D $(T_D)$/2. Herein, each of the offset values is set up differently. According to the embodiment of the present invention, the offset value of P1 symbol is set to 30, and the offset value of AP1 symbol is set to 15. However, the values given in the above-described examples are merely exemplary. And, therefore, it will be apparent that the corresponding values may easily be varied or changed by anyone skilled in the art. Thus, the present invention will not be limited only to the values presented herein.

According to the present invention, by generating AP1 symbol and an AP1 symbol to configure the structure shown in FIG. 10, and by inserting the generated symbols to each signal frame, the P1 symbol does not degrade the detection performance of the AP1 symbol, and, conversely, the AP1 symbol does not degrade the detection performance of the P1 symbol. Additionally, the detection performance of the P1 symbol is almost identical to the detection performance of the AP1 symbol. Furthermore, by configuring the symbols so that the P1 symbol and the AP1 symbol have similar symbol structures, the complexity level of the receiver may be reduced.

At this point, the P1 symbol and the AP1 symbol may be transmitted consecutively, or each of the symbols may be allocated to different positions within the signal frame and may then be transmitted. And, in case the P1 symbol and AP1 symbol are each allocated to a different position within the signal frame, so as to be transmitted, a high time diversity effect may be gained with respect to the preamble symbol. According to the embodiment of the present invention, the P1 symbol and the AP1 symbol are consecutively transmitted. In that case, the AP1 symbol, according to FIG. 3, transmits information necessary for decoding signaling information spread in a pilot pattern or a frame of a data area. It can be generated in FIG. 5.

Figure 11:
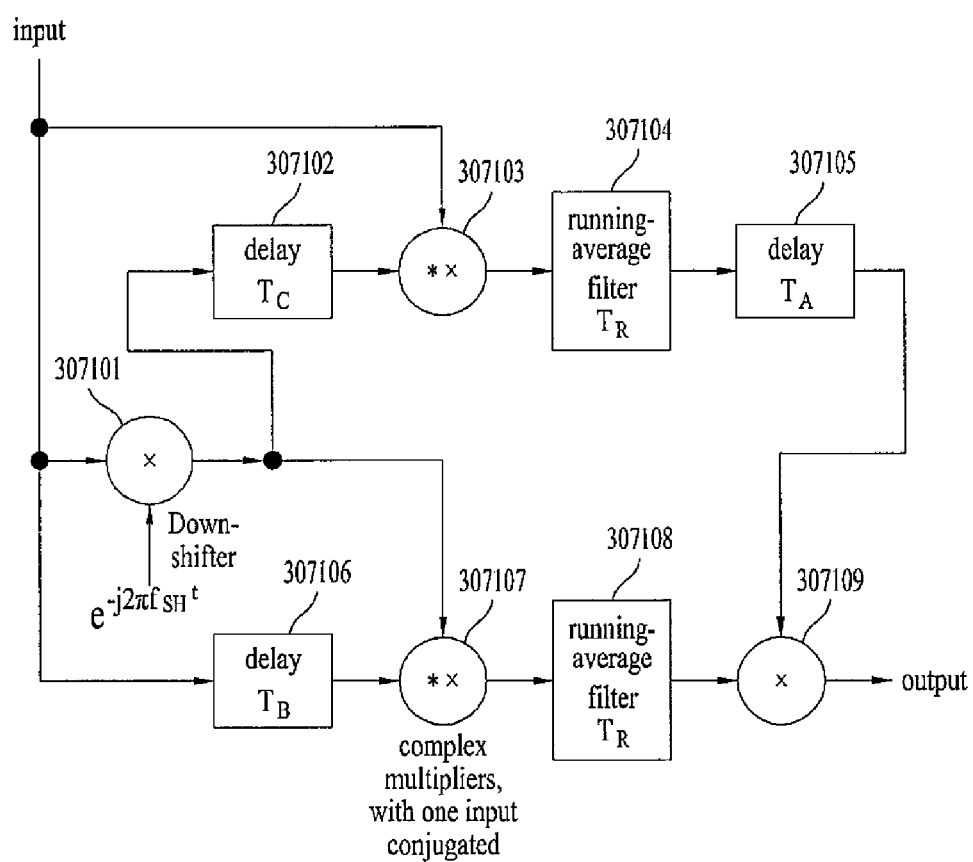
FIG. 11 shows a P1 symbol detection module according to an embodiment of the present invention.

FIG. 11 shows an exemplary structure of a P1 symbol detector according to an embodiment of the present invention.

The P1 symbol detector may be included in the OFDM demodulator (107100) explained in FIG. 2.

Herein, the P1 symbol detector may also be referred to as a C-A-B preamble detector. The P1 symbol detector may include down shifter (307101), $1^{st}$ conjugator (307103) and $2^{nd}$ delayer (307106).

The down shifter (307101) performs inverse modulation by multiplying $e^{-j2\pi f_{SH}t}$ by the input signal. When inverse modulation is performed by the down shifter (307101), the signal being frequency-shifted and inputted is recovered to the original signal. The inverse modulated signal may be outputted to a $1^{st}$ delayer (307102) and a $2^{nd}$ conjugator (307107).

The $1^{st}$ delayer (307102) delays the inverse-modulated signal by a length of part C $(T_C)$ and then outputs the delayed signal to the $1^{st}$ conjugator (307103). The $1^{st}$ conjugator (307103) performs complex-conjugation on the signal, which is delayed by a length of part C $(T_C)$. Then, the $1^{st}$ conjugator (307103) multiplies the input signal by the complex-conjugated signal, thereby outputting the processed signal to a $1^{st}$ filter (307104). The $1^{st}$ filter (307104) uses a running average filter having the length of $T_R=T_A$, so as to remove (or eliminate) any excessively and unnecessarily remaining modulation elements, thereby outputting the processed signal to a $3^{rd}$ delayer (307105). The $3^{rd}$ delayer (307105) delays the filtered signal by a length of part A (i.e., effective (or valid) symbol) $(T_A)$, so as to output the delayed signal to a multiplier (307109).

The $2^{nd}$ delayer (307106) delays the input signal by a length of part B $(T_B)$ and then outputs the delayed signal to the $2^{nd}$ conjugator (307107). The $2^{nd}$ conjugator (307107) performs complex-conjugation on the signal, which is delayed by a length of part B $(T_B)$. Then, the $2^{nd}$ conjugator (307107) multiplies the complex-conjugated signal by an inverse-modulated signal, thereby outputting the processed signal to a $2^{nd}$ filter (307108). The $2^{nd}$ filter (307108) uses a running average filter having the length of $T_R=T_A$, so as to remove (or eliminate) any excessively and unnecessarily remaining modulation elements, thereby outputting the processed signal to the multiplier (307109).

The multiplier (307109) multiplies the output of the $2^{nd}$ filter (307109) by a signal, which is delayed by a length of part A $(T_A)$. Thus, a P1 symbol may be detected from each signal frame of the received broadcast signal.

Herein, the length of part C $(T_C)$ and the length of part B $(T_B)$ may be obtained by applying Equation 1 shown above.

Figure 12:
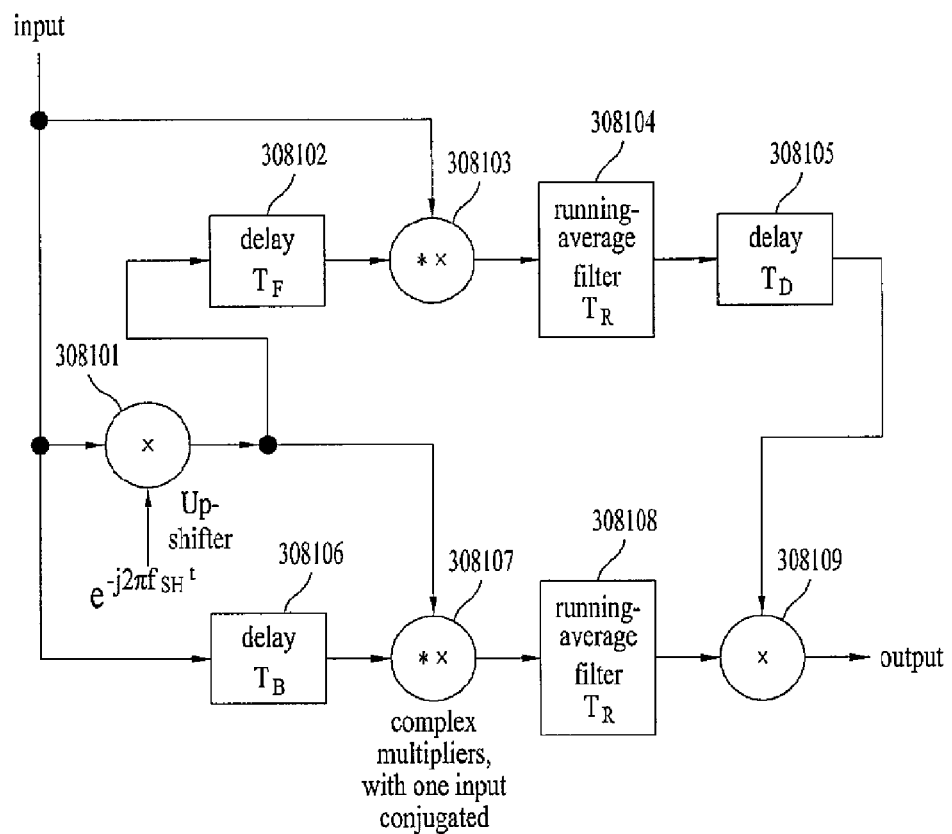
FIG. 12 shows an AP1 symbol detection module according to an embodiment of the present invention.

FIG. 12 shows an exemplary structure of an AP1 symbol detector according to an embodiment of the present invention.

The AP1 symbol detector may be included in the OFDM demodulator (107100) explained in FIG. 2.

Herein, the AP1 symbol detector may also be referred to as an F-D-E preamble detector. The AP1 symbol detector may include down shifter (308101), $1^{st}$ conjugator (308103) and $2^{nd}$ delayer (308106). The AP1 symbol detector may receive a signal inputted to broadcast signal receiver or a signal outputted from the P1 symbol detector explained in FIG. 11.

The up-shifter (308101) performs inverse modulation by multiplying $e^{-j2\pi f_{SH}t}$ by the input signal. When inverse modulation is performed by the up-shifter (308101), the signal being frequency-shifted and inputted is recovered to the original signal. More specifically, the up-shifter (308101) of FIG. 47 has the same structure as the down-shifter (307101) of the P1 symbol detector (306601). However, the frequency direction of each inverse modulation process is completely opposite to one another. The signal that is inverse modulated by the up-shifter (308101) may be outputted to a $1^{st}$ delayer (308102) and a $2^{nd}$ conjugator (308107).

The $1^{st}$ delayer (308102) delays the inverse-modulated signal by a length of part F $(T_F)$ and then outputs the delayed signal to the $1^{st}$ conjugator (308103). The $1^{st}$ conjugator (308103) performs complex-conjugation on the signal, which is delayed by a length of part F ($T_F$). Then, the $1^{st}$ conjugator (308103) multiplies the input signal by the complex-conjugated signal, thereby outputting the processed signal to a $1^{st}$ filter (308104). The $1^{st}$ filter (308104) uses a running average filter having the length of $T_R=T_D$, so as to remove (or eliminate) any excessively and unnecessarily remaining modulation elements, thereby outputting the processed signal to a $3^{rd}$ delayer (308105). The $3^{rd}$ delayer (308105) delays the filtered signal by a length of part D (i.e., effective (or valid) symbol) ($T_D$), so as to output the delayed signal to a multiplier (308109).

The $2^{nd}$ delayer (308106) delays the input signal by a length of part E ($T_E$) and then outputs the delayed signal to the $2^{nd}$ conjugator (308107). The $2^{nd}$ conjugator (308107) performs complex-conjugation on the signal, which is delayed by a length of part E ($T_E$). Then, the $2^{nd}$ conjugator (308107) multiplies the complex-conjugated signal by an inverse-modulated signal, thereby outputting the processed signal to a $2^{nd}$ filter (308108). The $2^{nd}$ filter (308108) uses a running average filter having the length of $T_R=T_D$, so as to remove (or eliminate) any excessively and unnecessarily remaining modulation elements, thereby outputting the processed signal to the multiplier (308109).

The multiplier (308109) multiplies the output of the $2^{nd}$ filter (308109) by a signal, which is delayed by a length of part D ($T_D$). Thus, an AP1 symbol may be detected from each signal frame of the received broadcast signal. Herein, the length of part F ($T_F$) and the length of part E ($T_E$) may be obtained by applying Equation 1 shown above.

As shown in FIG. 3, a frame according to an embodiment of the present invention comprises a preamble area and a data area. The preamble are comprises a P1 and P2 and there can be a plurality of data symbols in the data area. Also, as the designer intends, there can be an AP1 in the preamble area.

Then, P1 signaling information is transmitted by the P1 symbol, the AP1 signaling information is transmitted by the AP1 symbol, and L1-pre and L1-post signaling information is transmitted by the P2 symbol.

An embodiment of a broadcast signal transmitter or receiver for MIMO processing is as follows.

The broadcast signal transmitter comprises as shown in FIG. 1 an input processor 101200, a BICM encoder 101300, a frame builder 101400, and an OFDM generator 101500. Also, the broadcast signal receiver, as shown in FIG. 2, comprises an OFDM demodulator 107100, a frame demapper 107200, a BICM decoder 107300, and an output processor 1073400.

The input processor 101200 of the broadcast signal transmitter executes FEC encoding for transmitting data in a form of block. The BICM encoder 101300 performs encoding for correcting errors. The frame builder 101400 performs mapping data in a frame, and the OFDM generator 101500 performs OFDM demodulating in the frame-mapped data into symbol units and transmit the data. Devices in the broadcast signal receiver can perform reverse-functioning corresponding to the counterpart devices in the transmitter.

The present invention suggests a broadcast signal transmitter or receiver that independently applies MISO or MIMO processing for each PLP from a plurality of PLP inputs. According to the present invention, the present invention can effectively adjust the quality of service (QOS) or services from PLP in a physical layer.

Four embodiments for performing MISO/MISO processing in a plurality of signals from the transmitter and receiver through a plurality of antennas are as follows. Individual embodiments can be distinguished from each other according to whether MISO/MIMO processing for each PLP is processed or according to the position of MISO/MIMO processing. A brief description of individual embodiments is as follows.

A first embodiment is about a broadcast signal transmitter or a corresponding receiver independently performing MISO or MIMO processing for each PLP data input during a BICM encoding process.

A second embodiment is about another broadcast signal transmitter or a corresponding receiver independently performing MISO or MIMO processing for each PLP data input during a BICM encoding process.

A third embodiment is about a broadcast signal transmitter or a corresponding receiver independently performing MISO or MIMO processing for mapped PLP data input during a OFDM generating process.

A fourth embodiment is about a broadcast signal transmitter or a corresponding receiver independently performing MISO or MIMO processing for each PLP data input during a BICM encoding process, wherein an OFDM generator performs MISO processing in MISO PLP data and L1-signaling information.

In more detail, the BICM encoder of the broadcast signal transmitter according to the first embodiment performs MISO encoding or MIMO encoding in PLP data after constellation-mapping, cell interleaving, and time interleaving. Also, the BICM decoder of the broadcast signal transmitter according to the first embodiment can reverse the whole process. According to the second embodiment, the BICM encoder of the broadcast signal transmitter according to the second embodiment performs MISO encoding or MIMO encoding in PLP data after constellation-mapping, and then performs cell interleaving and time interleaving. Also, the BICM decoder of the broadcast signal transmitter according to the second embodiment can reverse the whole process.

According to the third embodiment, the OFDM generator of the broadcast signal transmitter performs MISO or MIMO encoding in PLP data transmitted from a frame builder. In addition, an OFDM demodulator of the broadcast signal receiver according to a third embodiment of the present invention may perform a reverse process of the OFDM generator of the broadcast signal transmitter.

According to the fourth embodiment, the BICM encoder of the broadcast signal transmitter according to the fourth embodiment performs MISO encoding or MIMO encoding in PLP data after time interleaving or constellation-mapping. Also, the OFDM generator of the broadcast signal transmitter performs MISO encoding in MISO PLP data for MISO processing and L1-signaling information. The BICM decoder of the broadcast signal receiver and the OFDM demodulator of the broadcast signal transmitter according to the fourth embodiment can reverse the whole process.

A broadcast signal transmitter/receiver according to each embodiment is as follows. The broadcast signal transmitter/receiver can perform MIMO processing for a plurality of signals through a plurality of antennas. The broadcast signal transmitter/receiver with two signals by two antennas is described below.

Figure 13:
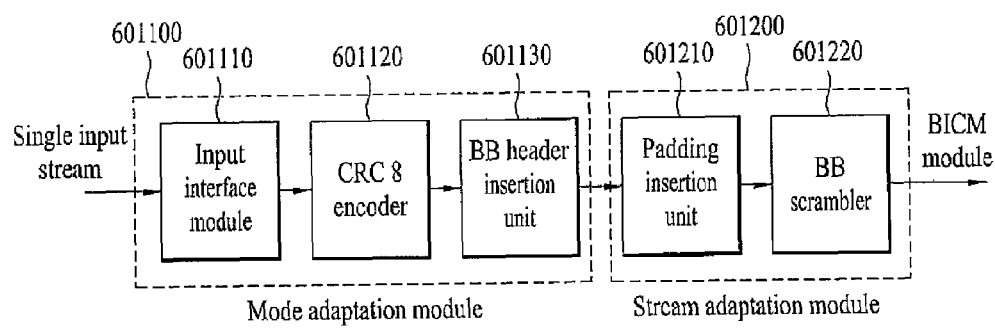
FIG. 13 shows an input processor of a broadcast signal transmitter according to an embodiment of the present invention.
Figure 14:
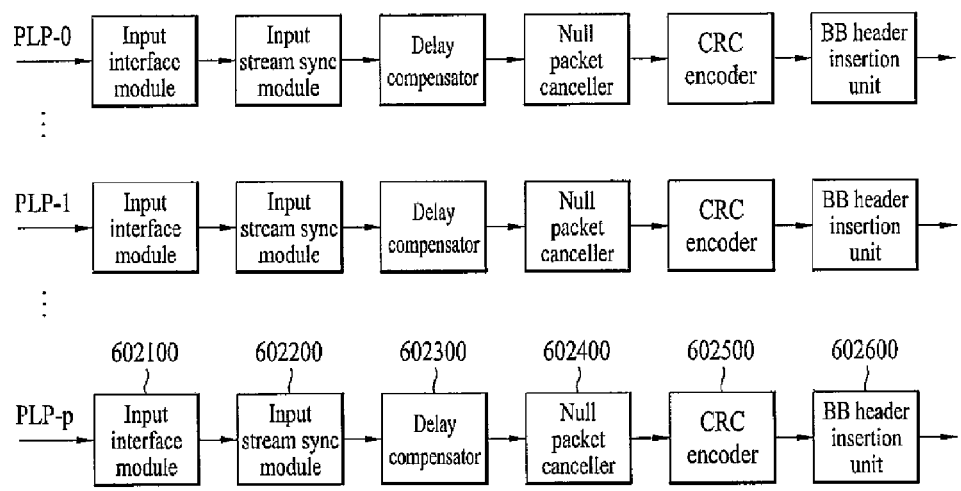
FIG. 14 shows a mode adaption module implementing a plurality of PLP as an input processor according to an embodiment of the present invention.

FIG. 13 and FIG. 14 show an input process that the broadcast signal transmitter comprises in common. Further description is as follows.

FIG. 13 shows an input processor of the broadcast signal transmitter according to an embodiment.

The input process 101200 in FIG. 1 is shown as an embodiment in FIG. 13 performing only one PLP. The input processor in FIG. 13 comprises a mode adaptation module 601100 and a stream adaptation module 601200. The mode adaptation module 601100 further comprises an input interface module 601110, a CRC-8 encoder 601120 and a BB header insertion module 601130, wherein a stream adaptation module 1020 comprises a padding insertion module 601210 and a BB scrambler 601220.

The input interface module 601110 in the input processor performing a single PLP performs mapping by distinguishing the input bit stream in a logical unit to perform FEC (BCH/LDPC) encoding at the end of the BICM encoder. The CRC-9 encoder 601120 performs CRC encoding in the mapped bit stream and a BB header insertion module 1050 inserts a BB header in the data field. In that case, the BB header includes all adaptation type (TS/GS/IP) information, user packet length information, and data field length.

Also, if the input data does not have a BB frame for FEC encoding, the stream adaptation block 601200 generates a padding insertion unit and a Pseudo Random Binary Sequence (PRBS) and includes a BB scrambler 601220 randomizing data computed by the PRBS and XOR. Such a move by the BB scrambler 601220 can ultimately lower the Peak-to-Average Power Ratio of the OFDM-modulated signal.

FIG. 14 shows a mode adaptation module implementing a plurality of PLP as an input processor according to an embodiment of the present invention.

FIG. 14 shows a mode adaptation module as an input processor of the broadcast signal transmitter performing a plurality of PLP. The mode adaptation module in FIG. 14 comprises a plurality of input interface modules 602100 performing mode adaptation for each PLP in parallel, an input stream synchronizer 602200, a compensating delay module 602300, null packet deletion module 602400, a CRC-0 encoder 602500, and a BB header insertion unit 602600. The description of the input interface module 6021000, the CRC-8 encoder 602500 and the BB header insertion unit 602600 is omitted.

The input stream synchronizer 602200 inserts timing information necessary for restoring input stream clock reference information (ISCR), transport stream (TS) or generic stream (GS). The compensating delay module 602300 synchronizes a group of PLP based on the timing information. The null packet deletion module (602400) deletes null packet that is unnecessarily transmitted and inserts the number of the deleted null packets based on the deleted position.

Figure 15:
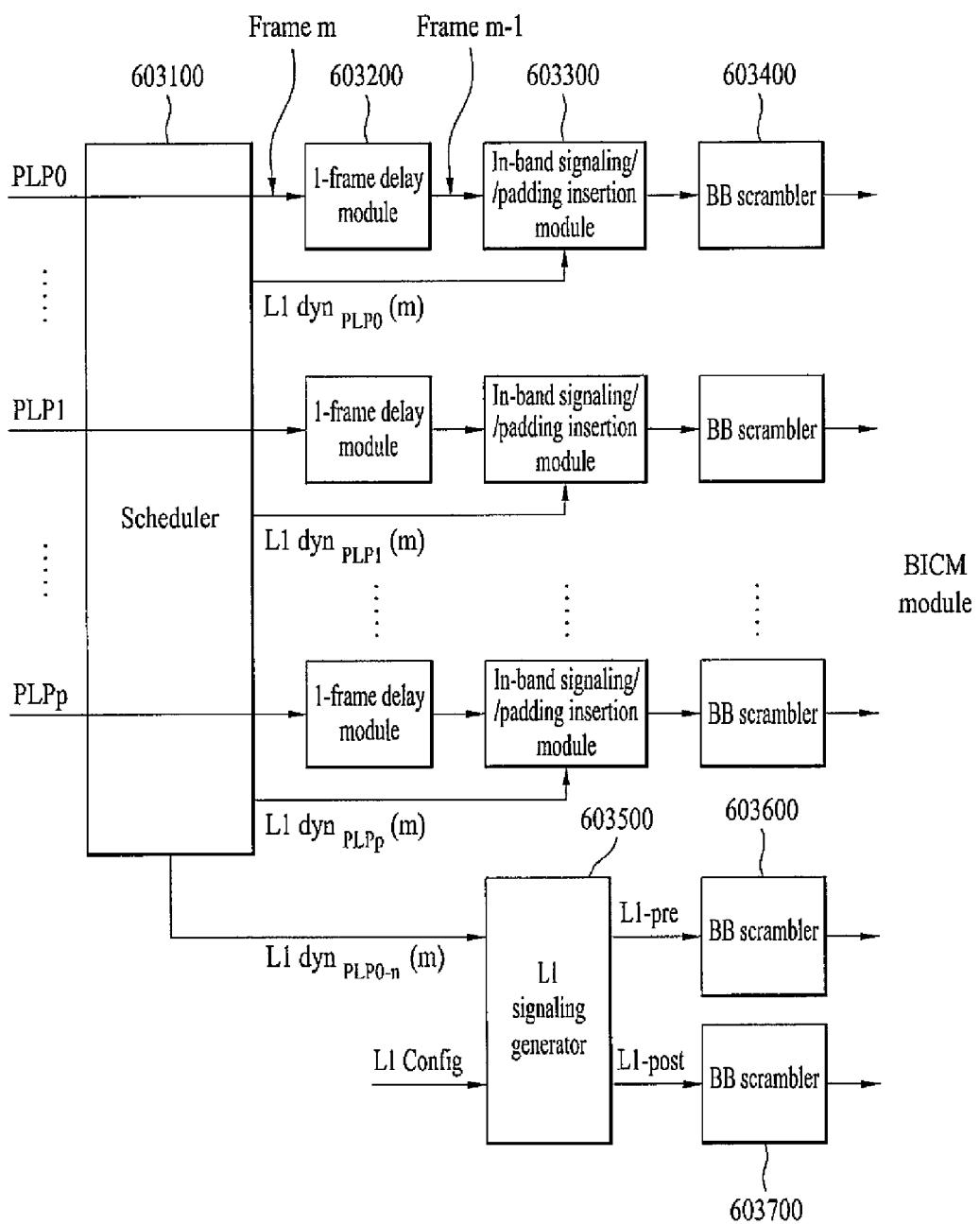
FIG. 15 shows a stream adaption module implementing a plurality of PLP as an input processor according to an embodiment of the present invention.

FIG. 15 shows a stream adaptation module implementing a plurality of PLP as an input processor according to an embodiment of the present invention.

The stream adaptation module in FIG. 17 receives PLP-based data in which mode adaptation of FIG. 14 was performed from the mode adaptation module of FIG. 14, such that it can perform stream adaptation as shown in the following description.

The scheduler 603100 performs scheduling for the MIMO transmitting system using a plurality of antennas including dual polarity and generates parameters for a demultiplexer, a cell interleaver, a time interleaver. Also, the scheduler 603100 transmits L1-dynamic signaling information for the current frame besides in-band signaling, and performs cell mapping based on the scheduling.

Figure 29:
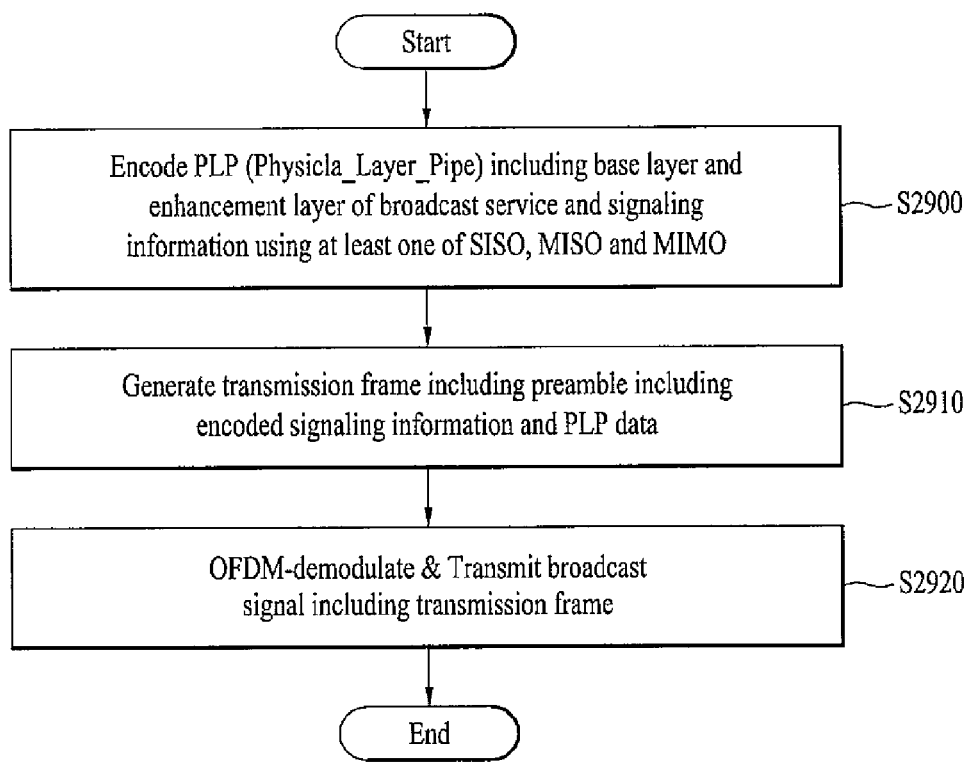
FIG. 29 is a flowchart illustrating a method for transmitting a broadcast signal according to an embodiment of the present invention.

A plurality of a 1-frame delay module 603200 executing a plurality of PLP delays one frame so that scheduling information of the next frame for in-band signaling can be included in the current frame. A plurality of in-band signaling/padding insertion module inserts L1-dynamic signaling information to the delayed data. Also, if there is any room for padding, the in-band signaling/padding insertion module 603300 inserts padding bits and in-band signaling information into the padding area. And, the BB scrambler 603400 generates a pseudo random binary sequence (PRBS) as shown in FIG. 29 and randomizes the data by computing the PRBS with XOR.

The stream adaption module in FIG. 15 generates L1-signaling information transmitted by the preamble symbol of the frame or the spread data symbol. Such L1-signaling information includes L1-pre signaling information and L1-post signaling information. The L1-pre signaling information includes parameters necessary for performing the L1-post signaling information and static L1-signaling information, and the L1-post signaling information includes the static L1-signaling information and dynamic L1-signaling information. The L1-signaling generator 603500 can transmit the generated L1-pre signaling information and L1-post signaling information. The transmitted L1-pre signaling information and L1-post signaling information is scrambled by each BB scramble 603600, 603700. Also, according to another embodiment, the L1 signaling generator 603500 transmits L1-signaling information having L1-pre signaling and L1-post signaling information and scrambles L1-signaling information transmitted by one BB scrambler.

FIG. 16 to FIG. 19 shows a structure block of a broadcast signal transmitter according to an embodiment. Further description is as follows.

Figure 16:
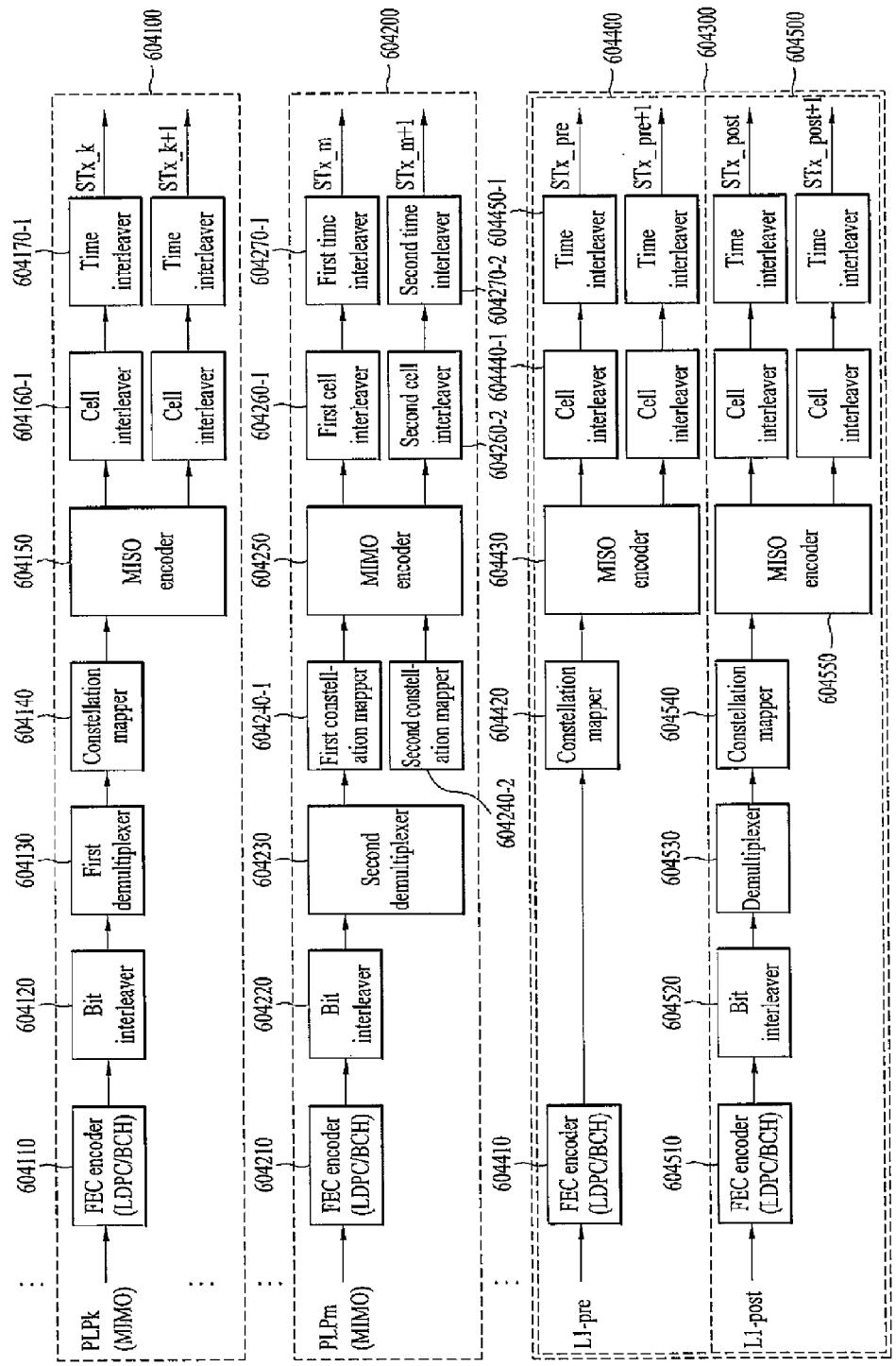
FIG. 16 shows a BICM encoder according to an embodiment of the present invention.

FIG. 16 shows a BICM encoder according to an embodiment of the present invention.

The BICM encoder shown in FIG. 16 is an embodiment of the BICM encoder 101300 in FIG. 1.

The BICM encoder according to the first embodiment performs bit-interleaving in a plurality of PLP data after performing input-processing, L1-pre signaling information, and L1-post signaling information, and encoding for correcting errors.

Also, the BICM encoder independently performs MISO or MIMO encoding in PLP data. In addition, the BICM encoder according to a first embodiment of the present invention may perform MISO encoding and MIMO encoding upon completion of constellation mapping.

The BICM encoder in FIG. 16 includes a first BICM encoding block 607100 performing MISO encoding in PLP data, a second BICM encoding block 607200 performing MIMO encoding in PLP data, and a third BICM encoding block 607300 performing MIMO encoding in signaling information. The third BICM encoding block 604300 performing MIMO encoding in signaling information. However, as the signaling information includes information necessary for restoring PLP data in a frame from the receiver, more robustness is required between the transmitter and receiver compared to PLP data. Thus, an embodiment of the present invention is the MISO process performing the signaling information. The description of data performing process for each block is as follows.

First, the first BICM encoding block 604100 includes a BICM encoder 604100, a FEC (Forward Error Correction) encoder 604110, a bit-interleaver 604120, a first demultiplexer 604130, a constellation mapper 604140, a MISO encoder 604150, a cell interleaver 604160-1, 604160-2 and a time interleaver 604170-1, 604170-2.

The FEC encoder 604110 performs BCH encoding and LDPC encoding in PLP data after performing input processing with redundancy to correct channel errors from the receiver. The bit-interleaver 604120 prepares to have robustness for bust errors by performing bit-interleaving in the FEC-encoded PLP data by each FEC block unit. In that case, the bit interleaver can perform bit interleaving by using two FEC block units. When using two FEC blocks, a pair of cell units may be generated from two different FEC blocks in the frame-builder. Thus, the broadcast signal receiver may improve the reception by ensuring the diversity of FEC blocks.

A first demultiplexer 604130 can perform demultiplexing in the bit-interleaved PLP data into one FEC block unit. In that case, the first demultiplexer 604130 uses two FEC blocks and performs demultiplexing. When using the two blocks, pairs of cells in the frame builder may be generated from different FEC blocks. Thus, the receiver can improve reception by ensuring the diversity of FEC blocks.

The constellation mapper 604140 performs mapping in the bit-demultiplexed PLP data into symbol units. In that case, the constellation mapper 604140 can rotate a certain angle depending on the modulation type. The rotated constellation mappers can be expressed in I-phase (In-phase) and Q-phase (Quadrature-phase), and the constellation mappers can delay only the Q-phase for a certain value. Then, the constellation mapper 604140 performs re-mapping in the In-phase element with the delayed Q-phase element.

The MISO encoder 604150 performs MISO encoding by using MISO encoding matrix in the time-interleaved PLP data and transmits MISO PLP data through two routes (STx_k, STx_k+1). The present invention includes an OSTBC (Orthogonal Space-Time Block Code)/OSFBC(Orthogonal Space Frequency Block Code/Alamouti code) as an embodiment of a MISO encoding method.

The cell interleaver 604160-1, 604160-2 performs interleaving in the re-mapped data into cell units, and the time interleaver 604170-1, 604170-2 performs interleaving in the cell-interleaved PLP data into time units. In that case, the time interleaver 604160 uses two FEC blocks for interleaving. Through this process, as pairs of cells are generated from two different FEC blocks, the receiver can improve reception by ensuring the diversity of the FEC blocks.

The second BICM encoding block 604200 includes a FEC encoder 604210, a bit-interleaver 604220, a second demultiplexer 604230, a first constellation mapper 604240-1 and a second constellation mapper 604240-2, and a MIMO encoder 604250, a first cell interleaver 604260-1 and a second interleaver 604260-2, and a first time interleaver 604270-1 and a second cell interleaver 604270-2.

The FEC encoder 604210 and the bit-interleaver 604220 can perform the same function as the FEC encoder 604110 and the bit-interleaver 604120 of the MISO method.

The second demultiplexer 604230 can transmit the PLP data by demultiplexing to two routes necessary for MIMO transmission in addition to performing the same function as the first demultiplexer 604130 of the MISO method. In that case, the character of the data transmission for each route may be different. Thus, the second demultiplexer can randomly allocate the bit-interleaved PLP data into each route.

The first constellation mapper 604240-1 and the second constellation mapper 604240-2 can operate the same function as the constellation mapper 604140 of the MISO method.

The MIMO encoder 604270 performs MIMO encoding in the time-interleaved PLP data from by using MIMO encoding matrix and transmit MIMO PLP data to two routes (STx_m, STx_m+1). The MIMO encoding matrix of the present invention includes a spatial multiplexing, a Golden code (GC), a full-rate full diversity code, and a linear dispersion code.

The first cell interleaver 604260-1 and the second cell interleaver 604260-2 can perform cell-interleaving in only a half of the PLP data in one of the FEC blocks from the routes. Thus, the first cell interleaver 604260-1 and second cell interleaver 604260-2 can operate the same as the one cell interleaver. Also, in order to execute data from a plurality of routes, as the first cell interleaver 604260-1 and the second cell interleaver 604260-2 are not allocated additional memory, there is an advantage of performing cell interleaving by using the memory of the one cell interleaver.

The first time interleaver 604270-1 and the second time interleaver 604270-2 can operate the same as the time interleaver 604170-1, 604170-2 of the MISO method. In that case, the first time interleaver 604270-1 and the second time interleaver 604270-2 can be performed the same time interleaving or a different time interleaving.

L1-signaling information includes L1-pre signaling information and L1-post signaling information. It can independently perform MISO encoding in the L1-pre signaling information and L1-post signaling information.

Thus, the third BICM encoding block 604300 includes a first encoding block 604400 executing the L1-pre signaling information and the second encoding block 604500 executing the L1-post signaling information.

The first encoding block 604400 includes an FEC encoder 604410, a constellation mapper 604420, a MISO encoder 604430, cell interleavers 604440-1, 604440-2, and time interleavers 604450-1, 604450-2. The second encoding block 604500 includes a FEC encoder 604510, a bit interleaver 604520, demultiplexer 604530, a constellation mapper 604540, a MISO encoder 604560, cell interleavers 604560-1, 604560-2, and time interleavers 604570-1, 604570-2.

The L1-pre signaling information includes information necessary for decoding L1-post signaling information and the L1-post signaling information includes information necessary for restoring data transmitted from the receiver.

That is, the receiver needs to decode the L1-pre signaling information quickly and correctly for decoding the L1-signaling information and the data. Thus, the receiver of the present invention does not perform bit-interleaving and demultiplexing for the L1-pre signaling information in order to perform the fast decoding.

The description of first encoding block 604400 and the second encoding block 604500 is omitted because they perform the same function as the first BICM block 604100.

As a result, to execute the L1-pre signaling information, the first encoding block 604400 performs MISO encoding in the L1-pre signaling information and transmits the free-signaling data to two routes (STx_pre, STx_pre+1). Also, to execute L1-post signaling information the second encoding block 604500 performs MISO encoding in the L1-post signaling information and transmits the L1-post signaling data to two routes (STx_post, STx_post+1).

Figure 17:
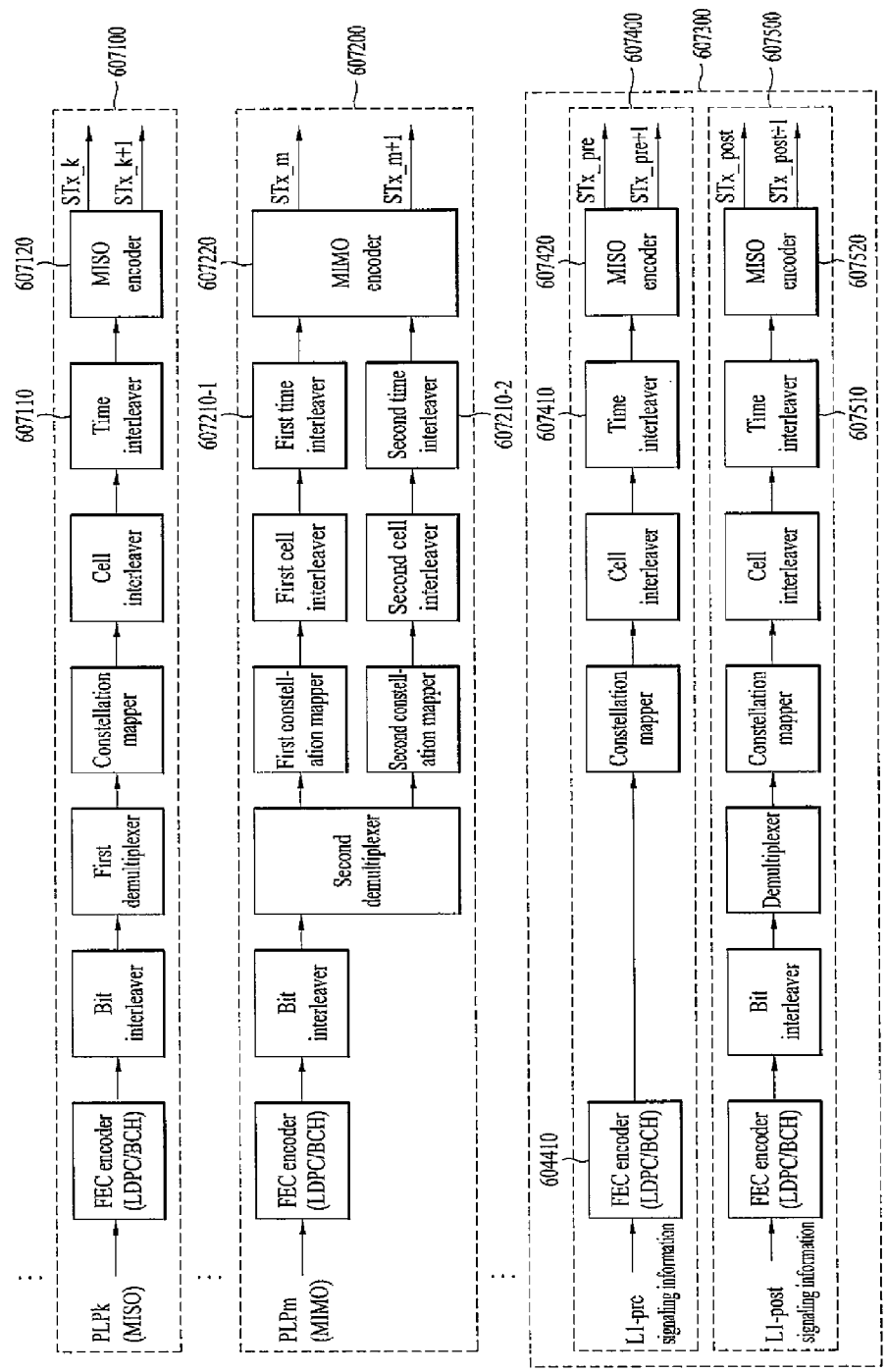
FIG. 17 shows a BICM encoder according to another embodiment of the present invention.

FIG. 17 shows a BICM encoder according to another embodiment of the present invention.

The BICM encoder shown in FIG. 17 according to the second embodiment is another embodiment of the BICM encoder 101300 in FIG. 1.

The BICM encoder according to the second embodiment performs bit-interleaving in a plurality of PLP data after performing input-processing, L1-pre signaling information, and L1-post signaling information, and encoding for correcting errors.

Also, the BICM encoder independently performs MISO and MIMO encoding in PLP data.

The BICM encoder in FIG. 17 includes a first BICM encoding block 607100 performing MISO encoding in PLP data, a second BICM encoding block 607200 performing MIMO encoding in PLP data, and a third BICM encoding block 607300 performing MIMO encoding in signaling information.

As the BICM encoding blocks in FIG. 17 operate the same as the BICM encoding blocks in FIG. 16, further description of them is omitted. However, the BICM encoding blocks of the MISO encoder 607120, 607420, 607520 and the MIMO encoder 607220 are positioned at the end of the time interleaver 607110, 607210-1-2, 607410 and 607510 which is distinguishable from the BICM encoding blocks according to the first embodiment.

Although not illustrated in FIG. 17, the BICM encoder according to the third embodiment of the present invention may include a first BICM encoding block for processing of MISO PLP data to be MISO encoded, a second BICM encoding block for processing of MIMO PLP data to be MIMO encoded, and a third BICM encoding block for processing of signaling information to be MISO encoded. The BICM encoding blocks according to the third embodiment operate in the same way as the BICM encoding blocks according to the first embodiment illustrated in FIG. 16, and thus, a detailed description thereof is omitted. However, the BICM encoding blocks according to the third embodiment is different from the BICM encoding blocks according to the first embodiment in that the BICM encoding blocks according to the third embodiment do not include a MISO encoder and a MIMO encoder.

In addition, the BICM encoder according to the fourth embodiment of the present invention is almost the same as the BICM encoder according to the third embodiment, except that the BICM encoder performs MIMO encoding on MIMO PLP data to be processed using the MIMO scheme. That is, the BICM encoder according to the fourth embodiment of the present invention may include a first BICM encoding block for processing MISO PLP data to be MISO encoded, a second BICM encoding block for processing of MIMO PLP data to be MIMO encoded, and a third BICM encoding block for processing of signaling information to be MISO encoded. Here, the third BICM encoding block may include a first encoding block for processing of L1-pre signaling information and a second encoding block for processing of L1-post signaling information. In particular, the first BICM encoding block according to the fourth embodiment may not include a MISO encoder and the second 2 BICM encoding block may include a MIMO encoder. In this case, the MIMO encoder may be positioned behind a time interleaver as in the first embodiment, or may be positioned behind a constellation mapper according to the second embodiment as in the second embodiment. The position of the MIMO encoder may be changed according to a designer's intention.

Figure 18:
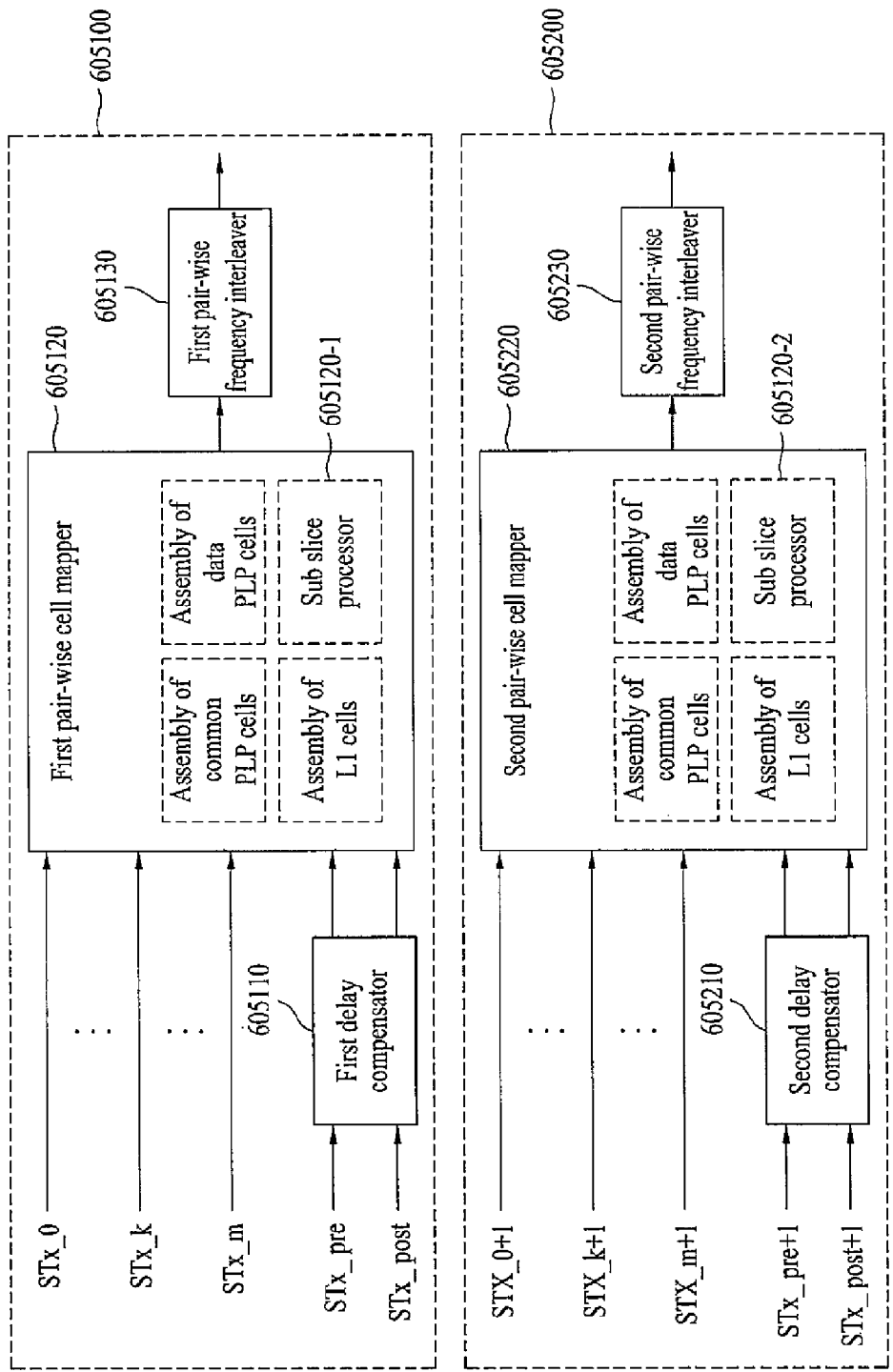
FIG. 18 shows a frame builder encoder according to an embodiment of the present invention.

FIG. 18 shows a frame builder according to an embodiment of the present invention.

The frame builder shown in FIG. 18 is an embodiment of the frame builder 101400 shown in FIG. 1.

The first BICM encoding block 604100 transmits MISO PLP data to two routes (STx_k, STx_K+1) and the second BICM encoding block 604200 transmits MIMO PLP data to two routes (STx_m, STx_m+1). Also, the third BICM encoding block 604300 transmits the L1-pre signaling information and the L1-post signaling information to two routes (STx_pre, Stx_pre_1 and STx_post, STx_post+1).

Each data is inputted into the frame builder. In that case, as shown in FIG. 18, the frame builder includes a first route receiving the BICM encoded data from STx_0 to STx_post, and a second route receiving the BICM encoded data from STx_0+1 to Stx_post+1. The data received in the first route is transmitted through a first antenna (Tx_1) and the data in the second route is transmitted through a second antenna (Tx_2).

As shown in FIG. 18, the frame builder according the first embodiment includes a first frame building block 605100 executing the data from the first route and a second frame building block 605200 executing the data from the second route. The first frame building block 605100 includes a first delay compensator 604110, a first pair-wise cell mapper 605120, and a first pair-wise frequency interleaver 605300-1, and a second frame building block 605200 includes a second delay compensator 605100-2 executing the data from the second route, a second pair-wise cell mapper 605200-2, and a second pair-wise frequency interleaver 605300-2.

The first pair-wise cell mapper 605120 and the first pair-wise frequency interleaver 605130, or the second pair-wise cell mapper 605120 and the second pair-wise frequency interleaver 605310 operate independently but the same functions in the first and the second routes respectively.

A method of performing data in the first frame building block 605100 and the second frame building block 605200.

The first delay compensator 605110 and the second delay compensator 605110 can compensate the L1-pre signaling data or the L1-post signaling data for the delay in the first frame and by the BICM encoder 604300. The L1-signaling information can include information not only in the current frame but also in the next frame. Thus, during the input processing, the L1-signaling information can be delayed one frame as opposed to PLP data inputted in the current frame. Through this process, one frame of the L1-signaling information having information about the current and the next frames.

The first pair-wise cell mapper 605120 and the second pair-wise cell mapper 605220 can perform mapping in the PLP data and the L1-signaling data in symbol units into cell units in a frame in the sub-carrier of the OFDM symbols.

In that case, the PLP data includes a common PLP DATA, a MISO/MIMO encoded PLP data and a sub-slice processor module 605120-1-2 performs frame-mapping in the PLP data in cell units for the diversity effect.

Also, the first pair-wise cell mapper 605120 and the second pairwise cell mapper 605220 can perform frame-mapping in two consecutive inputted cells in pairs.

For the better restoration performance of MISO signals, coherence between MSI transmitting channels should be secured when performing MISO encoding. Thus, in order to secure coherence, the first pair-wise cell mapper 605120 and the second pair-wise cell mapper 605220 pair up cells generated from the same PLP and perform OFDM modulating in the paired-up cells. Then coherence between the channels will be maximized. In other words, according to an embodiment of the present invention, as the MISO encoder is positioned in the front of the BICM encoder, the structure of the frames is in pairs considering such MISO encoding process.

As mentioned above, when performing bit-interleaving or time interleaving by the bit-interleaver 604120 and the time interleaver 604160 using two FEC blocks, two paired up cells can be generated from two different FEC blocks. As the receiver ensures diversity, higher reception can be obtained. The first pair-wise frequency interleaver 605130 and the second pair-wise frequency interleaver 605230 perform frequency interleaving in the data in cell units from each route and transmits the frequency-interleaved data to the OFDM generator through each route.

In that case, the first pair-wise frequency interleaver 605130 and the second pair-wise frequency interleaver 605230 pair up two consecutive cells in interleaving units and then perform frequency interleaving. This is to maximize coherence between channels.

The frame builder illustrated in FIG. 18 may be applied to the first and second embodiments of the present invention. According to the third and fourth embodiments of the present invention, the frame builder may include a first cell mapper and a second cell mapper instead of the first pair-wise cell mapper 605120 and the second pair-wise cell mapper 605220, and include a first frequency interleaver and a second frequency interleaver instead of the first pair-wise frequency interleaver 605130 and the second pair-wise frequency interleaver 605230.

According to the third embodiment, after frequency interleaving, that is, after MISO/MIMO encoding in the OFDM generating process, MIMO/MISO encoding can be done in OFDM symbol units. If the MISO PLP data cells and MIMO PLP data cells are mapped in the same OFDM symbol, the OFDM generator cannot perform MISO/MIMO encoding independently. Thus, the first cell mapper and the second cell mapper dose not map the MISO/MIMO PLP data in the same OFDM symbol.

Also, in order to simplify the transmitting system, the first and second cell mappers according to the third embodiment operate the same.

But, although the MISO PLP data, L1-pre and post signaling data is transmitted from the first route only, the MIMO PLP data can be from the first and the second routes. Therefore, depending on the data inputted, the performance of the cell mapper is different.

More detailed description is as follows.

First, the first cell mapper and the second cell mapper receive the same MISO PLP data from the first route and the same L1-pre and post signaling data from the delay compensator. In that case, the first cell mapper and the second cell mapper perform mapping in the inputted data to be allocated into a sub-carrier of the OFDM symbol.

Second, among the first cell mapper and the second cell mapper, the first cell mapper only receives the MISO PLP data and the delayed compensated L1-pre and post signaling data. In that case, the second cell mapper performs mapping only for the MIMO PLP.

The first frequency interleaver and the second frequency interleaver perform frequency interleaving in the inputted data by cell units and transmits the data to the OFDM generator.

In that case, the first frequency interleaver and the second frequency interleaver perform frequency interleaving in the OFDM symbol into interleaving units. Also, if the second cell mapper 619210 receives MIMO PLP data only, the second frequency interleaver also performs interleaving in MIMO PLP data only.

Figure 19:
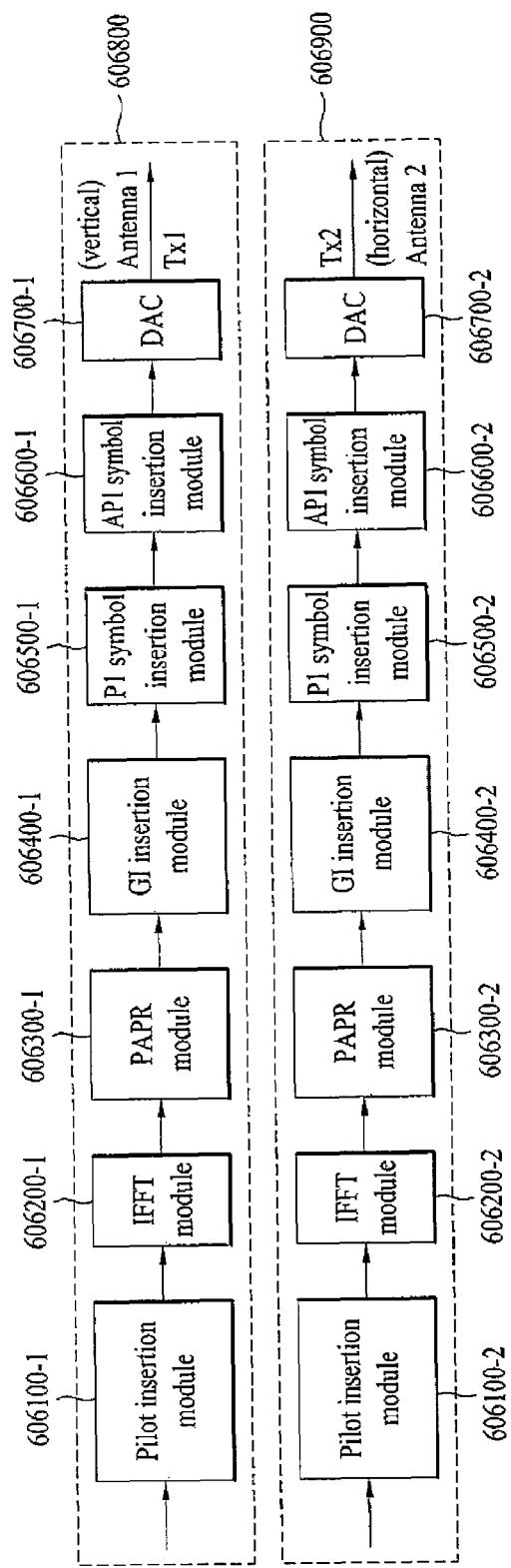
FIG. 19 shows an OFDM generator according to an embodiment of the present invention.

FIG. 19 shows an OFDM generator according to an embodiment of the present invention.

The OFDM generator in FIG. 19 is an embodiment of the OFDM generator 101500 shown in FIG. 1.

The present invention transmits broadcast signals by the MISO/MIMO method through two antennas. The OFDM generator in FIG. 19 receives and demodulates the broadcast signals through a first and a second route. It then transmits the signals to two antennas (Tx1, Tx2).

A first OFDM generating block 606800 modulates the broadcast signals through the first antenna (Tx1) and a second OFDM generating block 606900 modulates the broadcast signals through the second antenna (TX2).

If channel correlation between the first and second antennas is large, transmitted signals can apply polarity depending on the channel correlation. In the present invention, such a method is called polarity multiplexing MIMO. The first antenna is called "vertical antenna" and the second antenna is called "horizontal antenna". The first OFDM generating block 606800 performs OFDM modulating in broadcast signals through the first antenna (Tx1) and the second transmitter 606900 performs OFDM modulating in the broadcast signals from the first route and transmits the signals to the second antenna (Tx2).

Modules including the first OFDM generating block 606800 and the second OFDM generating block 606900 are as follows.

The first OFDM generating block 606800 includes a pilot insertion module 606100-1, an IFFT module 606200-1, a PAPR module 606300-1, a GI insertion module 606400-1, a P1 symbol insertion module 606500-1, an AP1 symbol insertion module 606600-1 and a DAC 606700-1, wherein modules in the first transmitting unit 606800 operate the same functions.

The second OFDM generating block 606900 includes a pilot insertion module 606100-2, an IFFT module 606200-2, a PAPR module 606300-2, a GI insertion module 606400-2, a P1 symbol insertion module 606500-2, an AP1 symbol insertion module 606600-2 and a DAC 606700-2, wherein modules in the first transmitting unit 606800 operate the same functions.

Thus, modules in the first OFDM generating block 606800 will be illustrated in more detail. The pilot insertion module inserts a pilot of the predetermined pilot pattern into a frame and transmits it to the IFFT module 606200-1. The pilot pattern information is transmitted with AP1 signaling information or L1-signaling information.

The IFFT module 606200-1 performs IFFT algorithm in the signals and transmits them to the PAPR module 606300-1.

The PAPR module 606300-1 reduces PAPR of the signals in a time domain and transmits them to the GI insertion module 606400-1. Also, feedback on necessary information based on the PAPR reduction algorithm is given to the pilot insertion module 606100-1.

The GI insertion module 606400-1 copies the end of the effective OFDM symbol, inserts guard intervals in cyclic prefix to each OFDM symbol, and transmits them to the P1 symbol insertion module 606500-1. The GI information can be transmitted through the P1 signaling information or L1-pre signaling information.

The P1 and AP1 symbol are inserted in every frame of the P1 insertion module in the OFDM generator. That is, the P1 insertion module can insert more than two preamble symbols in every frame. When using more than two preamble symbols, burst fading that can happen in the mobile fading conditions will be more strengthened and signal detection performance will be improved.

The P1 symbol insertion module 606500-1 inserts a P1 symbol in the beginning of each frame and transmits it to the AP1 symbol insertion module 606600-1.

The AP1 symbol insertion module 606600-1 inserts an AP1 symbol at the end of the P1 symbol and transmits it to the DAC 606700-1.

The DAC 606700-1 converts the signal frame having the P1 symbol to an analog signal and transmits it to the transmitting antenna (Tx1).

The OFDM generator shown in FIG. 19 may be applied to the first and second embodiments of the present invention.

Although not shown in FIG. 19, according to the third embodiment of the present invention, the OFDM generator may include a MISO/MIMO encoder, a first OFDM generating block, and a second OFDM generating block. The first OFDM generating block and the second generating block according to the third embodiment of the present invention may perform the same operations as those of the first OFDM generating block 606800 and the second OFDM generating block 606900.

If the input data is MISO PLP data or L1-pre and post signaling data from the first and second routes, the MIMO/MISO encoder 603100 performs MISO encoding in the data into OFDM symbol units by using MISO encoding matrix and transmits it to the first and second generating blocks 620200, 620300. In that case, the input data is transmitted from either of the first or second route. According to an embodiment, the MISO encoding matrix can include an OSTBC (Orthogonal Space-Time Block Code)/OSFBC(Orthogonal Space Frequency Block Code/Alamouti code).

If data from the first and second routes is MIMO PLP data, the MIMO/MISO encoder performs MIMO encoding in the data into OFDM symbol units by using MIMO encoding matrix and transmits it to the first and second OFDM generating blocks. The MIMO encoding matrix of the present invention includes a spatial multiplexing, a Golden code (GC), a full-rate full diversity code, and a linear dispersion code. Also, the MIMO encoder performs MIMO encoding by using MIMO encoding matrix.

In addition, the OFDM generator according to the fourth embodiment of the present invention may include a MISO encoder, a first OFDM generating block, and a second OFDM generating block. The first OFDM generating block and the second generating block according to the fourth embodiment of the present invention may perform the same operations as those of the first OFDM generating block 606800 and the second OFDM generating block 606900.

The MISO encoder performs MISO encoding in the frequency-interleaved MISO PLP data, L1-pre signaling data and L1-post signaling data. The MISO encoder operates the same as the MIMO/MISO encoder according to the third embodiment. In addition, if the MIMO encoded MIMO PLP data is inputted, it may be bypassed and the MISO encoder may perform MISO encoding in the MIMO encoded MIMO PLP data.

Figure 20:
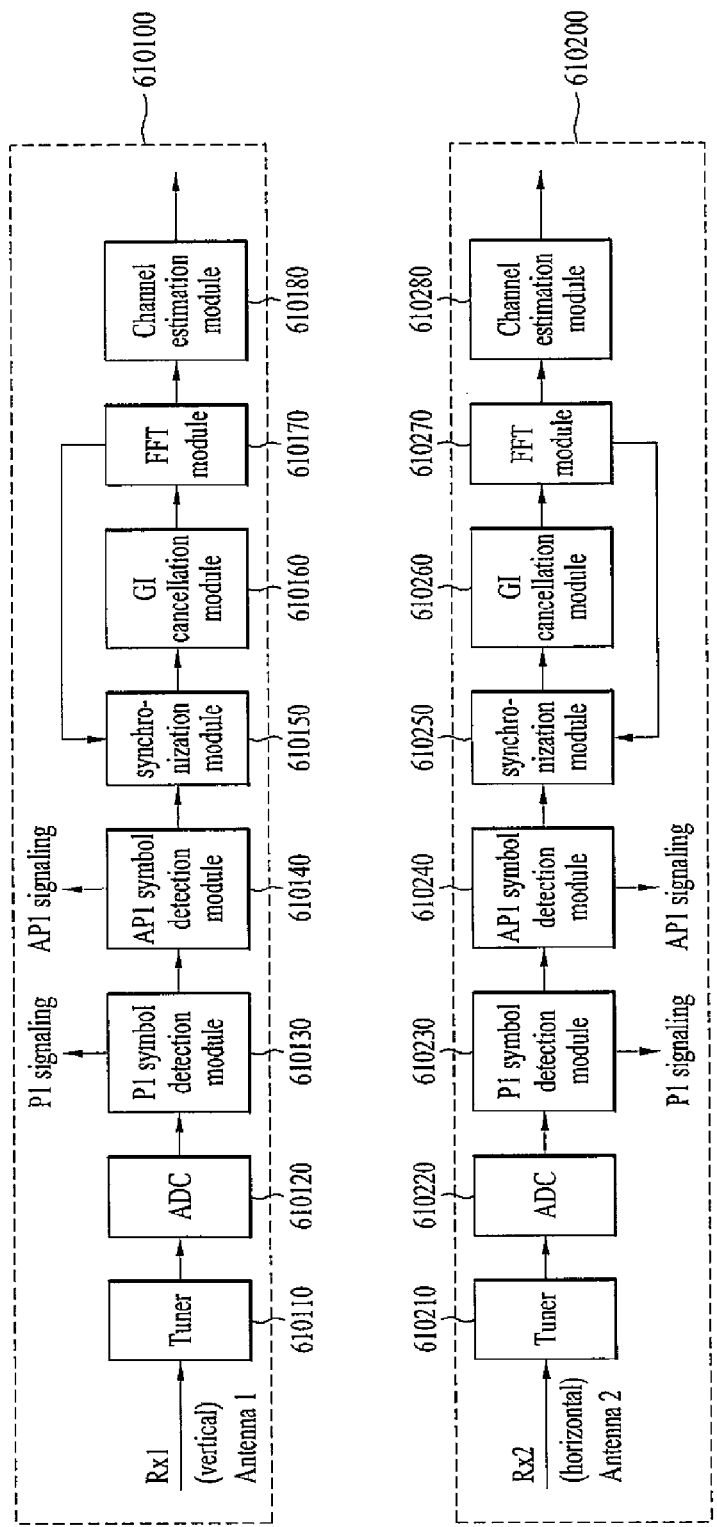
FIG. 20 shows an OFDM demodulator according to an embodiment of the present invention.
Figure 24:
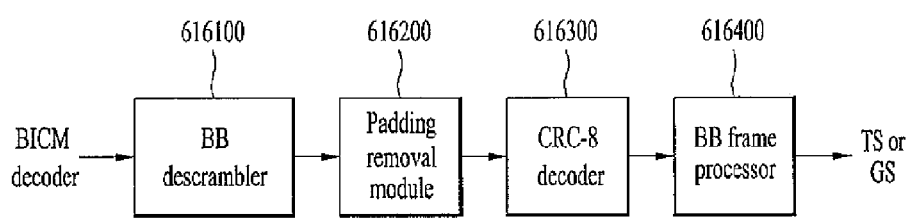
FIG. 24 shows an output processor according to an embodiment of the present invention.

FIG. 20 and FIG. 24 show a structure block of the broadcast signal receiver according to an embodiment of the present invention.

FIG. 20 shows an OFDM demodulator according to an embodiment of the present invention.

FIG. 20 shows a drawing of the OFDM demodulator according to an embodiment of the OFDM demodulator 107100 illustrated in FIG. 2.

According to an embodiment of the present invention, the present invention requires two antennas, Rx1 and Rx2, to receive transmitted signals by MIMO/MISO. The OFDM demodulator shown in FIG. 20 can perform OFDM demodulation through the Rx1 and Rx2 antennas.

A block demodulating transmitted signals through a first antenna (Rx1) is called a first OFDM demodulating block 610100 and a block demodulating transmitted signals through a second antenna (Rx2) is called a second OFDM demodulating block 610200.

In addition, the present invention can utilize polarity multiplexing MIMO according to an embodiment of the present invention. The first OFDM demodulating block 610100 performs OFDM demodulation in the broadcast signals transmitted through the first antenna (Rx1) and outputs the signals by a frame demapper to a first route, and the second demodulating block 610200 performs OFDM demodulating in the broadcast signals transmitted through the second antenna (Rx2) and outputs the signals by a frame demapper to a second route.

Also, the OFDM according to the first embodiment in FIG. 20 can perform the reverse process of the OFDM generator illustrated in FIG. 19.

The first OFDM demodulating block 610100 and the second OFDM demodulating block 610200 included in OFDM demodulator according to an embodiment of the present in invention including are as follows.

The first OFDM demodulating block 610100 includes a tuner 610110, an ADC 610120, a P1 symbol detection module 610130, an AP1 symbol detection module 610140, a synchronizing module 610150, a GI cancellation module 610160, a FFT module 610170 and a channel estimation module 610180.

The second OFDM demodulating block 610200 comprises a tuner 610210, an ADC 610220, a P1 symbol detection module 610230, an AP1 symbol detection module 610240, a synchronizing module 610250, a GI cancellation module 610260, a FFT module 610270 and a channel detection module 610280, and operates the same as the first OFDM demodulating block 610100.

Thus, modules in the first OFDM demodulating block 610100 will be further illustrated.

The tuner 610110 receives broadcast signals by selecting a frequency range and transmits it to the ADC 610120 by compensating the size of the signal.

The ADC 610120 coverts analog broadcast signals into digital signals and transmits them to the P1 symbol detection module 610130.

The P1 symbol detection module 610130 extracts P1 symbols in the P1 signaling information and decodes the P1 signaling information. Also, the P1 symbol detection module 610130 transmits the decoded P1 signaling information to the synchronizing module 610150 and a system controller (not shown in the drawing). The system controller determines which frame the received signal has by using the decoded P1 signaling information and controls other devices.

The AP1 symbol detection module 610140 extracts AP1 symbols in the AP1 signaling information and decodes the AP1 signaling information. Also, the AP1 symbol detection module 610140 transmits the decoded AP1 signaling information to the synchronizing module 610150 and a system controller (not shown in the drawing). The system controller determines the pilot pattern information in the current frame and L1-pre spread interval information by using the decoded AP1 signaling information.

The synchronizing module 610150 performs time and frequency synchronizing by using the decoded P1 signaling information and the AP1 signaling information.

The GI cancellation module 610160 deletes guard intervals included in the synchronized signals and transmits them to the FFT module 610170.

The FFT module 610170 converts the signals from the time domain to the frequency domain by performing FFT algorithm.

The channel detection module 610180 detects a transmitting channel from the transmitting antenna to the receiving antenna by using pilot signals having the converted signals. Then, the channel detection module 610180 can additionally perform equalizing for each of the received data. Signals that are converted into the frequency domain will be inputted in the frame demapper.

The OFDM demodulator illustrated in FIG. 20 may be applied to the first and second embodiments of the present invention.

Although not illustrated in FIG. 20, according to the third embodiment of the present invention, the OFDM demodulator may include a first OFDM demodulating block, a second OFDM demodulating block, and a MISO/MIMO decoder. The first OFDM demodulating block and the second OFDM demodulating block according to the third embodiment of the present invention may perform the same operations as those of the first OFDM demodulating block 610100 and the second OFDM demodulating block 610200. However, the OFDM demodulator according to the third embodiment may include a MIMO/MISO decoder 626300, a detailed operation of which will be described below.

The OFDM according to the fourth embodiment of the present invention may include a first OFDM demodulating block, a second OFDM demodulating block, and a MISO decoder. The first OFDM demodulating block and second OFDM demodulating block according to the fourth embodiment of the present invention may perform the same operations as those of the first OFDM demodulating block 610100 and the second OFDM demodulating block 610200.

Figure 21:
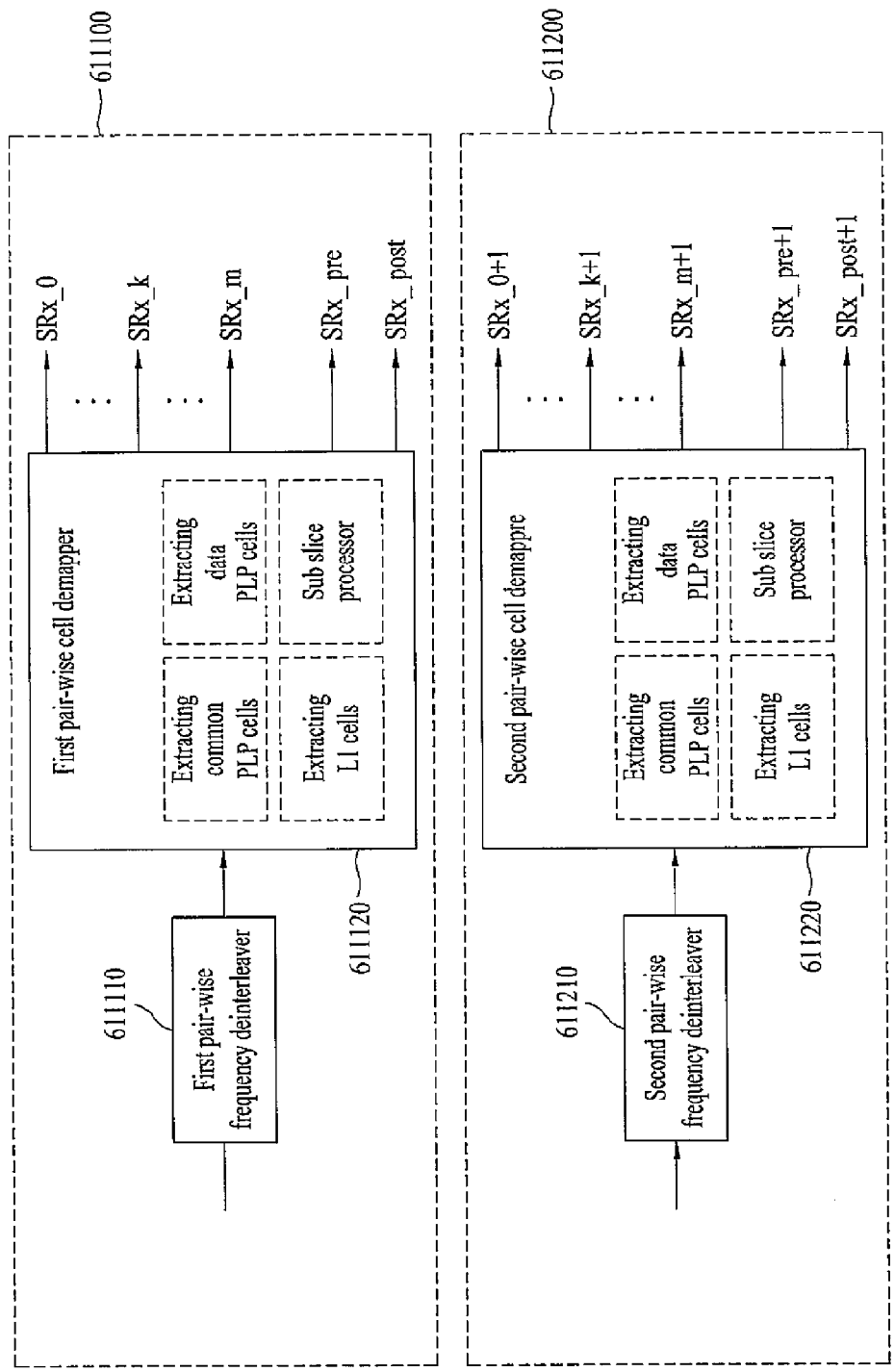
FIG. 21 shows a frame demapper according to an embodiment of the present invention.

FIG. 21 shows a frame demapper according to an embodiment of the present invention.

The frame demapper in FIG. 21 is an embodiment of the frame demapper 107200 in FIG. 2.

The frame demapper illustrated in FIG. 21 includes the first frame demapping block 611100 executing data from a first route and a second frame demapping block 611200 executing data from a second route. The first frame demapping block 611100 includes a first pair-wise frequency deinterleaver 611110 and a first pair-wise cell demapper 611120, and the second demapping block 611200 includes a second pair-wise frequency deinterleaver 611210 and a second pair-wise cell demapper 611220.

Also, the first pair-wise frequency deinterleaver 61110 and the first pair-wise cell demapper 611120 or the second pair-wise frequency deinterleaver 611210 and the second pair-wise cell demapper 611220 can operate independently and the same through a first route and a second route respectively.

Also, the frame demapper illustrated in FIG. 21 can perform the reverse process of the frame builder illustrated in FIG. 18.

A method of performing data by blocks included in the first frame builder demapping block 611100 and the second frame builder demapping block 611200 is as follows.

The first pair-wise frequency deinterleaver 611110 and the second pair-wise frequency deinterleaver 611210 perform deinterleaving in data in the frequency domain through the first and second routes into cell units in that case, the first pair-wise frequency deinterleaver 611110 and the second frequency deinterleaver 611210 pair up two consecutive cells in deinterleaving units and perform frequency deinterleaving. The deinterleaving process can be performed in a reverse direction of the interleaving process in the transmitting unit. The frequency-deinterleaved data will be transmitted in the original order.

The first pair-wise cell demapper 611120 and the second pair-wise cell demapper 611220 can extract common PLP data, PLP data and L1-signaling information in cell units from the de-interleaved data. The extracted PLP data includes MISO PLP data for the MISO method and MIMO PLP data for the MIMO method, and the extracted L1-signaling data includes information necessary for the current and next frames. Also, if the transmitter performs sub-slicing in the PLP data, the first and the second pair-wise cell demappers 611120, 611220 can merge the sliced PLP data and generate it in one stream.

Also, the first pair-wise cell demapper 611120 and the second pair-wise cell demapper 611220 can pair up two consecutive cells.

Data transmitted through the first route is inputted to the BICM decoder by the route from SRx_0 to SRx_post and data transmitted through the second route is inputted to the BICM decoder by the route from SRx_0+1 to SRx_post+1.

The frame demapper shown in FIG. 21 may be applied to the first and second embodiments of the present invention. In accordance with the third and fourth embodiments of the present invention, the frame demapper includes a first frame demapping block 627100 performing data from a first route and a second frame demapping block 627200 performing data from a second route.

The first frame demapping block includes a first frequency deinterleaver, a first cell demapper, a first combiner, a second combiner and a third combiner, and the second frame demapping block includes a second frequency deinterleaver and a second cell demapper.

Also, the first frequency deinterleaver and the first cell demapper or the second frequency deinterleaver and the second cell demapper can operate independently and the same through a first route and a second route respectively.

The first frequency deinterleaver and the second frequency deinterleaver perform deinterleaving in data in the frequency domain through the first and second routes into cell units.

The first and second cell demppers perform extracting common PLP data, PLP data and L1-signaling data from the deinterleaved data by cell units. The extracted PLP data includes the MISO decoded MISO PLP data and MIMO decoded MIMO PLP data, and the extracted L1-signaling data includes information necessary for the current and next frames. Also, if the transmitter performs sub-slicing in the PLP data, the first sub-slice processor 627120-1, 627220-1 of the first and the second cell demappers 627120, 627220 can merge the sliced PLP data and generate it in one stream.

The first combiner can combine the MISO decoded MISO PLP data if it does not combine the MISO PLP data in the MIMO/MISO decoder.

The second combiner and the third combiner can operate the same as the first combiner but it deals with L1-pre and L1-post signaling data.

Figure 22:
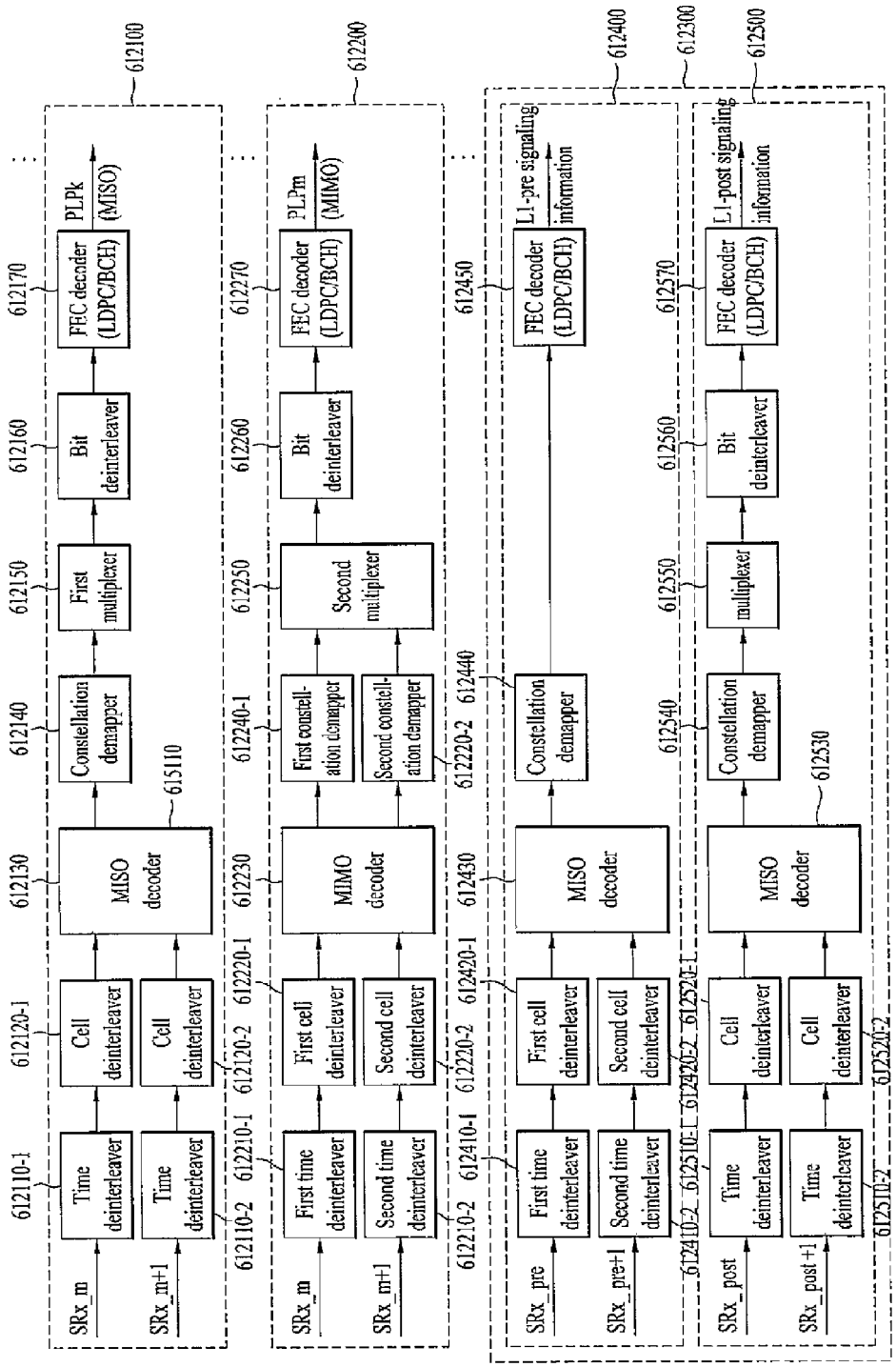
FIG. 22 shows a BICM decoder according to an embodiment of the present invention.

FIG. 22 shows a BICM encoder according to an embodiment of the present invention.

The BICM encoder in FIG. 22 according to the first embodiment of the present invention is an embodiment of the BICM encoder 107300 in FIG. 2.

The BICM decoder according to the first embodiment receives data from the first route via SRx_0 to SRx_post by a frame demapper and data from the second route via SRx_0+1 to SRx_post+1 and performs BICM decoding.

Also, the BICM decoder according to the first embodiment independently performs MISO/MIMO encoding in each of the data.

That is, the BICM decoder in FIG. 22 includes a first BICM decoding block 612100 performing MISO PLP data from SRx_k and SRx_k+1, a second BICM decoding block 612200 performing MIMO PLP data from SRx_m and SRx_m+1, and a third BICM decoding block 612300 performing MISO encoding in the L1-signaling information from SRx_pre, SRx_pre+1, SRx_post, and SRx_post+1.

Also, the BICM decoder according to the first embodiment of the present invention can perform the reverse process of the BICM encoder according to the first embodiment of the present invention illustrated in FIG. 16.

Data-performation method for each block is illustrated.

First, the first BICM decoding block 612100 includes a time deinterleaver 612110-1, 612110-2, a cell deinterleaver 612120-1, 612120-2, a MISO decoder 612130, a constellation demapper 612140, a first demultiplexer 612150, a bit deinterleaver 612160, and a FEC decoder 612170.

The time deinterleaver 612110-1, 612110-2 restores the MISO decoded data into a time domain and the cell deinterleaver 612120-1, 612120-2 performs deinterleaving in the time-deinterleaved data into cell units.

The MISO decoder 612130 can perform MISO decoding in MISO PLP data. The MISO decoder 612130 can perform four functions.

First, if the channel estimation modules 610180, 610280 included in the OFDM demodulator illustrated in FIG. 20 do not perform channel equalizing, the MISO decoder 612130 applies the effect of the channel detection regarding every transmissible reference point and computes an LLR value. Therefore, it will have the same effect.

Second, the MISO decoder 612130 performs the following functions based on the performance of the constellation mapper 604140. If the BICM encoder of the broadcast signal transmitter rotates the constellation mapper with a certain angle and delays the Q-phase element of the constellation for a certain value, the MISO decoder 612130 delays the I-phase element of the constellation for a certain value and computes a 2D-LLR value based on the rotation angle.

If the constellation mapper 604140 does not rotate constellation and does not delay the Q-phase of constellation for a certain value, the MSIO decoder 612130 can compute the 2-D LLR value based on the normal QAM.

Third, the MISO decoder 612130 selects a decoding matrix to perform the reverse process based on the encoding matrix used by the MISO encoder 604150.

Fourth, the MISO decoder 612130 can combine signals inputted from two antennas. The signal combining method includes maximum ratio combining, equal gain combining, and selective combining and obtains the diversity effect by maximizing the SNR of the combined signals.

The MISO decoder 612130 performs MISO decoding in the combined signal and combine the MISO-decoded combined signals.

The constellation demapper 612140 can perform the following functions based on the performance of the MISO decoder 612130.

First, if the MISO decoder 612130 does not transmit the LLR value directly and only performs MISO decoding, the constellation demapper 612140 can compute the LLR value. In more detail, if the constellation demapper 604140 in the BICM encoder performs constellation rotation or Q-phase element delay, the constellation demapper 612140 delay the I-phase LLR element and computes the LLR value. If the constellation demapper 604140 does not perform the constellation rotation and Q-phase element delay, the constellation demapper 612140 can compute the LLR value based on the normal QAM.

The computing the LLR value includes computing 2-D LLR and computing 1-D LLR. When computing the 1-D LLR, the complexity of the LLR computation can be reduced by executing either one of a first or a second route.

The first multiplexer 612150 restores demapped data in bit stream.

The bit-interleaver 612160 performs deinterleaving in the bit-stream, FEC decoding in the deinterleaved data, and outputs MISO PLP data by correcting errors in the transmitting channels.

The second BICM decoding block 612200 includes a first time deinterleaver 612210-0 and a second time deinterleaver 612210-1, a first cell deinterleaver 612220-0 and a second cell deinterleaver 612220-1, a MIMO decoder 612230, a first constellation demapper 612240-0 and a second constellation demapper 612240-1, a second multiplexer 612250, a bit interleaver 612260 and a FEC decoder 612270.

The first time deinterleaver 612210-0 and the second time deinterleaver 612210-1 perform deinterleaving in the MIMO decoded data into cell units. In that case, the first cell deinterleaver 612220-0 and the second deinterleaver 612220-1 performs cell deinterleaving in only a half of the cell data in one FEC block. As a result, cell deinterleaving by the first and second cell deinterleaver 612220-0, 612220-1 has the same effect as deinterleaving by a cell deinterleaver using one FEC block.

The MIMO decoder 612230 performs in MIMO PLP data from SRx_m and SRx_m+1. The MIMO decoder 612210 can perform the four functions of the MISO decoder 612110 except for the fourth function in which the signals are to be combined. Then, the MIMO decoder 612230 performs decoding by using MIMO encoding matrix of the first and sixth embodiment.

The first constellation demapper 612240-0, the second constellation demapper 612240-1, the second multiplexer 612250, bitinterleaver 612260 and FEC decoder 612270 operates the same as those according to the first BICM decoding block 612100.

The third BICM decoding block 612300 includes a first decoding block 612400 performing L1-pre signaling data and a second decoding block 612500 performing L1-post signaling data. The first decoding block 612400 includes a time deinterleaver 612410-1, 612410-2, a cell deinterleaver 612420-1, 612420-2, a MISO decoder 612430, a constellation demapper 612440, and a FEC decoder 612450, and the second decoding block 612500 includes a time deinterleaver 612510-1, 612510-2, a cell deinterleaver 612520-1, 612520-2, a MISO decoder 612530, a constellation demapper 612540, a multiplexer 612550, a bit deinterleaver 612560, and a FEC decoder 612570.

As the first decoding block 612400 and the second decoding block 612500 have the same functions, the description of the first BICM decoding block 612100 is omitted.

As a result, the first BICM decoding block 612100 outputs the BICM decoded MISO PLP data to an output processor and the second BICM decoding block 612200 transmits the BICM decoded MIMO PLP data to the output processor.

The first decoding block 612400 in the third BICM decoding block 612300 performs MSIO decoding in L1-pre signaling data and transmits the data. Also, the second decoding block 612500 in the third BICM decoding block 612300 performs MISO decoding in L1-post signaling data and transmits one L1-post signaling information.

Figure 23:
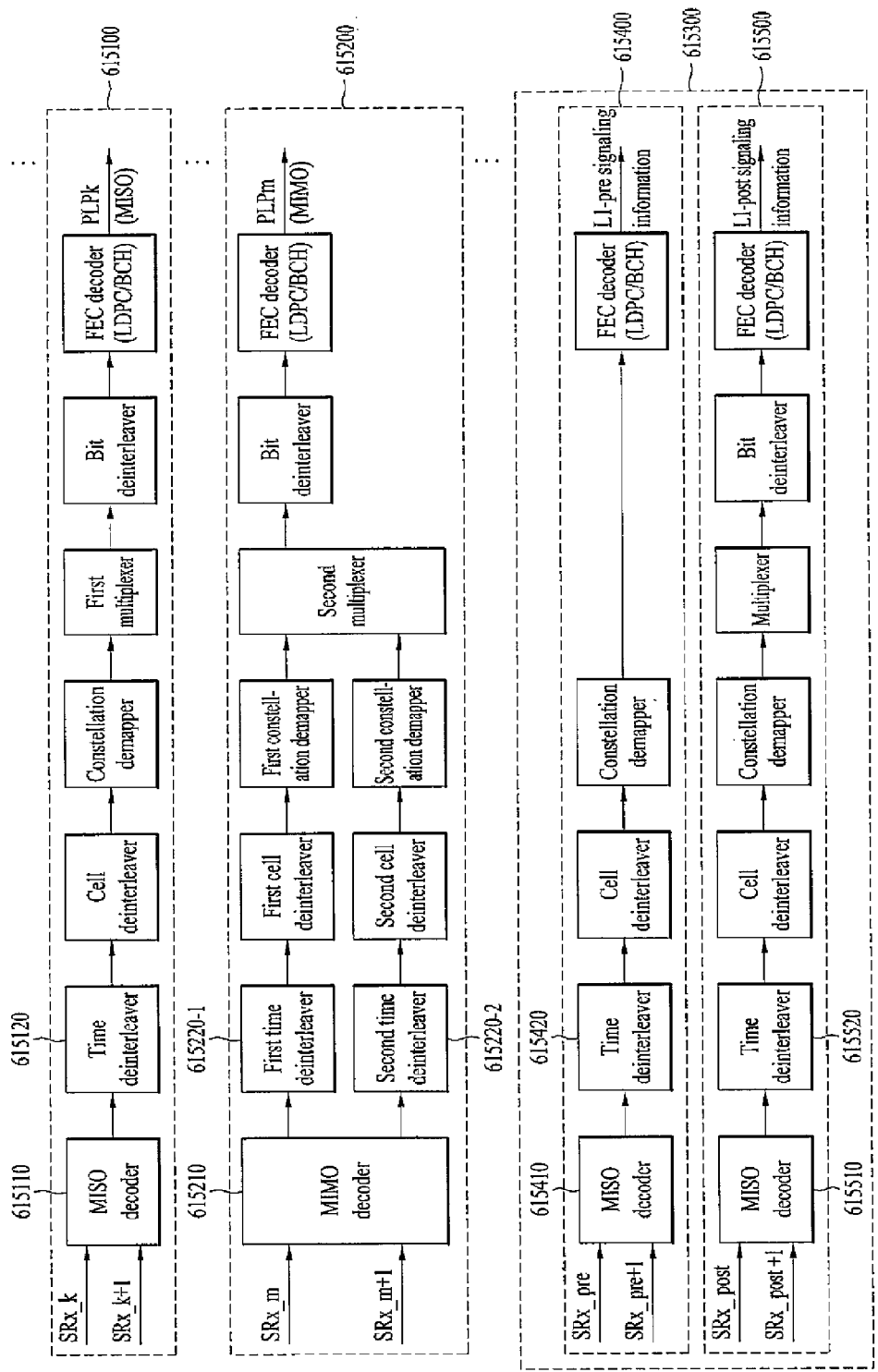
FIG. 23 shows a BICM decoder according to another embodiment of the present invention.

FIG. 23 shows a BICM decoder according to another embodiment of the present invention.

The BICM decoder in FIG. 23 according to the second embodiment of the present invention is an embodiment of the BICM decoder 107300 in FIG. 2.

The BICM decoder according to the second embodiment receives data transmitted from a first route to a route of from SRx_0 to SRx_post and data transmitted from a second route to a route of from SRx_0+1 to SRx_post+1, and performs BICM decoding. Also, the BICM decoder according to the second embodiment can independently apply the MISO/MIMO process.

That is, the BICM decoder in FIG. 23 includes a first BICM decoding block 615100 performing MISO encoding in MSIO PLP data from SRx_k and SRx_k+1, a second BICM decoding block 615200 performing in MIMO PLP data from SRx_post and SRx_post+1, and a third BICM decoding block 615300 performing MISO encoding in L1-signaling data from SRx_pre, SRx_pre+1, SRx_post, and SRx_m+1.

Also, the third BICM decoding block 615300 includes a first decoding block 615400 performing the L1-pre signaling data and a second decoding block 615500 performing L1-post signaling data.

Also, the BICM decoder according to the second embodiment can perform the reverse process of the BICM encoder according to the second embodiment illustrated in FIG. 17.

The decoding blocks according to the second embodiment in FIG. 23 operate the same as the decoding blocks according to the first embodiment in FIG. 22. Therefore, further description is omitted. However, the only difference is that in the BICM decoder the MISO decoder 615110, 615410, 615510 and the MIMO decoder 615310 are located in front of the time deinterleaver 615120, 615220-1, 615220-2, 615420, 615520.

As above described, the PLP data and the signaling information are performed into symbol units after the constellation mapping. In addition, the broadcast signal receiver may perform BICM decoding on data received in reverse processes to those of the BICM encoding blocks according to the first embodiment or the second embodiment. In this case, a MISO decoder, a MIMO decoder, a time deinterleaver, and a cell deinterleaver of the broadcast signal receiver may perform the received data in symbol units. However, the BICM decoder of the broadcast signal receiver may first perform MISO decoding or MIMO decoding for each data, and thus, each data is output in bit units. Then, the BICM decoder of the broadcast signal receiver may perform time deinterleaving and cell deinterleaving processes, but requires information regarding a symbol unit of data output in bit units. Thus, the broadcast signal receiver may store information regarding symbol mapping of input bits required for the deinterleaving processes.

As not shown in drawings, the BICM decoder according to the third embodiment includes a first BICM decoding block processing the MISO decoded MISO PLP data transmitted through one path, a second BICM decoding block processing the MIMO decoded MIMO PLP data transmitted through two paths, and a third BICM decoding block processing the MISO encoded L1-signaling data transmitted through two paths. Also, the third BICM decoding block includes a first decoding block processing L1-pre signaling data and a second decoding block processing L1-post signaling data.

Also, as the BICM decoder according to the third embodiment operates the same as the BICM encoding blocks according to the first embodiment in FIG. 22. However, the only difference is that the BICM decoding blocks according to the third embodiment do not include MISO/MIMO decoders.

Also, the BICM decoder according to the fourth embodiment of the present invention includes a first BICM decoding block processing MISO PLP data transmitted through one path, a second BICM decoding block processing MIMO PLP data transmitted through two paths, and a third BICM decoding block processing MISO decoded L1-signaling data transmitted through two paths.

Also, the third BICM decoding block includes a first decoding block processing L1-signaling data and a second decoding block processing L1-post signaling data.

As the first BICM decoding block according to the fourth embodiment operates the same as the BICM decoding blocks illustrated in FIG. 22.

But, the only difference is that the second BICM decoding block includes the MIMO decoder as opposed to the third embodiment of the present invention. In that case, the transmitting character of MIMO PLP data from a first and a second route may or may not be the same. Also, if the modulation orders of the two MIMO PLP data are the same, a second constellation mapper, a second cell interleaver and a second time interleaver may not be used. Thus, two of the MIMO PLP data will be merged into one input in the first time deinterleaver, the first cell deinterleaver, the first constellation demapper, and then will be inputted to the second multiplexer. In addition, the MIMO decoder may be positioned in front of the time deinterleavers as in the first embodiment or may be positioned in front of the constellation demappers as in the second embodiment.

Figure 25:
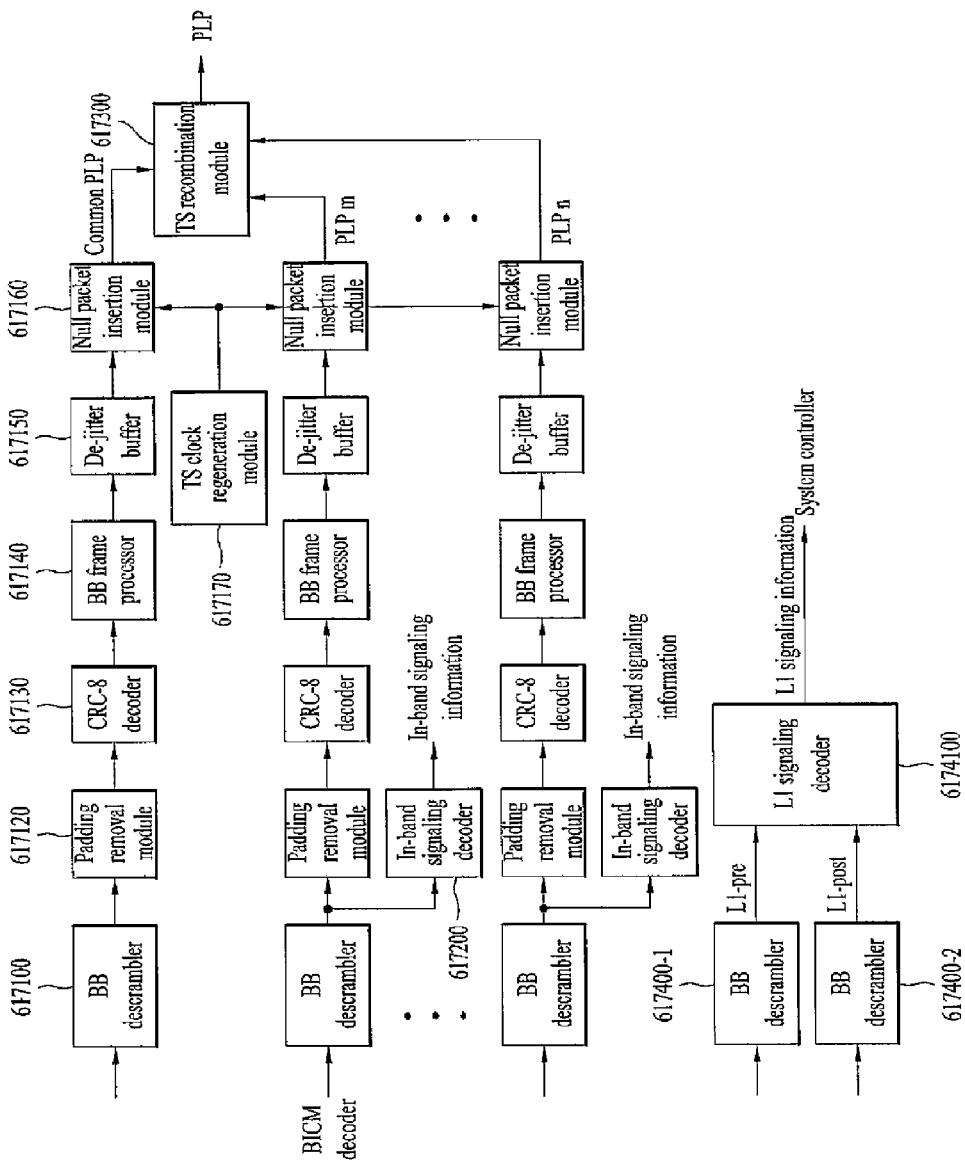
FIG. 25 shows an output processor according to another embodiment of the present invention.

FIG. 24 and FIG. 25 show an embodiment of an output processor included broadcast signal receiver according to an embodiment of the present invention. The following is a specific description of the output processor.

FIG. 24 shows an output processor of the broadcast signal receiver according to an embodiment.

The output processor in FIG. 24 is an embodiment of the output processor 107400 in FIG. 2.

The output processor in FIG. 24 as opposed to an input processor performing single PLP in FIG. 13 performs the reverse process of it and includes a BB descrambler 616100, a padding remove module 616200, a CRC-8 decoder 616300 and a BB frame processor 616400. The output processor performs the reverse process of the input processor illustrated in FIG. 13 by receiving bit stream from the BICM decoder.

The BB descrambler 616100 receives bit stream, performs XOR algorithm with the same bit-string as PRBS processed by the BB scrambler and outputs it. The padding remove module 616200 removes, if necessary, padding bits inserted in the padding insertion module. The CRC-8 decoder 616300 performs CRC decoding in the bit-stream and the BB frame processor 616400 decodes information in the BB frame header and restores TS or GS by using the decoded information.

FIG. 25 shows another embodiment of an output processor of the present invention.

The output processor in FIG. 25 as opposed to the input processor in FIG. 14 and FIG. 15 performing a plurality of PLP performs the reverse process of it. The output processor includes a plurality of blocks for a plurality of PLP. The blocks are as follows. The output processor includes a BB descrambler 617100, 617400-1, 617400-2 and a padding removal module 617120, a CRC-8 decoder 617130, a BB frame processor 617140, a De-jitter buffer 617150, a null packet insertion module 617160, a TS clock regeneration module 617170, an in-band signaling decoder 617180, a TS recombination module 617300 and a L1 signaling decoder 617410. The same blocks as in FIG. 24 are omitted.

Processing for a plurality of PLP can be shown as decoding PLP data regarding common PLP or decoding service components like scalable video service or a plurality of services at once. The BB descrambler 617110, the padding removal module 617120, the CRC-8 decoder 617130 and the BB frame processor 617140 operate the same as those in FIG. 40.

The De-jitter buffer 617150 compensates a temporarily inserted delay for the synchronization of a plurality of PLP based on Time To Output (TTO) parameters. The null packet insertion module 617160 restores the deleted null packet based on the Deleted Null Packet (DNP) information. The TS clock regeneration module restores the detailed time synchronization of the outputted packet based on Input Stream Time Reference information. The TS recombination module 617300 receives the restored common PLP and related PLP data and transmit the original TS, IP or GS. The TTO parameters, DNP information, and ICSR information are obtained by the BB frame processor and it can transmit the data to each block or a system controller.

The in-band signaling decoder 617200 restores in-band signaling information via the padding bit filed of PLP data and transmits it.

As for L1 signaling information, the BB descramblers 617400-1, 617400-2 performs descrambling in the corresponding L1 pre signaling information data and L1-post signaling information, and the L1 signaling decoder 6174100 decodes the descrambled data and restores the L1 signaling information. The restored L1-signaling information includes L1-pre signaling information and L1-post signaling information. It will also be transmitted to the system controller and provides parameters for BICM decoding, frame demapping, and OFDM demodulating. The L1 signaling information can be inputted as one BB descrambler and will be descrambled.

Figure 26:
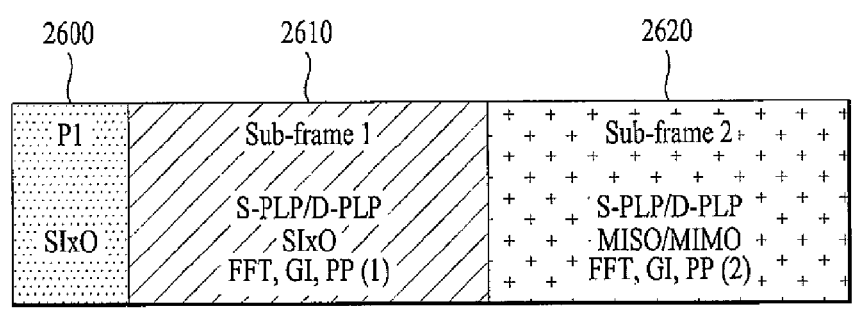
FIG. 26 shows a frame structure according to an embodiment of the present invention.

FIG. 26 shows a frame structure according to one embodiment of the present invention.

As described above, the frame builder 101400 of FIG. 1 may generate a frame upon receiving output data from the BICM encoder 101300. In this case, the output signaling information or PLP data may be processed by at least one of SISO, SIMO, MISO, and MIMO. However, SIxO-processed data and MIxO-processed data may have different pilot densities such that it is impossible for the SIxO-processed data and the MIxO-processed data to be simultaneously contained in the same frame. Therefore, according to one embodiment of the present invention, a symbol P1 and two subframes are contained in a single frame. In this case, two subframes may transmit SIxO-processed data and MIxO-processed data, respectively. One frame may also include the symbol P1 and only one subframe. In this case, SIxO-processed data and MIxO-processed data may be transmitted on a frame basis. The above-mentioned data transmission may be changed according to a designer's intention.

FIG. 26 shows an exemplary case in which P1 symbol 2600, a first subframe 2610, and a second subframe 2620 are contained in a single frame. A detailed description of FIG. 26 is as follows.

P1 symbol 2600 may be located prior to the frame, and may transmit information regarding a structure of a subframe contained in the corresponding frame. That is, the receiver may recognize whether the corresponding frame includes only one subframe or two different subframes through information included in the P1 symbol. In addition, the P1 symbol may perform SISO or SIMO processing for implementing data reception through even one antenna.

The first subframe 2610 may transmit SISO or SIMO processed data to enhance robustness. Therefore, the first subframe 2610 may include a PLP for transmitting SISO- or SIMO-processed L1 signaling information and a data PLP for transmitting a service or service component. In this case, PLP for transmitting L1 signaling information may include not only information regarding a first subframe but also information regarding a second subframe.

The second subframe 2610 may transmit MISO- or MIMO-processed data so as to improve transmission efficiency through a multiplexing gain. Therefore, the second subframe 2620 may include a signaling PLP for transmitting PLP information and a data PLP for transmitting the service or the service component. In this case, Alamouti coding such as SFBC/STBC, or TxAS (transmitter antenna switching), etc. may be used as the MIMO processing method.

In order to increase the efficiency of data transmitted through the second subframe 2620, data can be processed with a high code rate and a high constellation order, and may also be processed with a MIMO scheme, a Spatial Multiplexing (SM) scheme, a Golden Code (GC) scheme, etc.

As described above, since data transmitted from the first subframe 2610 and data transmitted from the second subframe 2620 have different characteristics, an FFT size, a GI size, and a pilot pattern of each subframe may be decided in different ways. In more detail, the FFT size, the GI size, and the pilot pattern of the first subframe 2610 may be decided in response to mobility or indoor reception of the receiver; and the FFT size, the GI size, and the pilot pattern of the second subframe 2620 may be decided to obtain a high transfer rate.

If two subframes use different pilot patterns, channel equalization performance of the receiver may be deteriorated. Therefore, assuming that two subframes according to the present invention use different pilot patterns, an edge pilot may be inserted into an OFDM symbol located at the front end or the rear end of each subframe according to one embodiment.

Therefore, the receiver may obtain information regarding a subframe contained in the corresponding frame by decoding the P1 symbol 2600. A decoding process for each subframe is performed such that the service or the service component can be obtained from a necessary PLP.

Figure 27:
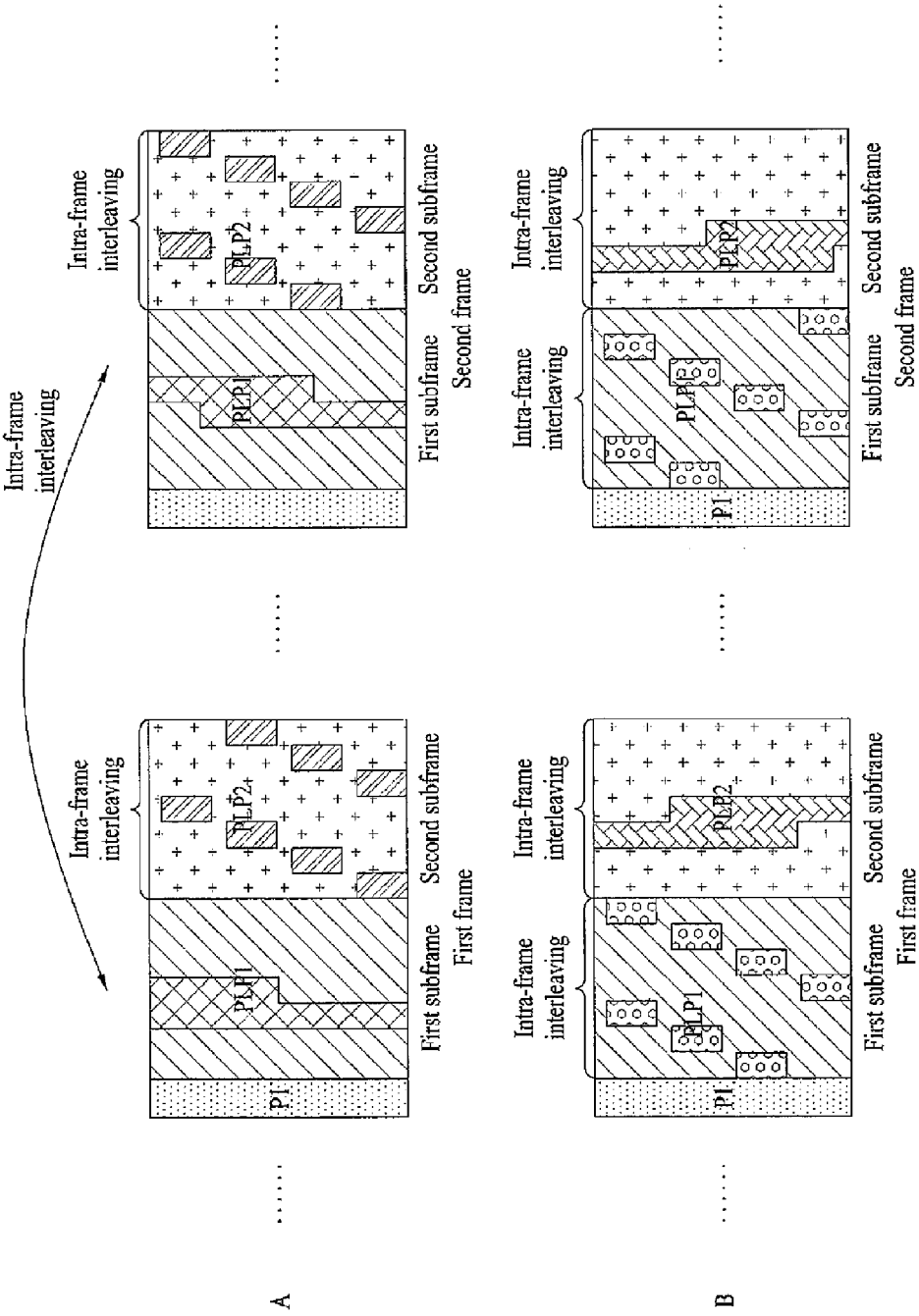
FIG. 27 shows another frame structure according to another embodiment of the present invention.

FIG. 27 shows a frame structure according to another embodiment of the present invention.

Referring to FIG. 27, the frame structure may be classified into Type 1 subframe and Type 2 subframe according to a sub-slice (or burst) configured to transmit a PLP. That is, assuming that the PLP contained in the subframe is transmitted through one sub-slice, the corresponding subframe may be referred to as Type 1 subframe. If the PLP contained in the subframe is transmitted through a plurality of subslices, the corresponding subframe may be referred to as Type 2 subframe.

In case of Type 1 subframe, since the service or the service component is transmitted by one sub slice, the receiver can recover a desired service upon receiving the corresponding subslice. Therefore, the receiver can obtain the power saving effect. In addition, in case of Type 2 subframe, the corresponding service or the service component is transmitted through a plurality of subslices in a time domain of the corresponding subframe, the receiver may obtain a time-interleaving gain.

Even in the case of Type 1 subframe, if interleaving between subframes (i.e., inter-frame interleaving) is performed, it is possible to obtain a time interleaving gain whereas latency increases. In case of Type 2 subframe, if interleaving belonging to the corresponding subframe (i.e., intra-frame interleaving) is performed, it is possible to obtain a diversity gain and a short latency.

FIG. 27A shows an interleaved frame structure on the condition that the first subframe is any one of Type 1 subframe and the second subframe is Type 2 subframe.

Referring to FIG. 27A, inter-frame interleaving may be carried out in either PLP1 contained in a first subframe of the first frame and another PLP1 contained in a first subframe of the second frame, such that it is possible to obtain an interleaving gain of the PLP1. As shown in FIG. 27B, intra-frame interleaving may be carried out in either PLP2 contained in a second subframe of the first frame and another PLP2 contained in a second subframe of the second frame, such that it is possible to obtain an interleaving gain of the PLP2.

FIG. 27B shows an interleaved frame structure on the condition that the first subframe is any one of Type 2 subframe and the second subframe is Type 1 subframe.

Referring to FIG. 27B, the first and second subframes contained in the first and second subframes may perform intra-frame interleaving within each subframe according to one embodiment. In this case, the receiver may minimize power consumption of a PLP2 transmitted to the second subframe, resulting in reduction of latency. Specifically, data transmitted through the second subframe is MIMO-processed to have high efficiency, such that a time required for data transmission is gradually shorter than that of SISO or MISO. Therefore, a power-saving gain of the receiver may be more greatly increased.

As described above, data transmitted through a first subframe and a second subframe may have different physical characteristics. Therefore, in order to allow the receiver to decode data transmitted through each subframe, signaling information for each subframe is needed. L1 signaling information of FIG. 3 may include signaling information of each subframe according to one embodiment of the present invention.

In more detail, a configuration block contained in the above L1-pre signaling information or L1-post signaling information may include specific information indicating whether a local service is transmitted and associated physical information. Therefore, the receiver determines whether or not a local service is transmitted by decoding L1-pre signaling information or L1-post signaling information. If the local service is transmitted, the receiver may confirm physical characteristics of the local service.

As described above, assuming that one frame includes a first subframe and a second subframe, a configurable block or dynamic block contained in L1-pre signaling information and L1-post signaling information may include parameters for each subframe. In more detail, configurable parameters of each subframe may include a MIMO_TYPE field, an FFT_SIZE field, a GUARD_INERVAL field, a PILO_PATTERN field, a NUM_MIMO_SYMBOL field, etc. Detailed description thereof is as follows.

MIMO_TYPE field is a field indicating a MIMO scheme for processing data transmitted through a subframe. MIMO scheme may be SIxO, MISO, MIMO, etc.

FFT_SIZE field may indicate an FFT size used in the subframe.

GUARD_INERVAL field may indicate the size of a guard interval of a current subframe.

PILOT_PATTERN field is a field indicating a pilot insertion pattern of a current subframe.

NUM_MIMO_SYMBOL field is a field indicating the number of OFDM symbols of MIMO-processed data contained in the subframe. The number of OFDM symbols of SIxo- or MISO-processed data is obtained when the number of OFDM symbols of MIMO-processed data is subtracted from the number of OFDM symbols constructing the total frame.

Therefore, the receiver decodes a configurable block or a dynamic block contained in the L1-pre signaling information and L1-post signaling information so as to obtain parameters of each subframe, such that it can obtain a subframe structure belonging to one frame.

As shown in FIG. 4, one super-frame may include a plurality of frames. One superframe may include a T2 frame for transmitting data of a legacy broadcast system (or T2 broadcast system) and an NGH frame for transmitting data of the NGH broadcast system. Therefore, one superframe may include a plurality of T2 (or legacy frame) frames and NGH frames.

Figure 28:
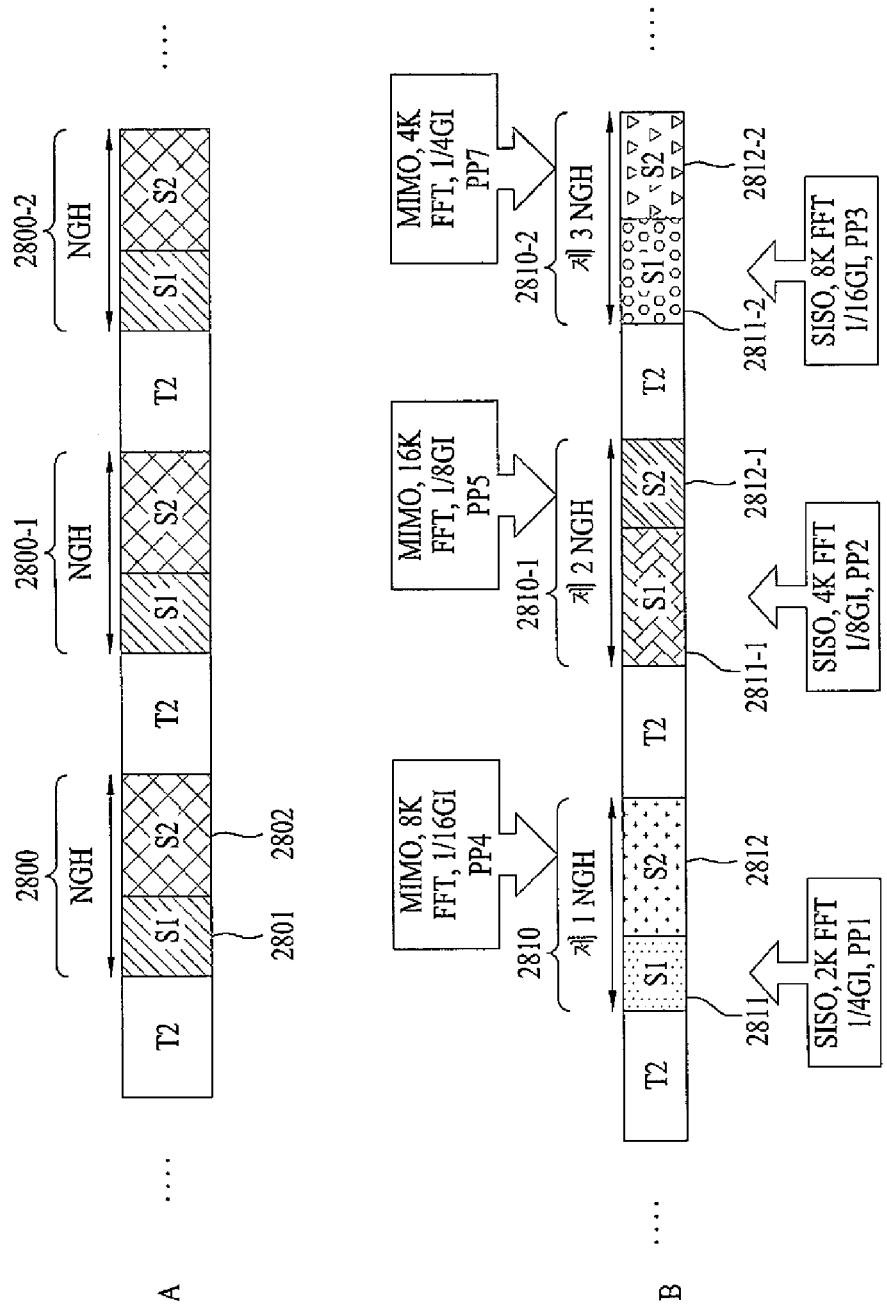
FIG. 28 shows a superframe structure according to an embodiment of the present invention.

FIG. 28 shows a superframe structure according to one embodiment of the present invention.

Referring to FIG. 28A, individual NGH frames contained in one superframe may include the same first and second subframes.

In this case, one NGH frame 2800 may include a first subframe 2801 and a second subframe 2802. The first subframe 2801 shown in FIG. 28A may include a plurality of parameters such as SISO, a size of 2K FFT, a guard interval of ¼ GI, a pilot pattern of PP1, etc. The second subframe 2802 may include a plurality of parameters such as MIMO, a size of 8K FFT, a guard interval of ⅛ GI, a pilot pattern of PP2, etc. In this case, parameters of each subframe may be transmitted through a configurable block of L1-pre signaling information or L1-post signaling information as described above. In addition, the first subframe and the second subframe contained in each NGH frame have the same physical parameters, and each subframe may have a predetermined length.

FIG. 28B shows one embodiment in which individual NGH frame contained in one superframe include different first and second subframes.

In this case, the first subframe and the second subframe contained in each NGH frame may have different physical parameters.

Referring to FIG. 28B, a first subframe 2811 contained in the first NGH frame 2810 may have a plurality of parameters such as SISO, a size of 2K FFT, a guard interval of ¼ GI, a pilot pattern of PP1, etc. A second subframe 2812 may have a plurality of paramters such as MIMO, a size of 8K FFT, a guard interval of ⅛ GI, a pilot pattern of PP4, etc. In addition, a first subframe 2811-1 contained in the second NGH frame 2810-1 may have a plurality of parameters such as SISO, a size of 4K FFT, a guard interval of ⅛ GI, a pilot pattern of PP2, etc. A second subframe 2812-1 may have a plurality of parameters such as MIMO, a size of 16K FFT, a guard interval of ⅛ GI, a pilot pattern of PP5, etc. In addition, a first subframe 2811-2 contained in a third NGH frame 2810-2 may have a plurality of parameters such as MISO, a size of 8K FFT, a guard interval of ¹⁄₁₆ GI, a pilot pattern of PP3, etc. A second subframe 281202 may have a plurality of parameters such as MIMO, a size of 8K FFT, a guard interval of ¹⁄₁₆ GI, a pilot pattern of PP3, etc.

In this case, parameters of individual subframes are different according to respective subframes, such that the parameters may be transmitted through a dynamic block of L1-post signaling information. However, the same length of NGH frame should be maintained within the superframe. The first subframe and the second subframe contained in each NGH frame maintain different ration of length, such that the same-length NGH frame can be configured.

In accordance with the designer intention, a first subframe and a second subframe contained in some NGH frames of the superframe may have the same parameters as shown in FIG. 28A. In addition, the first subframe and the second subframe contained in the remaining NGH frame may have different parameters as shown in FIG. 28B.

In this case, parameters equally applied to individual subframes of the superframe can be transmitted through the configurable block of the L1-pre signaling information or L1-post signaling information, and parameters differently applied to individual subframes may be transmitted through a dynamic block of L1-post signaling information.

FIG. 29 is a flowchart illustrating a method for transmitting a broadcast signal according to one embodiment of the present invention.

As shown in FIG. 1, the BICM encoder 101300 according to one embodiment may encode PLP (Physical_Layer_Pipe) data and signaling information including a base layer and an enhancement layer of a broadcast service using at least one of SISO, MISO, and MIMO in step S2900.

In this case, the broadcast signal transmitter according to one embodiment of the present invention may independently perform MISO processing and MIMO processing for each input PLP data during the BICM encoding process according to a first embodiment. Alternatively, according to a second embodiment, the broadcast signal transmitter may independently perform MISO processing and MIMO processing for each input PLP data during the BICM encoding process. In addition, MISO processing and MIMO processing may be performed for mapped PLP data within a frame during the OFDM generation process according to a third embodiment. In accordance with a fourth embodiment, independent MIMO processing may be applied to MIMO PLP data to be MIMO processed from among PLP data to be used as input data in the BICM encoding process. The OFDM generator may perform MISO processing for not only MISO PLP data requisite for MISO processing but also L1-signaling information.

In more detail, as shown in FIGS. 16 and 17, the BICM encoder of the broadcast signal transmitter according to a first embodiment may perform MISO encoding or MIMO encoding for input PLP data after completion of constellation mapping, cell interleaving, and time interleaving. The BICM encoder of the broadcast signal transmitter according to the second embodiment may perform MISO encoding or MIMO encoding for each input PLP data after completion of constellation mapping, and may perform cell interleaving and time interleaving.

Thereafter, the frame builder 101400 according to one embodiment may generate a transmission frame including a preamble and PLP data including the encoded signaling information in step S2910. If signaling information and PLP data are processed according to the first and second embodiments, the frame builder according to one embodiment combines symbol-based PLP data and symbol-based L1-signaling data received through each path in units of two cells, such that it may map a pair of two cells to an OFDM symbol carrier.

In addition, assuming that signaling information and PLP data are processed according to the third and fourth embodiments, the frame builder according to one embodiment may prevent MISO PLP data and MIMO PLP data from being mapped into the same OFDM symbol.

In addition, the frame builder according to one embodiment may include a first subframe and a second subframe in one frame as shown in FIGS. 26 to 28. In this case, SIxO-processed data may be transmitted through the first subframe, and MIxO-processed data may be transmitted through the second subframe. However, such data transmission may be changed according to the designer intention.

In addition, individual subframes may be assigned the same or different parameters of PLP data contained in the first and second subframes according to the designer intention.

Thereafter, the OFDM generator 101500 according to one embodiment may perform OFDM modulation of a broadcast signal including the transmission frame, and transmit the OFDM-modulated broadcast signal in step S2920. In accordance with a third embodiment of FIG. 20, the OFDM generator may include a MISO/MIMO encoder. In accordance with a fourth embodiment of the present invention, the OFDM generator may include the MISO encoder.

Figure 30:
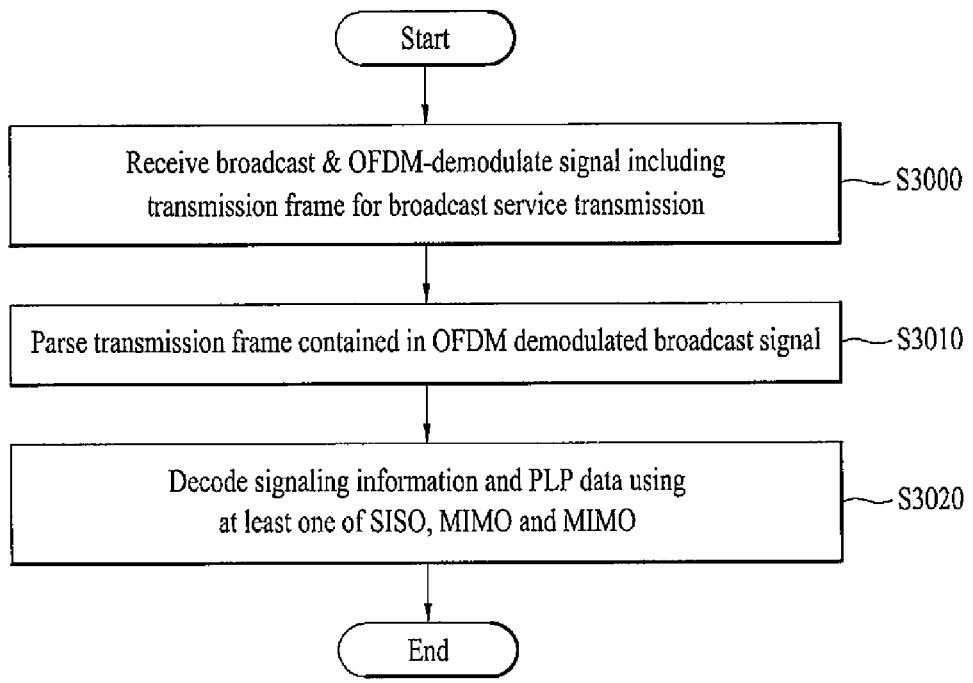
FIG. 30 is a flowchart illustrating a method for receiving a broadcast signal according to an embodiment of the present invention.

FIG. 30 is a flowchart illustrating a method for receiving a broadcast signal according to one embodiment of the present invention.

The OFDM demodulator 107100 according to one embodiment receives a broadcast signal including a transmission frame configured to transmit a broadcast service so that it may OFDM-demodulate the broadcast signal in step S3000. In accordance with the third embodiment of the present invention, the OFDM demodulator may include the MISO/MIMO decoder. In accordance with the fourth embodiment of the present invention, the OFDM demodulator may include the MISO decoder.

Thereafter, the frame parser 107200 according to one embodiment may parse the transmission frame contained in the OFDM-demodulated broadcast signal in step S3010. In this case, the transmission frame may include a preamble and PLP data, and the preamble may include signaling information.

Referring to FIG. 21, according to the first and second embodiments of the present invention, the frame parser combines and extracts two contiguous cells mapped to each frame. In addition, as shown in FIGS. 26 to 28, one frame may include a first subframe and a second subframe. In this case, the broadcast receiver may receive SIxO-processed data through the first subframe, and receive MIxO-processed data through the second subframe according to the designer intention.

In addition, individual subframes may be assigned the same or different parameters of PLP data contained in the first and second subframes. Assuming that the same parameters are assigned to respective subframes, the receiver may receive parameters through the configurable block of L1-pre signaling information or L1-post signaling information. In addition, assuming that different parameters are assigned to respective subframes, the receiver may receive parameters through a dynamic block of L1-post signaling information.

Thereafter, the BICM decoder 107300 according to one embodiment may decode signaling information and PLP data using at least one of SISO, MISO and MIMO in step S3020. As shown in FIGS. 22 and 23, the BICM decoder according to the first and second embodiments may independently apply the MISO scheme to input data received from each path, may independently apply the MIMO scheme to the input data, and may also independently apply the MISO scheme to the signaling information. The BICM decoder according to the third embodiment may not include the MISO decoder and the MIMO decoder, and the BICM decoder according to the fourth embodiment may include only the MIMO decoder.

Hereinafter, different embodiments are disclosed. Afterwards, the embodiments are described using different terms that correspond to the above-used terms but have the same meanings. For example, the term, DP (data pipe), are used in same meanings as the term, PLP (physical layer pipe) that are already used above.

As a transmission data unit in physical layer, the term, DP (data pipe), and the term, PLP (physical layer pipe), may have the same meanings. As one example, the terms, "data PLP" as is used above, hereinafter, correspond to the terms, "PLP (physical layer pipe) that carries service data".

In other words, the PLP or DP that is a transmission unit in a physical layer or data processing steps may be used as the same meaning hereinafter.

For example, the type1 data PLP and type2 data PLP correspond to the type 1 DP and type 2 DP.

And, the terms, "L1 signaling information" are used in the same meaning as the terms, "physical layer signaling data (PLS data)". Because the physical layer may be called as L1 layer in this art, the two terms may be used as an identical concept.

As an example of the above terms, the terms, "L1-pre-signaling information" may be called "PLS-pre information" hereinafter and the two terms means a physical signaling data part which carries basic information about the transmitting system as well as the parameters needed to decode another physical signaling part following L1-pre-signaling information (or PLS-pre information).

Similarly, the terms "L1-post configurable signaling information" as are used above may be used as the term, "static PLS signaling data" that means that remains static for the duration of a frame or a group of frames. And the terms "dynamic L1-post signaling" may be called the terms, "dynamic PLS signaling data" that may dynamically change frame-by-frame.

And, the above-used terms, "signaling information" and the terms, "AP1 signaling information" may be included in a preamble part that will be explained hereinafter.

Accordingly, for example, the terms, "L1_MOD field" may also be a piece of information on modulation of the PLS data.

In a signal frame, the preamble may be located before the payload. As mentioned, the preamble may be divided into different physical signaling parts. Each physical signaling parts and their respective information are described below.

Figure 31:
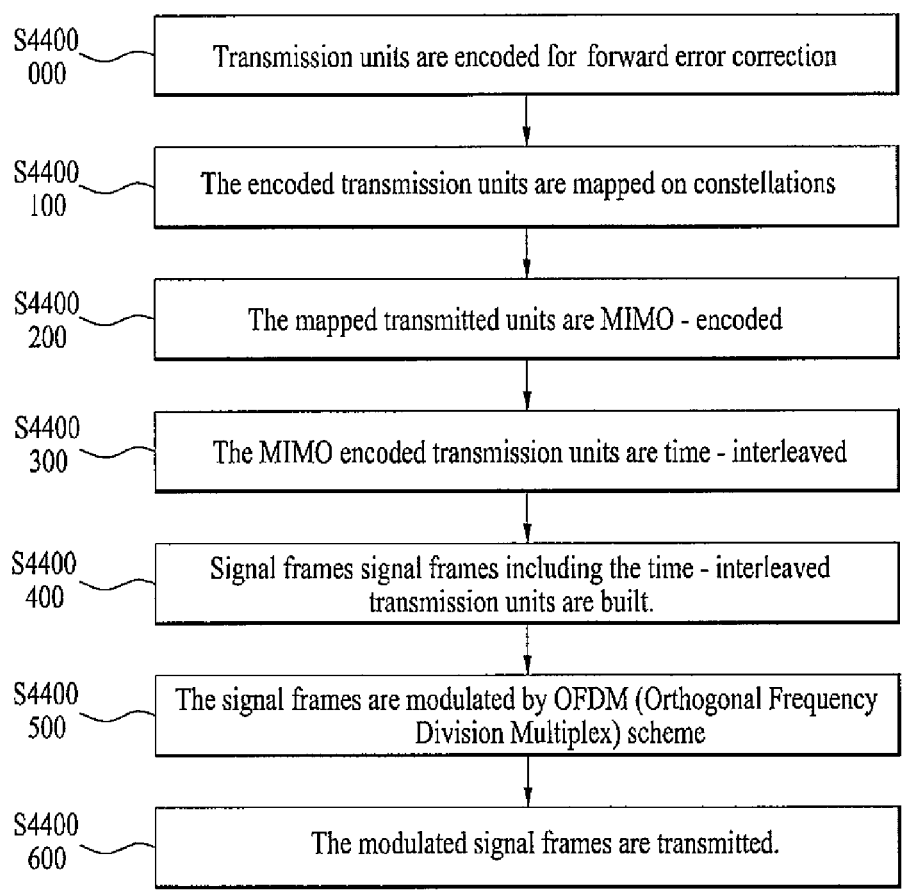
FIG. 31 illustrates a flowchart showing a method for transmitting broadcast data according to an embodiment of the present invention.

FIG. 31 illustrates a flowchart showing a method for transmitting broadcast data according to an embodiment of the present invention.

Figure 33:
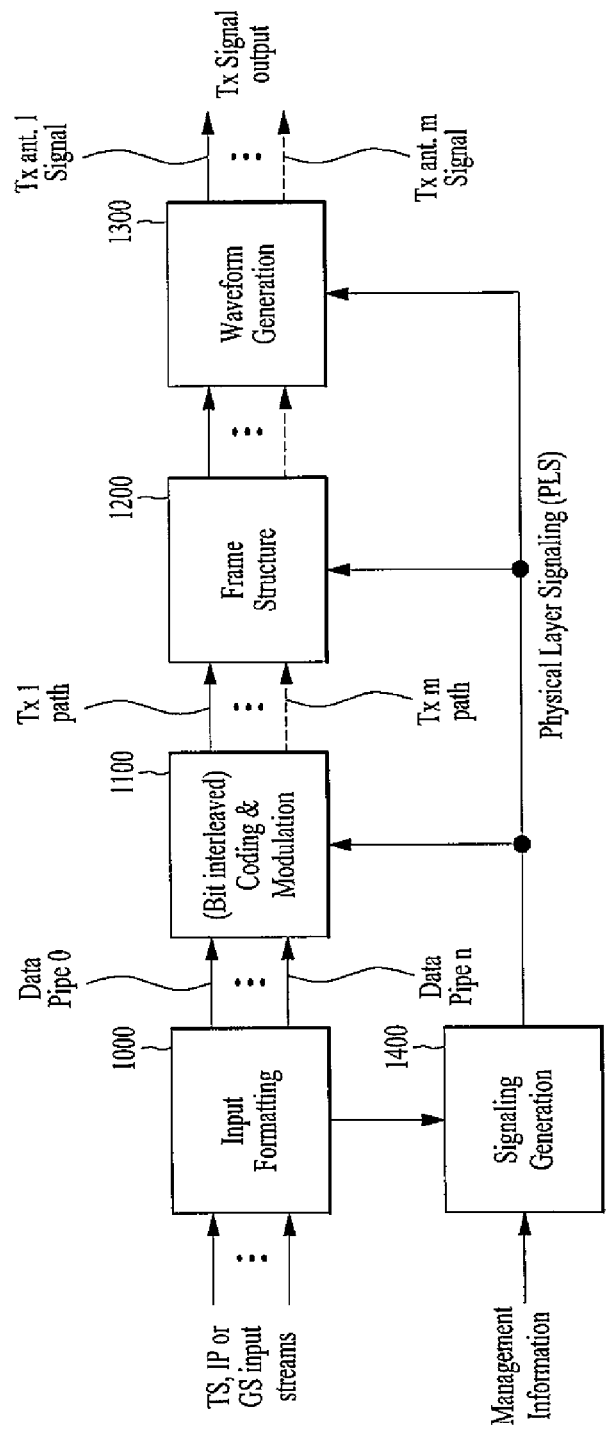
FIG. 33 illustrates a structure of an apparatus for transmitting broadcast signals for future broadcast services according to an embodiment of the present invention.

The broadcast service data carried in a transmission unit such as a PLP or DP may be processed and transmitted through an input processor, a BICM module, a frame builder, and an OFDM generator as FIGS. 1 and 33 disclose. In details, the process is described below.

First, as an example, the embodiments of the input processor are described in FIGS. 13 to 15, or FIGS. 34 and 36.

Herein, Input streams are processed to output transmission units. The input data may have various formats. For example the input data may be MPEG-2 transport streams, IP streams, or general streams.

The transmission units are encoded for forward error correction (S4400000). For example, as one encoding method, LDPC encoding may be used in this process. When the LDPC encoding is used for the FEC, a set of LDPC-encoded bits of the transmission unit data may be output by this process. This process is performed in the embodiment of FIGS. 16 and 17 and will be described in FIG. 37.

The encoded transmission units are mapped on constellations (S4400100). In this process, one of variety of symbol-mapping methods may be used. When the transmission unit data are mapped onto constellations, the cells which are modulation values that are carried by one carrier of the OFDM transmission are determined and outputted.

Even though this figure does not disclose, the interleaved transmission unit data may be de-multiplexed in accordance with a symbol-mapping method and/or a code rate in order to enhance the performance of the FEC encoding. At this time, the order of the bit-interleaved service data may be different from the order of the bits to be mapped in accordance with a symbol-mapping method and/or a code rate. The process is disclosed in FIGS. 16 and 17 and will be described in FIG. 37 as well.

The mapped transmitted units are MIMO-encoded (S4400200). The mapped service data may be MIMO-encoded using a MIMO matrix. Upon transmitting broadcast signals including the transmission unit data through a plurality of antennas, several types of MIMO encodings may be applied to the transmission data in this stage.

The MIMO-encoded transmitted units are time-interleaved (S4400300). This process is disclosed in FIGS. 16 and 17 and will be described in FIG. 37.

Signal frames including the time-interleaved transmission units are built (S4400400). The signal frames include a fixed mode of signal frame and a mobile mode of signal frame. Each frame in the signal frames belongs to one of plural physical profiles.

Physical profiles definitions can be extended using values of the physical signaling data in the preamble.

The signal frames are modulated by OFDM (Orthogonal Frequency Division Multiplex) scheme (S4400500).

Then, the modulated signal frames are transmitted (S4400600). The single frames may be transmitted in a single frequency.

As described, the signal frames include preambles, respectively. The preamble includes the physical signaling data. For example, the physical signaling data may carry basic information about the system as well as the parameters needed to decode the second part. And, the physical signaling data carry more detailed signaling data about the transmission system and the PLPs or DPs. As one example, the physical signaling data may include information on a pilot mode for a corresponding signal frame. As another example, the physical signaling data may include information indicating a type of a payload carried by a transmission unit.

The modulated signal frames are multiplexed in a super frame. The modulated signal frames includes a signal frame for mobile reception and a signal frame for fixed reception. The signaling data includes a pilot pattern of the corresponding signal frame.

The signal frame may include a preamble part including scrambled sequences for signaling information when an emergency event occurs. The preamble part provides an indicator to indicate when a receiver should decide whether to wake up. At that time, the physical signaling data may include information indicating whether EAS data is provided in the signal frame.

The physical signaling data includes information indicating whether or not channel information data for fast service acquisition is in a corresponding signal frame, and the channel information data includes binding information between the service and the transmission units, and the channel information data is located after the physical signaling data.

More in detail, the preamble part may include Fast information channel (FIC) that is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services and so on.

For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer.

The use of FIC is signaled by the physical signaling data. If FIC is used, a flag in the physical signaling data may be set to a specific value.

The preambles include a normal preamble part or robust preamble part, wherein the normal preamble part and the robust preamble part are used for different reception modes, respectively.

The robust preamble part is used for mobile reception. And the signal frames are included in a superframe, and wherein the superframe includes a signal frame for fixed reception and a signal frame for mobile reception.

As the detailed embodiments will be described below.

Figure 32:
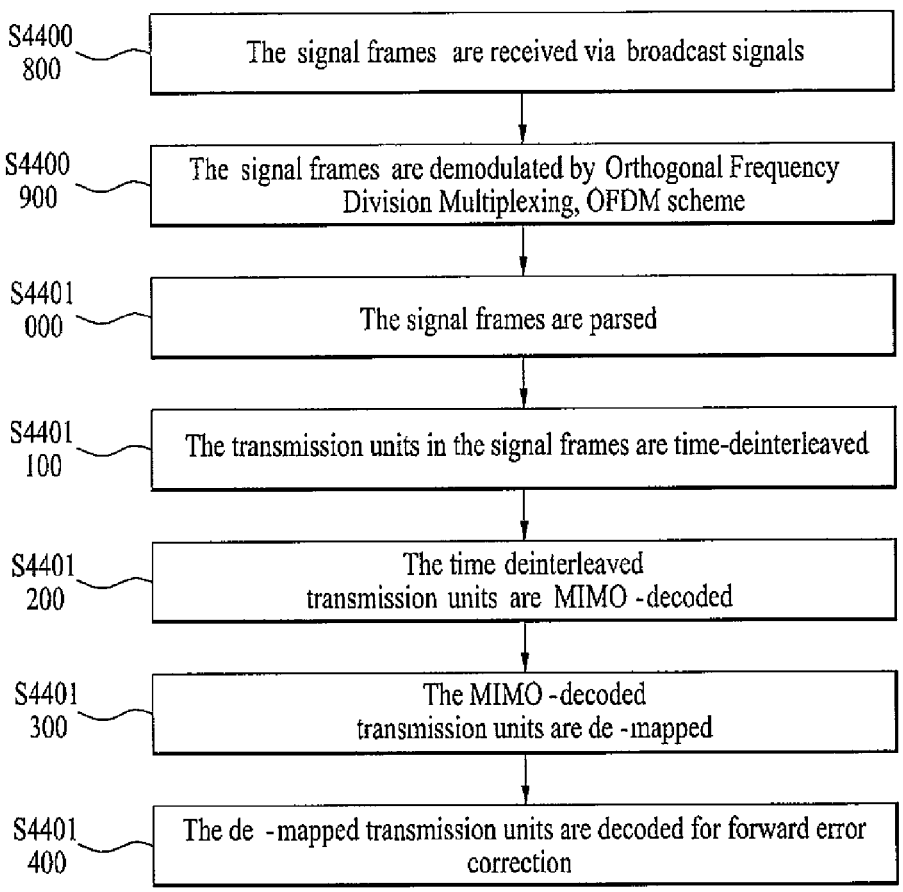
FIG. 32 illustrates a flowchart showing a method for receiving broadcast data according to an embodiment of the present invention.

FIG. 32 illustrates a flowchart showing a method for receiving broadcast data according to an embodiment of the present invention. The embodiment of receiving the broadcast data may be compatible with the embodiments in FIGS. 20 to 25, and may be compatible with the embodiments in FIGS. 40 to 45 as well.

When a receiver receives the broadcast signals which are transmitted by the above processes, the signal frames are received via broadcast signals (S4400800).

The signal frames are demodulated by Orthogonal Frequency Division Multiplexing, OFDM scheme (S4400900).

For example, the signal frames have different frame types in time domain, the different frame types of signal frames are multiplexed in a super frame, which is a set of the signal frames. Then, the physical signaling data may have information on the different frame types of signal frame.

The signal frames are parsed (S4401000).

The signal frames may include Emergency alert channel (EAC). EAC is a dedicated channel for carrying EAS messages and links to the DPs for EAS. But EAC itself may or may not be present in every frame. EAC, if any, is mapped immediately after the physical signaling data.

The transmission units in the signal frames are time-deinterleaved (S4401100).

The time-deinterleaved transmission units are MIMO-decoded (S4401200).

The MIMO-decoded transmission units are de-mapped (S4401300).

The de-mapped transmission units are decoded for forward error correction (S4401400).

For example, the transmission units are FEC-decoded based on a LDPC encoding method and the receiver can detect the code rate and FEC-type information in the physical signaling data.

The decoded transmission units are processed to data streams.

The system provides two-step wake-up signaling to collect Emergency Alert System (EAS) information through EAC. In the first step, the scrambled sequence of the preamble part provides signaling when an emergency occurs. This time domain sequence can wake up a receiver quickly in an emergency situation. The preamble part also carries a flag in the physical signaling data. Detailed information about the preamble will be described below.

For the second step of wake-up, the system provides signaling information to decode EAC in the physical signaling data. PLS2. The physical signaling data carries a plurality types of signaling information related to EAS, which will be also described below.

Additionally, ThE physical signaling data includes information indicating whether or not channel information data for fast service acquisition is in a corresponding signal frame, and the channel information data includes binding information between the service and the transmission units, and the channel information data is located after the physical signaling data.

And, the preamble part may include Fast information channel (FIC) that is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services and so on.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The apparatuses and methods for transmitting according to an embodiment of the present invention may be categorized into a base profile for the terrestrial broadcast service, a handheld profile for the mobile broadcast service and an advanced profile for the UHDTV service. In this case, the base profile can be used as a profile for both the terrestrial broadcast service and the mobile broadcast service. That is, the base profile can be used to define a concept of a profile which includes the mobile profile. This can be changed according to intention of the designer.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

FIG. 33 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 33, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 33, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 34:
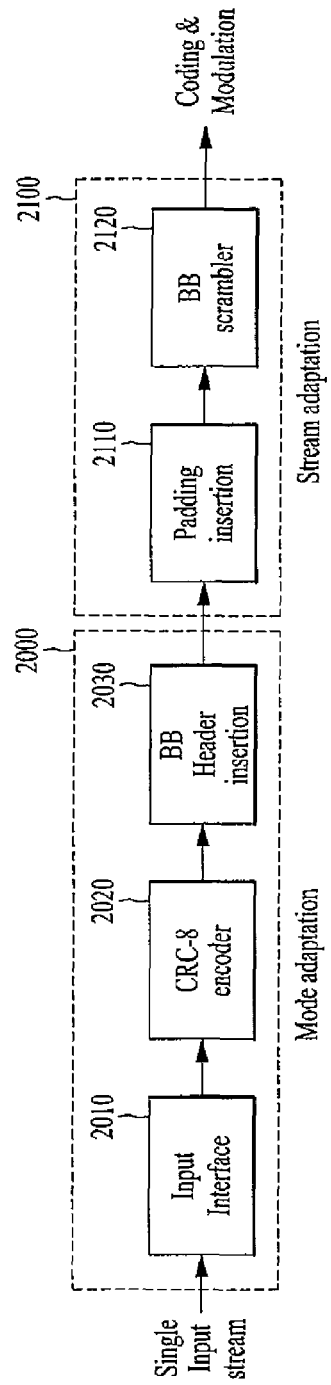
FIG. 34 illustrates an input formatting module according to an embodiment of the present invention.
Figure 35:
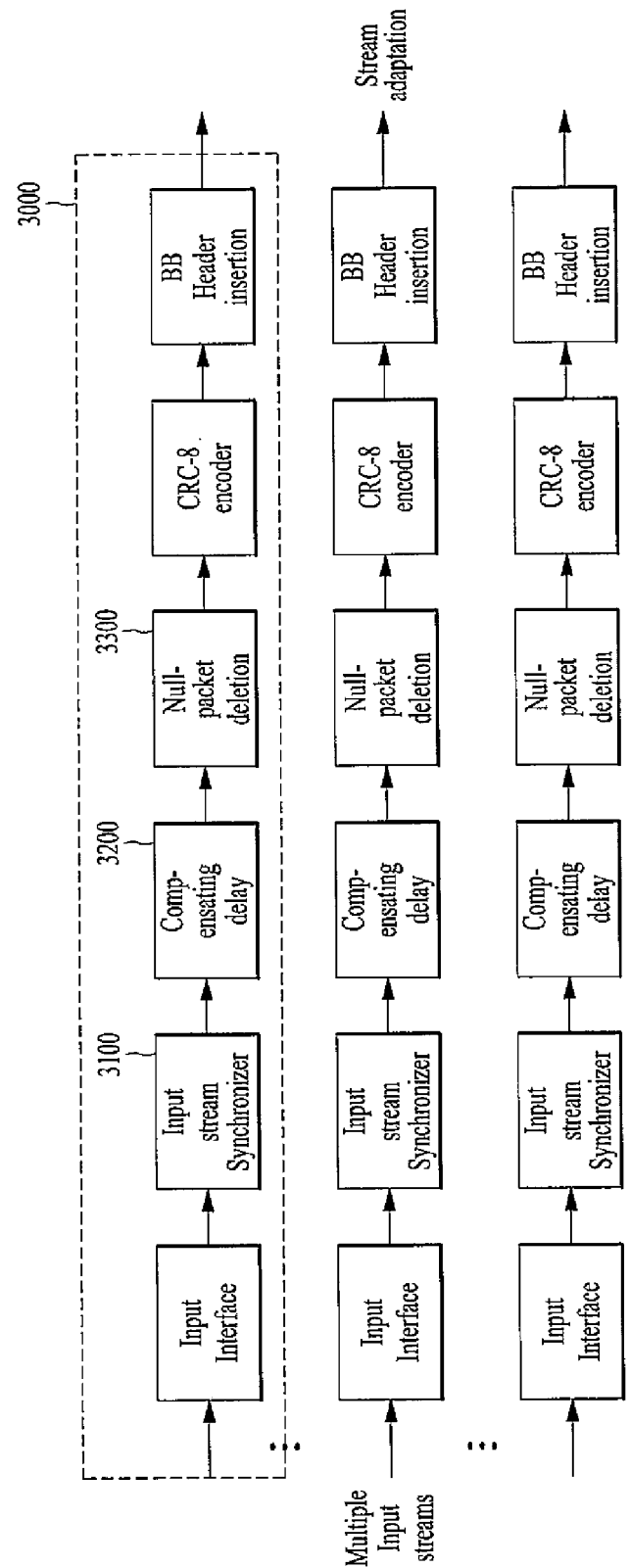
FIG. 35 illustrates an input formatting module according to another embodiment of the present invention.
Figure 36:
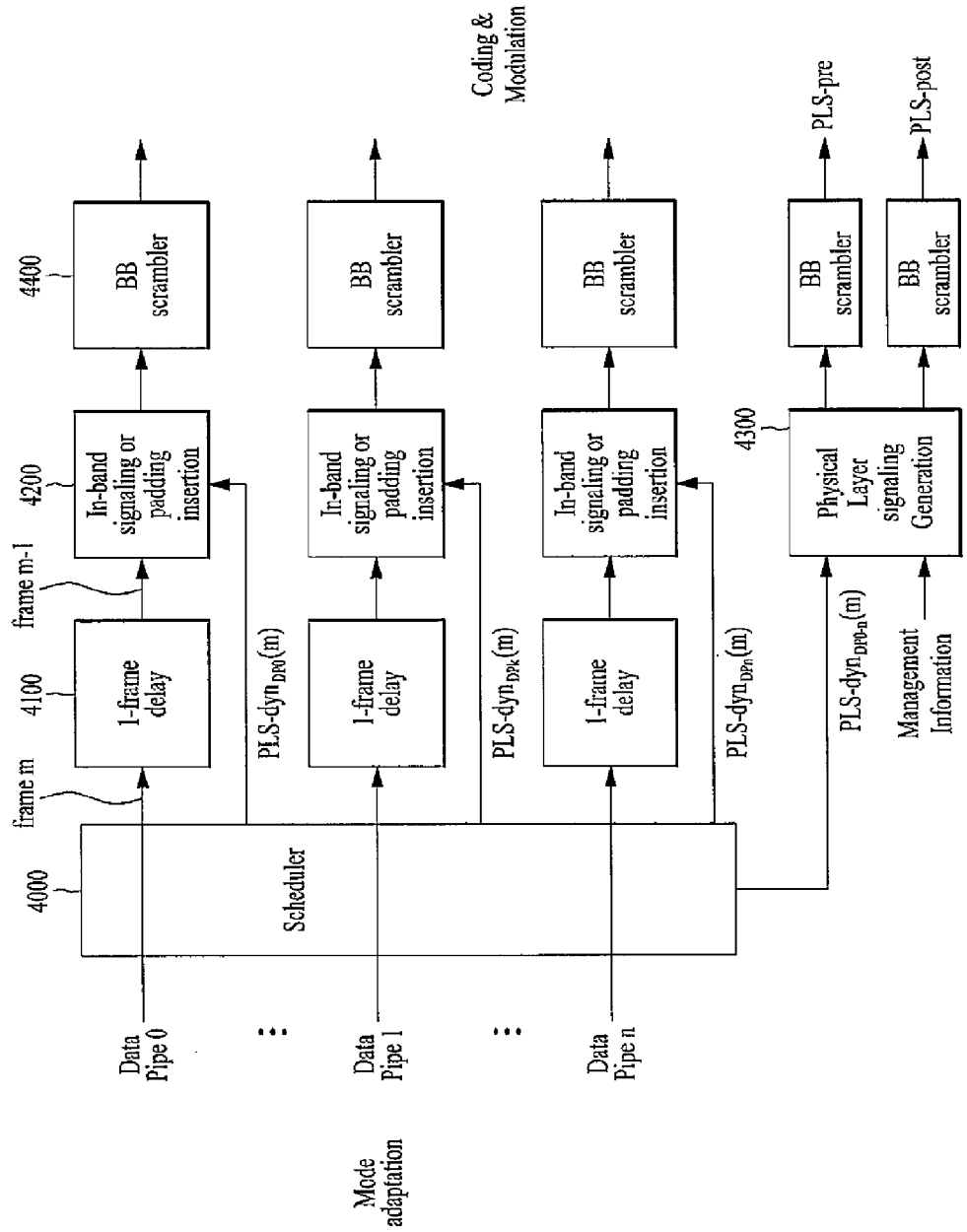
FIG. 36 illustrates an input formatting module according to another embodiment of the present invention.

FIGS. 34, 35 and 36 illustrate the input formatting module 1000 according to embodiments of the present invention. A description will be given of each figure.

FIG. 34 illustrates an input formatting module according to one embodiment of the present invention. FIG. 34 shows an input formatting module when the input signal is a single input stream.

Referring to FIG. 34, the input formatting module according to one embodiment of the present invention can include a mode adaptation module 2000 and a stream adaptation module 2100.

As shown in FIG. 34, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 34, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 34, the input formatting module can finally output data pipes to the coding & modulation module.

FIG. 35 illustrates an input formatting module according to another embodiment of the present invention. FIG. 35 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 35, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 34 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 36 illustrates an input formatting module according to another embodiment of the present invention.

Specifically, FIG. 36 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-tocell demux block, a cell interleaver block, a time interleaver block, etc. included in the coding & modulation module illustrated in FIG. 33.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 36, scrambling of the BB scrambler block 4400 is applicable to both data pipes and physical layer signaling information.

The above-described blocks may be omitted or replaced by blocks having similar or identical functions according to designer.

As shown in FIG. 36, the stream adaptation module can finally output the data pipes to the coding & modulation module.

Figure 37:
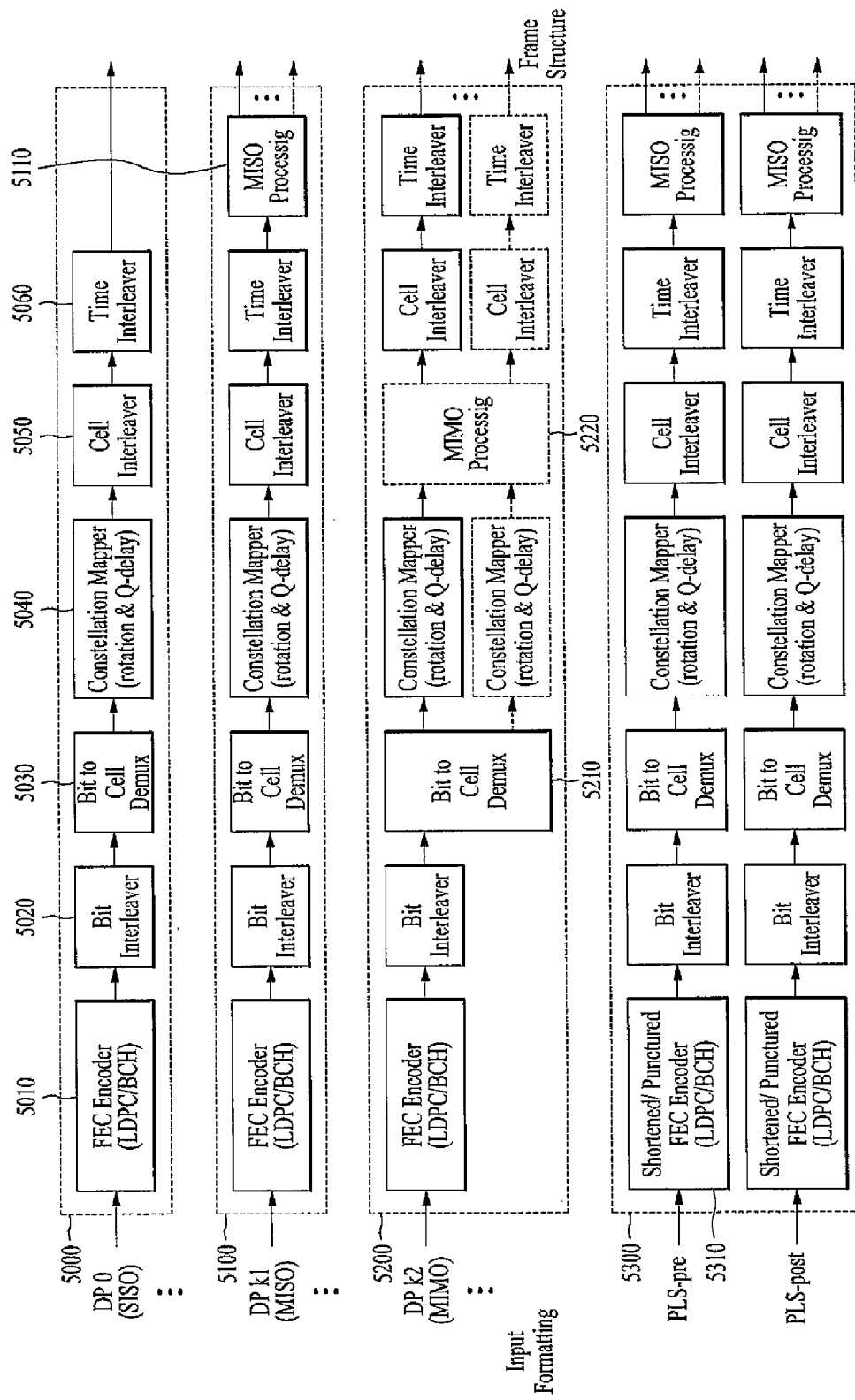
FIG. 37 illustrates a coding & modulation module according to an embodiment of the present invention.

FIG. 37 illustrates a coding & modulation module according to an embodiment of the present invention.

The coding & modulation module shown in FIG. 37 corresponds to an embodiment of the coding & modulation module illustrated in FIG. 33.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 37 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 37. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 37, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad Os corresponding to a desired input bit stream length necessary for normal LDPC encoding, carry out LDPC encoding and then remove the padded Os to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 37, the coding & modulation module can output the data pipes (or DP data), PLS-pre information and PLS-post information processed for the respective paths to the frame structure module.

Figure 38:
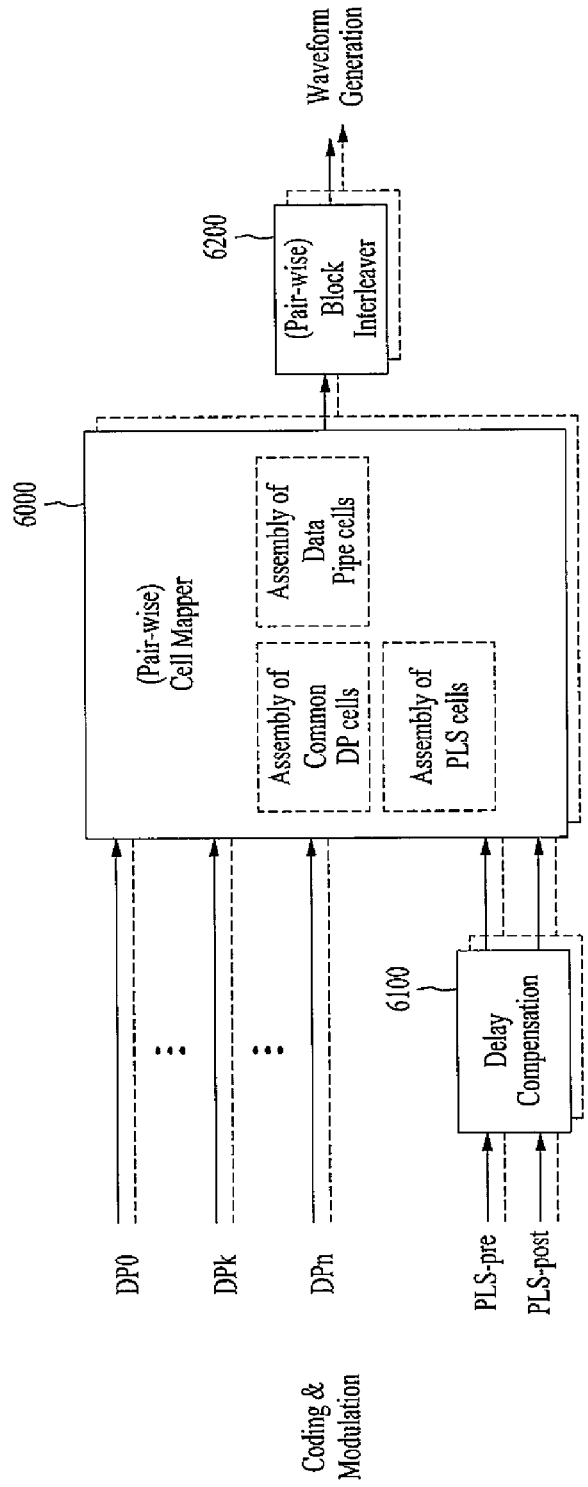
FIG. 38 illustrates a frame structure module according to an embodiment of the present invention.

FIG. 38 illustrates a frame structure module according to one embodiment of the present invention.

The frame structure module shown in FIG. 38 corresponds to an embodiment of the frame structure module 1200 illustrated in FIG. 33.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 38, the frame structure module can output at least one signal frame to the waveform generation module.

Figure 39:
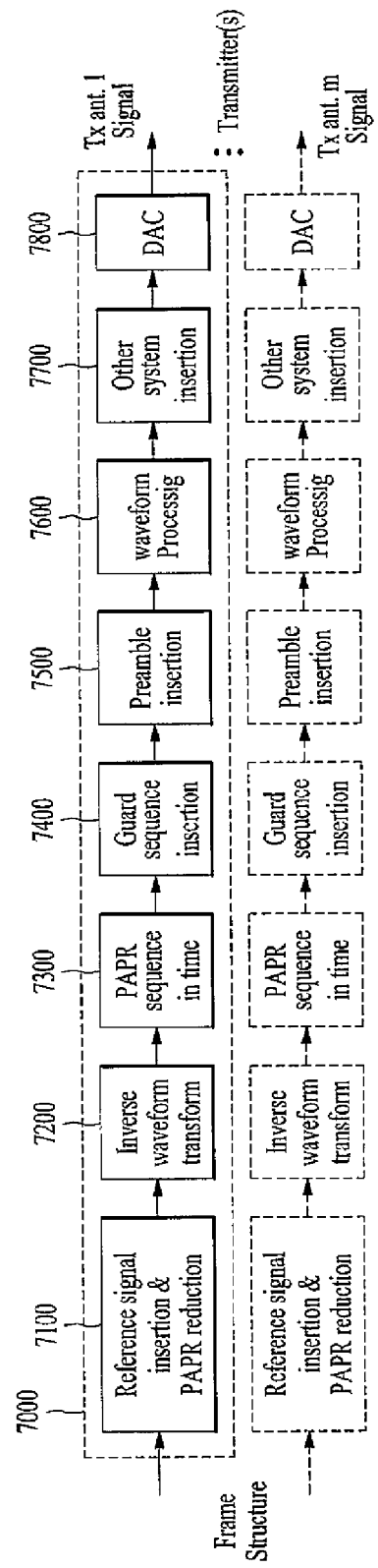
FIG. 39 illustrates a waveform generation module according to an embodiment of the present invention.

FIG. 39 illustrates a waveform generation module according to an embodiment of the present invention.

The waveform generation module illustrated in FIG. 39 corresponds to an embodiment of the waveform generation module 1300 described with reference to FIG. 33.

The waveform generation module according to an embodiment of the present invention can modulate and transmit as many signal frames as the number of antennas for receiving and outputting signal frames output from the frame structure module illustrated in FIG. 38.

Specifically, the waveform generation module illustrated in FIG. 39 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 40:
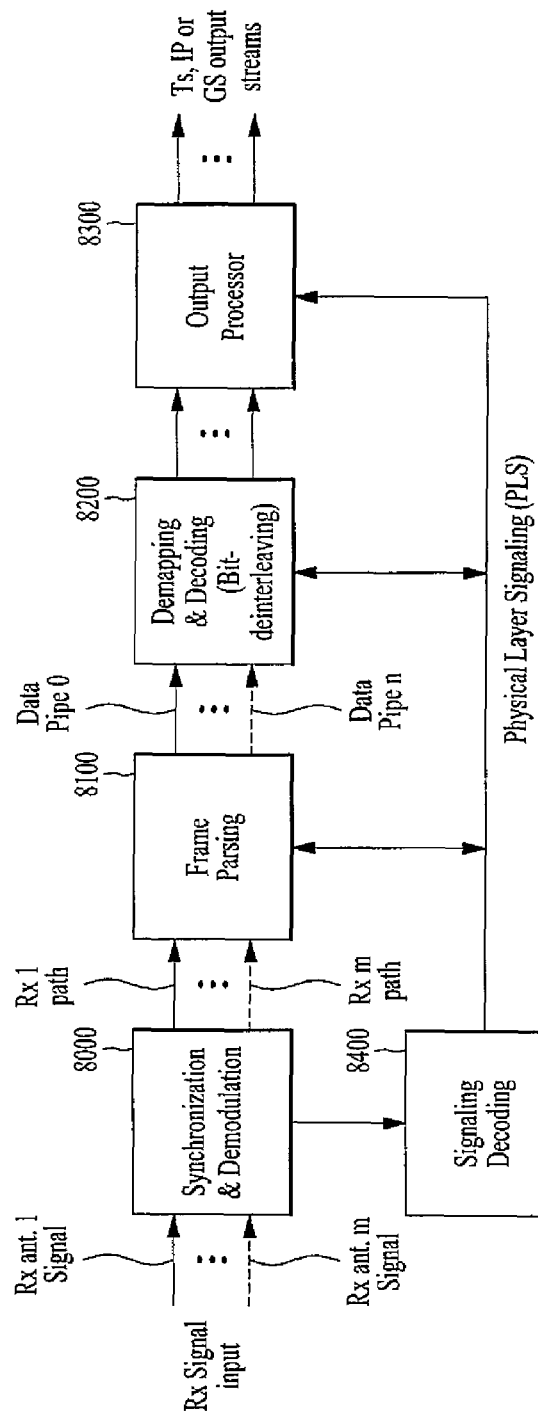
FIG. 40 illustrates a structure of an apparatus for receiving broadcast signals for future broadcast services according to an embodiment of the present invention.

FIG. 40 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 33. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 41:
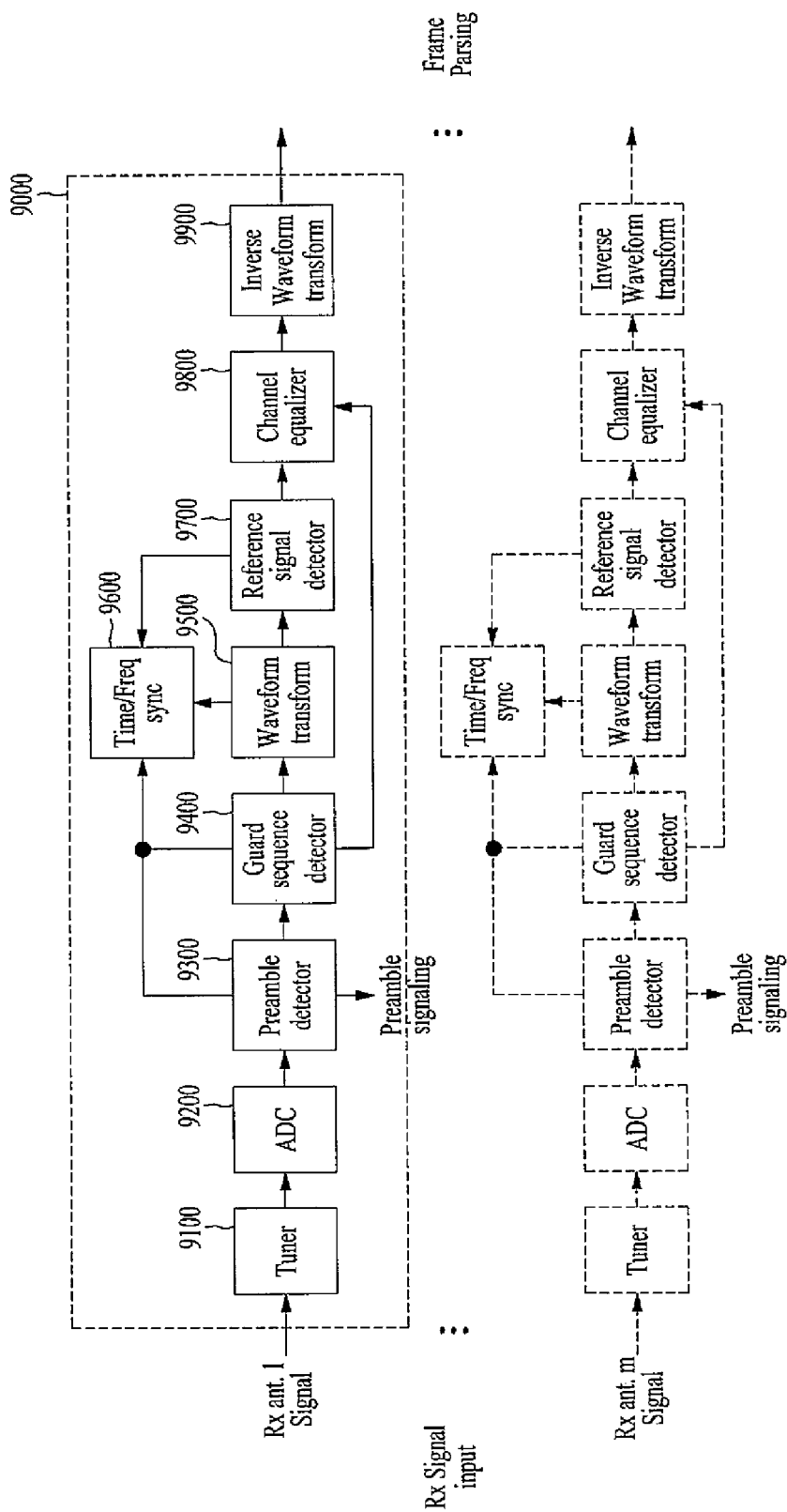
FIG. 41 illustrates a synchronization & demodulation module according to an embodiment of the present invention.

FIG. 41 illustrates a synchronization & demodulation module according to an embodiment of the present invention.

The synchronization & demodulation module shown in FIG. 41 corresponds to an embodiment of the synchronization & demodulation module described with reference to FIG. 40. The synchronization & demodulation module shown in FIG. 41 can perform a reverse operation of the operation of the waveform generation module illustrated in FIG. 39.

As shown in FIG. 41, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 42:
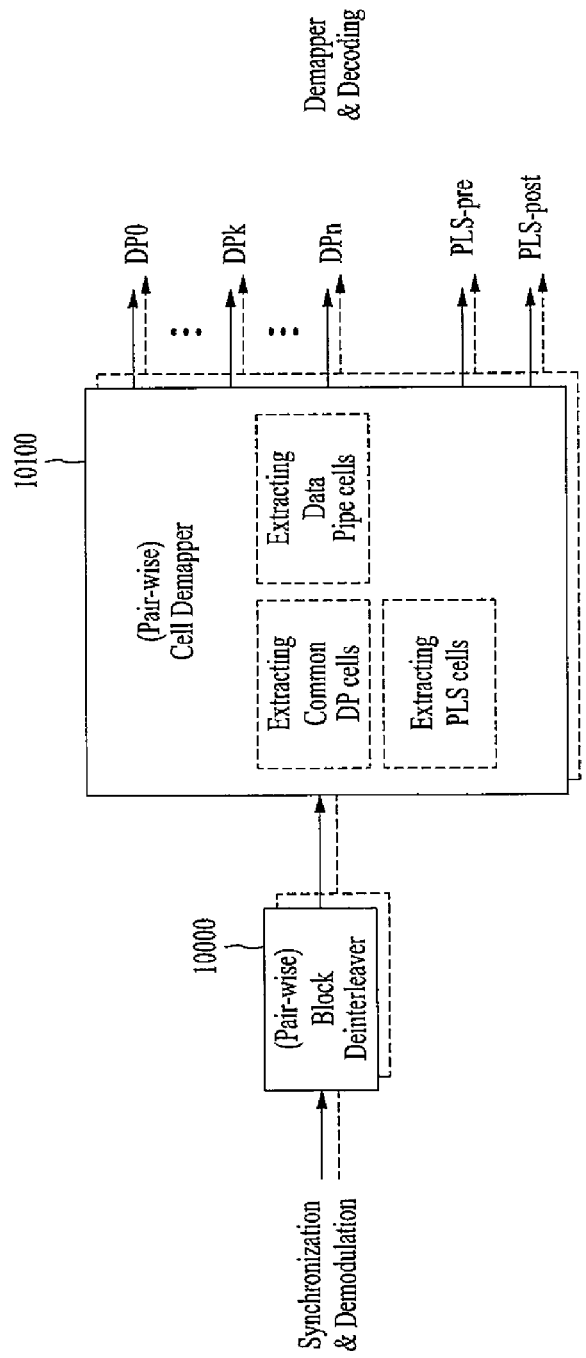
FIG. 42 illustrates a frame parsing module according to an embodiment of the present invention.

FIG. 42 illustrates a frame parsing module according to an embodiment of the present invention.

The frame parsing module illustrated in FIG. 42 corresponds to an embodiment of the frame parsing module described with reference to FIG. 40. The frame parsing module shown in FIG. 42 can perform a reverse operation of the operation of the frame structure module illustrated in FIG. 38.

As shown in FIG. 42, the frame parsing module according to an embodiment of the present invention can include at least one block deinterleaver 10000 and at least one cell demapper 10100.

The block deinterleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 40, the block deinterleaver 10000 can process two consecutive pieces of data as a pair for each input path. Accordingly, the block interleaver 10000 can output two consecutive pieces of data even when deinterleaving has been performed. Furthermore, the block deinterleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 38, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 43:
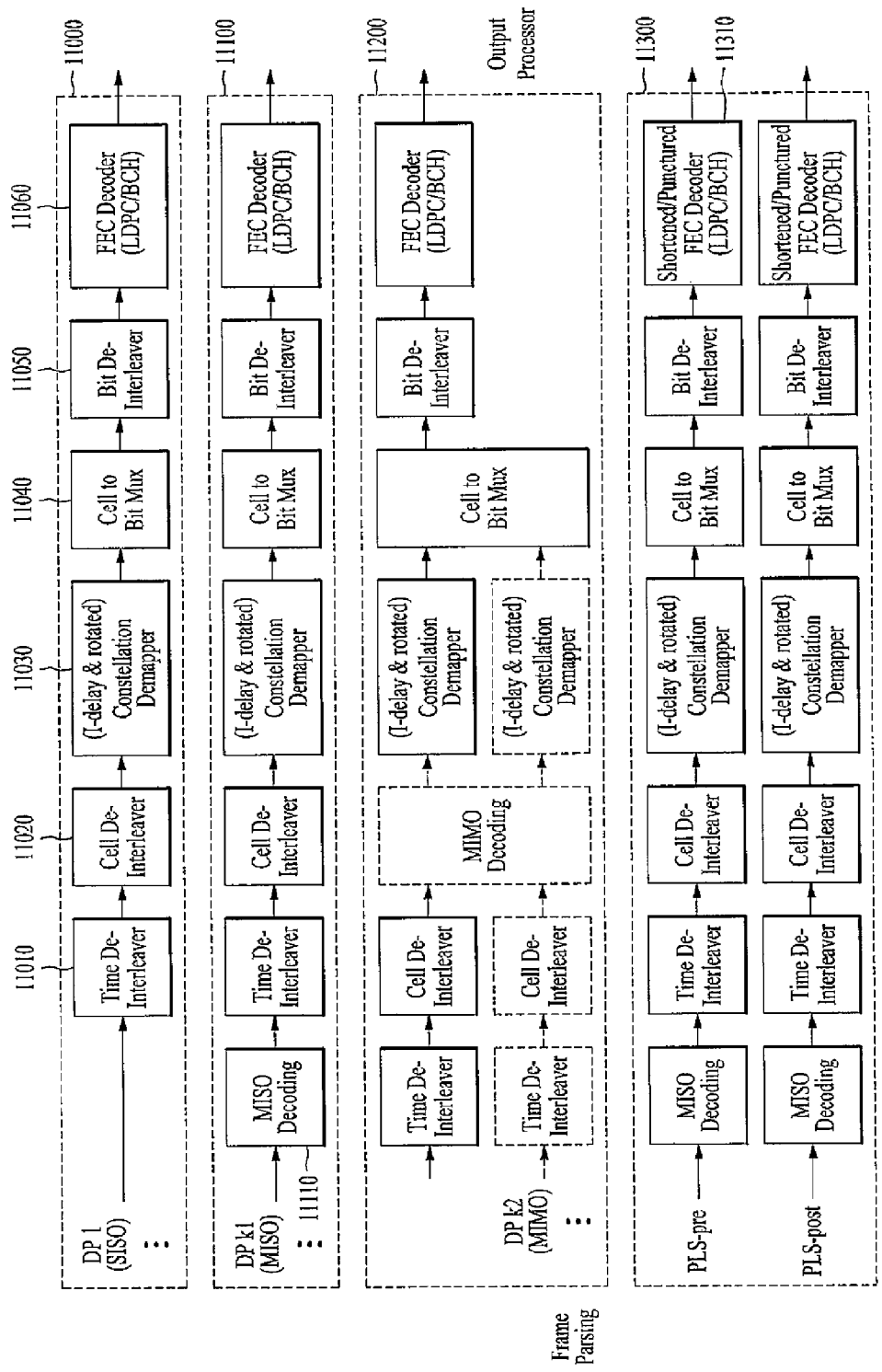
FIG. 43 illustrates a demapping & decoding module according to an embodiment of the present invention.

FIG. 43 illustrates a demapping & decoding module according to an embodiment of the present invention.

The demapping & decoding module shown in FIG. 43 corresponds to an embodiment of the demapping & decoding module illustrated in FIG. 40. The demapping & decoding module shown in FIG. 43 can perform a reverse operation of the operation of the coding & modulation module illustrated in FIG. 37.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 43 can include blocks for processing data output from the frame parsing module according to SISO, MISO and MIMO in response to the apparatus for transmitting broadcast signals.

As shown in FIG. 43, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 43 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 37. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 37. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 37. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 37. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 37. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 37. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 43. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 37. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 43. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 37. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 37.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 37. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 43.

Figure 44:
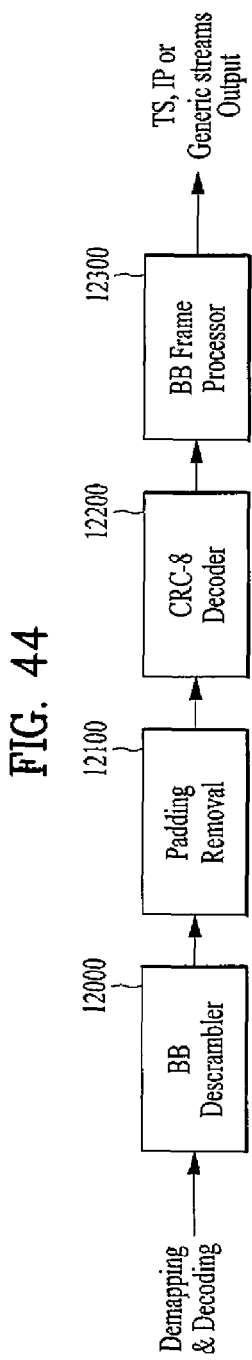
FIG. 44 illustrates an output processor according to an embodiment of the present invention.
Figure 45:
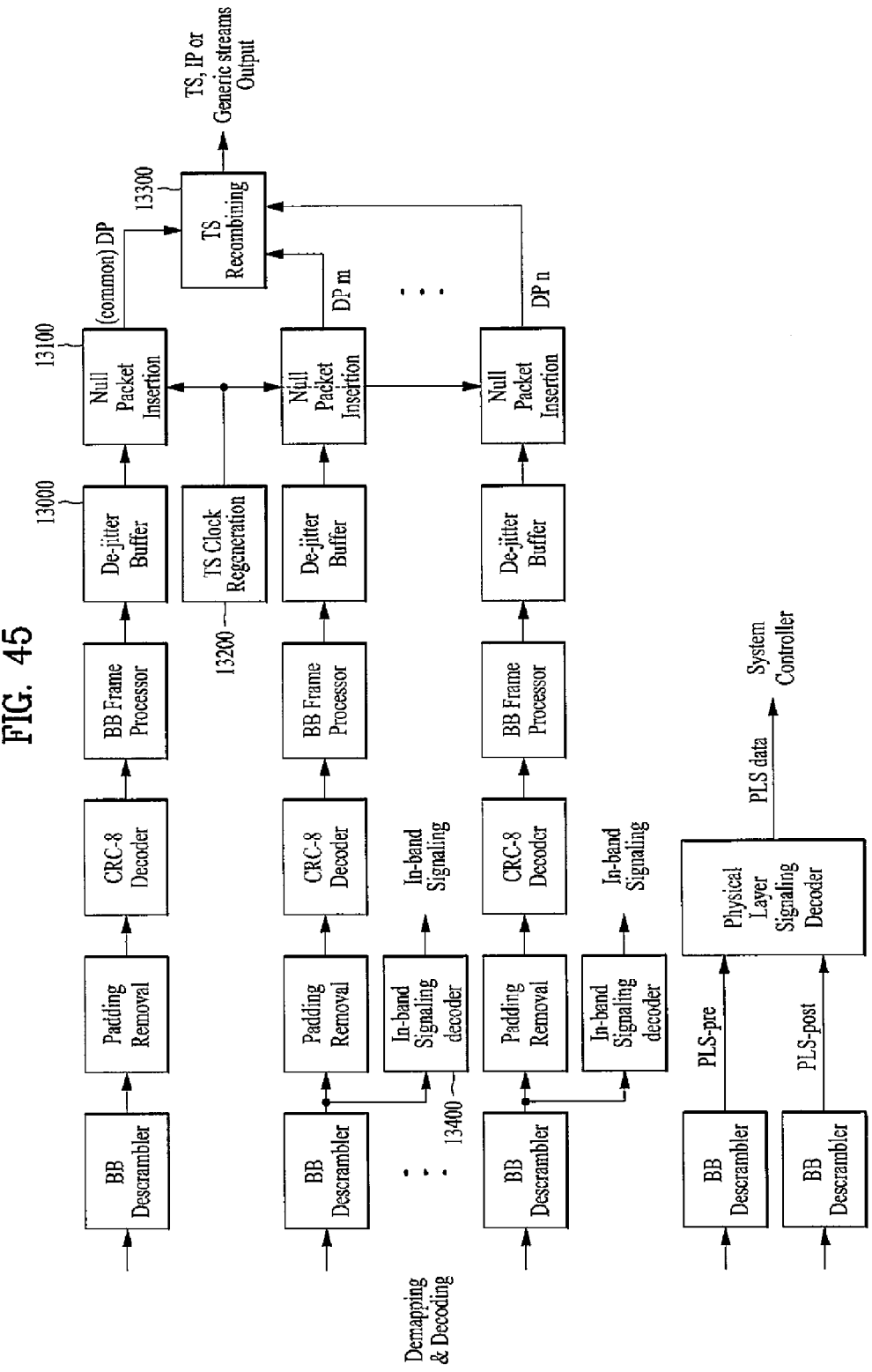
FIG. 45 illustrates an output processor according to another embodiment of the present invention.

FIGS. 44 and 45 illustrate output processors according to embodiments of the present invention.

FIG. 44 illustrates an output processor according to an embodiment of the present invention. The output processor illustrated in FIG. 44 corresponds to an embodiment of the output processor illustrated in FIG. 40. The output processor illustrated in FIG. 44 receives a single data pipe output from the demapping & decoding module and outputs a single output stream. The output processor can perform a reverse operation of the operation of the input formatting module illustrated in FIG. 34.

The output processor shown in FIG. 44 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 45 illustrates an output processor according to another embodiment of the present invention. The output processor shown in FIG. 45 corresponds to an embodiment of the output processor illustrated in FIG. 40. The output processor shown in FIG. 45 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 45 can include a BB descrambler block, a padding removal block, a CRC-8 decoder block and a BB frame processor block as the output processor illustrated in FIG. 44. The basic roles of these blocks correspond to those of the blocks described with reference to FIG. 44 although operations thereof may differ from those of the blocks illustrated in FIG. 44.

A de-jitter buffer block 13000 included in the output processor shown in FIG. 45 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 45 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 46:
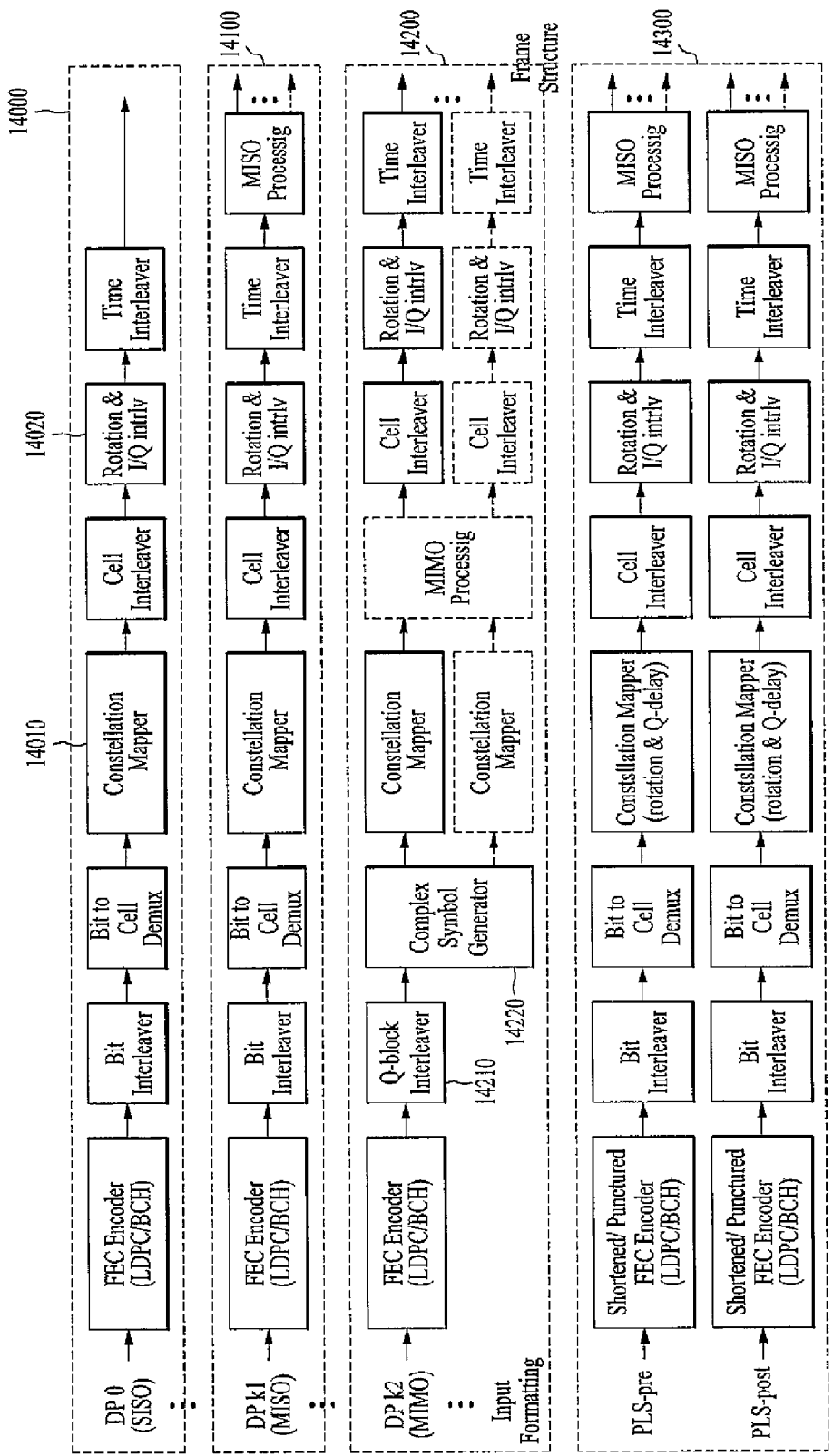
FIG. 46 illustrates a coding & modulation module according to another embodiment of the present invention.

FIG. 46 illustrates a coding & modulation module according to another embodiment of the present invention.

The coding & modulation module shown in FIG. 46 corresponds to another embodiment of the coding & modulation module illustrated in FIGS. 33 to 37.

To control QoS for each service or service component transmitted through each data pipe, as described above with reference to FIG. 37, the coding & modulation module shown in FIG. 46 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 46 are similar to the first to fourth blocks 5000 to 5300 illustrated in FIG. 37.

However, the first to fourth blocks 14000 to 14300 shown in FIG. 46 are distinguished from the first to fourth blocks 5000 to 5300 illustrated in FIG. 37 in that a constellation mapper 14010 included in the first to fourth blocks 14000 to 14300 has a function different from the first to fourth blocks 5000 to 5300 illustrated in FIG. 37, a rotation & I/Q interleaver block 14020 is present between the cell interleaver and the time interleaver of the first to fourth blocks 14000 to 14300 illustrated in FIG. 46 and the third block 14200 for MIMO has a configuration different from the third block 5200 for MIMO illustrated in FIG. 37. The following description focuses on these differences between the first to fourth blocks 14000 to 14300 shown in FIG. 46 and the first to fourth blocks 5000 to 5300 illustrated in FIG. 37.

The constellation mapper block 14010 shown in FIG. 46 can map an input bit word to a complex symbol. However, the constellation mapper block 14010 may not perform constellation rotation, differently from the constellation mapper block shown in FIG. 37. The constellation mapper block 14010 shown in FIG. 46 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 46.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 46, can output data pipes, PLS-pre information and PLS-post information processed for respective paths to the frame structure module.

Figure 47:
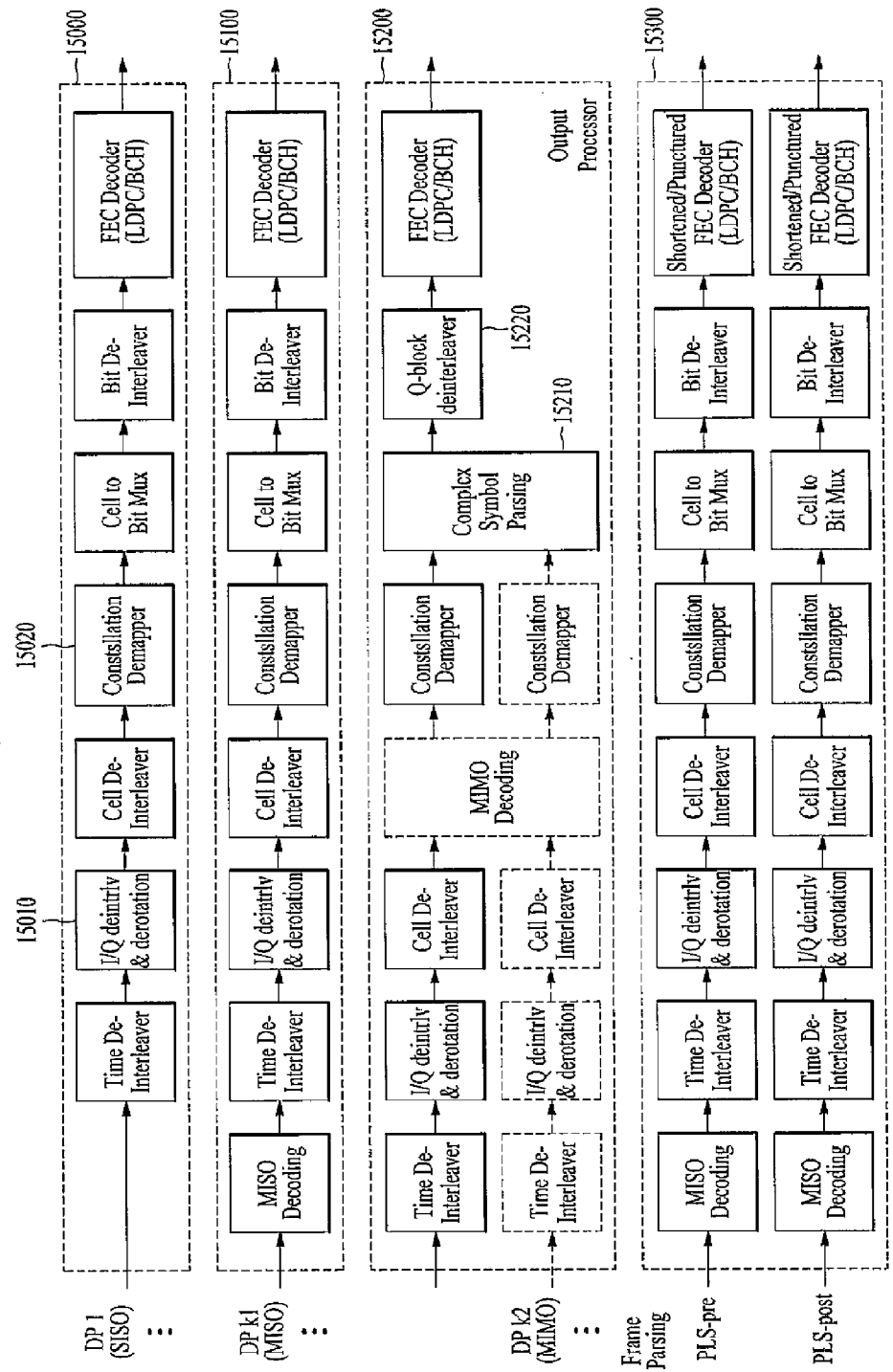
FIG. 47 illustrates a demapping & decoding module according to another embodiment of the present invention.

FIG. 47 illustrates a demapping & decoding module according to another embodiment of the present invention.

The demapping & decoding module shown in FIG. 47 corresponds to another embodiment of the demapping & decoding module illustrated in FIG. 43. The demapping & decoding module shown in FIG. 47 can perform a reverse operation of the operation of the coding & modulation module illustrated in FIG. 46.

As shown in FIG. 47, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 47 are similar to the first to fourth blocks 11000 to 11300 illustrated in FIG. 43.

However, the first to fourth blocks 15000 to 15300 shown in FIG. 47 are distinguished from the first to fourth blocks 11000 to 11300 illustrated in FIG. 43 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 43 and the third block 15200 for MIMO has a configuration different from the third block 11200 for MIMO illustrated in FIG. 43. The following description focuses on these differences between the first to fourth blocks 15000 to 15300 shown in FIG. 47 and the first to fourth blocks 11000 to 11300 illustrated in FIG. 43.

The I/Q deinterleaver & derotation block 15010 can perform a reverse process of the process performed by the rotation & I/Q interleaver block 14020 illustrated in FIG. 46. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 46. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 47.

The complex symbol parsing block 15210 can perform a reverse process of the process performed by the complex symbol generator block 14220 illustrated in FIG. 46. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 46. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 47, the demapping & decoding module according to another embodiment of the present invention can output data pipes and PLS information processed for respective paths to the output processor.

As described above, the apparatus and method for transmitting broadcast signals according to an embodiment of the present invention can multiplex signals of different broadcast transmission/reception systems within the same RF channel and transmit the multiplexed signals and the apparatus and method for receiving broadcast signals according to an embodiment of the present invention can process the signals in response to the broadcast signal transmission operation. Accordingly, it is possible to provide a flexible broadcast transmission and reception system.

As described above, the waveform generation module 1300 according to an embodiment of the present invention may convert signal frames output from the frame structure module 1200 into ultimately transmittable signals. In this case, the waveform generation module 1300 according to an embodiment of the present invention may use a phase pre-distortion (PPD) method (or phase distortion). The phase pre-distortion method according to an embodiment of the present invention may be also referred to as a distributed MISO scheme or 2D-eSFN. In addition, the present invention assumes that input signals of the waveform generation block 1300 are the same.

The system according to the present invention supports the SFN (Single Frequency Network) network, where distributed MISO scheme is optionally used to support very robust transmission mode. The 2D-eSFN is a distributed MISO scheme that uses multiple TX antennas, each of which is located in the different transmitter site in the SFN network.

In the SFN configuration, the 2D-eSFN processing independently distorts the phase of the signals transmitted from multiple transmitters, in order to create both time and frequency diversity. Hence, burst errors due to low flat fading or deep-fading for a long time can be mitigated.

According to the phase pre-distortion method of the present invention, the performance of channel estimation by a broadcast signal reception apparatus may not deteriorate and gain distortion of a transmission signal may not be caused and thus the loss of transmission capacity due to the gain distortion may be minimized.

In addition, the phase pre-distortion method of the present invention may be applied independently to a plurality of TX antennas as described above and thus a diversity gain may be achieved. Further, since the broadcast signal reception apparatus does not need to process phase pre-distortion, additional complexity is not required to design the broadcast signal reception apparatus.

Figure 48:
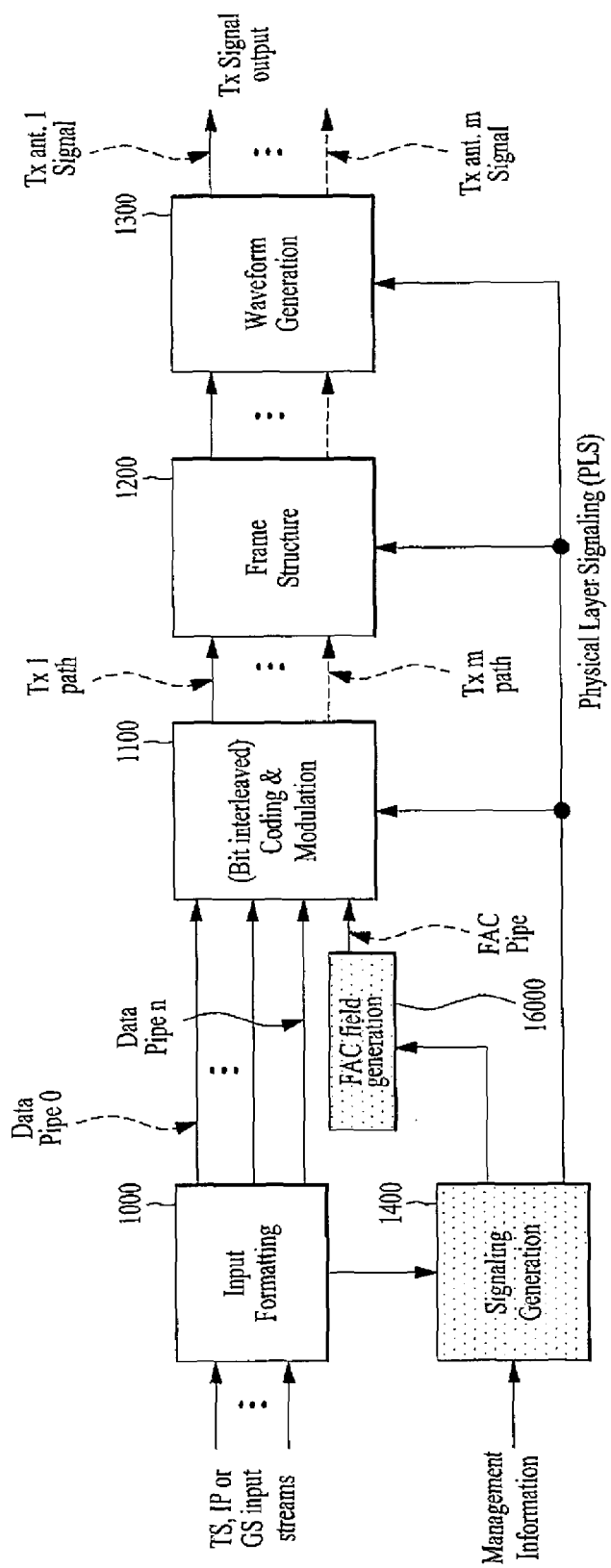
FIG. 48 is a diagram illustrating a broadcast signal transmitter according to one embodiment of the present invention.

FIG. 48 is a diagram illustrating a broadcast signal transmitter according to one embodiment of the present invention.

Before description is given of FIG. 48, details of the FAC field generated by a FAC field generation module 16000 will be described.

FAC (Fast Acquisition Channel) is data containing information allowing a broadcast signal receiver to quickly acquire information about services contained in a broadcast signal received over a radio frequency (RF) channel or information enabling fast scan of multiple RF channels. Hereinafter, the FAC will be called a fast information channel (FIC) in this specification.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services. The FIC data is generated and consumed in the Management Layer.

A broadcast signal transmitter according to one embodiment of the present invention may allocate the FAC in a signal frame separately from (independently of) a data region for transmission of services. The main object of the FAC is to efficiently transmit essential information for fast acquisition of broadcasting services. The FAC may include information about services that a current signal frame includes. The FAC may carry the number and types of services included in a frame that the broadcast signal receiver receives over an RF channel, and information about DPs which correspond to the respective services and enable decoding of the services. Details of a FAC field containing the information about the services will be described later.

The broadcast signal transmitter according to one embodiment of the present invention may include an input formatting module 1000, a coding & modulation module 1100, a frame structure module 1200, a waveform generation module 1300, a signaling generation module 1400, and a FAC field generation module 16000. The input formatting module 1000, coding & modulation) module 1100, frame structure module 1200, waveform generation module 1300 and signaling generation module 1400 may operate in same manner as described above.

The FAC field generation module 16000 of the broadcast signal transmitter may generate a FAC field. In addition, the broadcast signal transmitter may transmit the FAC field by mapping the FAC field onto a signal frame. While the FAC field generation module 16000 and the signaling generation module 1400 are separately shown in FIG. 48, the signaling generation module 1400 may perform the operation of the FAC field generation module 16000, or in some cases, the signaling generation module 1400 may include the FAC field generation module 16000.

The FAC may be omitted depending on the intention of the designer, and the preamble or PLS may contain information indicating whether or not the FAC is present.

The illustrated blocks may be omitted or replaced with other blocks having functions similar to or the same as the functions of the illustrated blocks, depending on the intention of the designer.

As described above, a signal frame according to one embodiment of the present invention may include a preamble symbol, PLS data and DP data. One signal frame may include a plurality of OFDM symbols, which may be classified as follows to transmit the PLS data and DP data described above.

The preamble symbol, which is a fixed-length pilot symbol that may carry preamble data (which may be called basic PLS data), is located in the beginning of a frame.

The signaling symbol (or frame signaling symbol (FSS)) is an OFDM symbol with higher pilot density used at the start of a frame which carries a part of the PLS data. In terms of size, the signaling symbol may have a variable length. The signal frame according to the illustrated embodiment may include at least one signaling symbol, which may be positioned behind the preamble symbol described above.

The preamble symbol may be used as a concept including a signaling symbol. In addition, according to this embodiment, a region including the preamble symbol and the at least one signaling symbol in the signal frame may be called a preamble or preamble symbol region. Or the region having the preamble symbol alone may be called a preamble. The definition of the region may be changed depending on the intention of the designer.

The data symbol is used in DP data mapping. The signal frame of the illustrated embodiment may include a plurality of data symbols, which may be positioned behind the signaling symbol described above. In the present invention, a region including data symbols in a signal frame may be called a data symbol region.

According to one embodiment of the present invention, the FAC data may be mapped onto the signaling symbol only, or may be continuously mapped onto a data symbol positioned behind the signaling symbol. The position of the FAC data in a signal frame will be described later.

As described above with reference to FIG. 40, the broadcast signal receiver according to one embodiment can include a synchronization & demodulation module 8000, a frame parsing module 8100, a demapping & decoding module 8200, an output processor 8300 and a signaling decoding module 8400. Each module operates as described above. The signaling decoding module 8400 may perform FAC data decoding. Alternatively, the signaling decoding module 8400 may include a FAC data decoding module, which is not illustrated in FIG. 48. Alternatively, the demapping & decoding module 8200 may include a FAC data decoding module, which is not illustrated in FIG. 48. The FAC data decoding module may be positioned independently of the signaling decoding module 8400 or the demapping & decoding module 8200.

The FAC decoding scheme for the broadcast signal receiver of the illustrated embodiment may change depending on the method (or position) in which the FAC is inserted in a signal frame.

Specifically, the broadcast signal receiver of this embodiment may perform PLS data decoding and FAC data decoding independently. That is, the broadcast signal receiver may detect a preamble and then decode FAC data. The broadcast signal transmitter may insert the FAC between PLS-pre and PLS-post to allow the broadcast signal receiver to perform the PLS data decoding and the FAC data decoding independently.

Alternatively, the broadcast signal receiver perform the PLS data decoding and then perform the FAC data decoding. That is, the broadcast signal receiver may decode PLS data and then FAC data after detecting the preamble. The broadcast signal transmitter may insert the FAC after the PLS.

Figure 49:
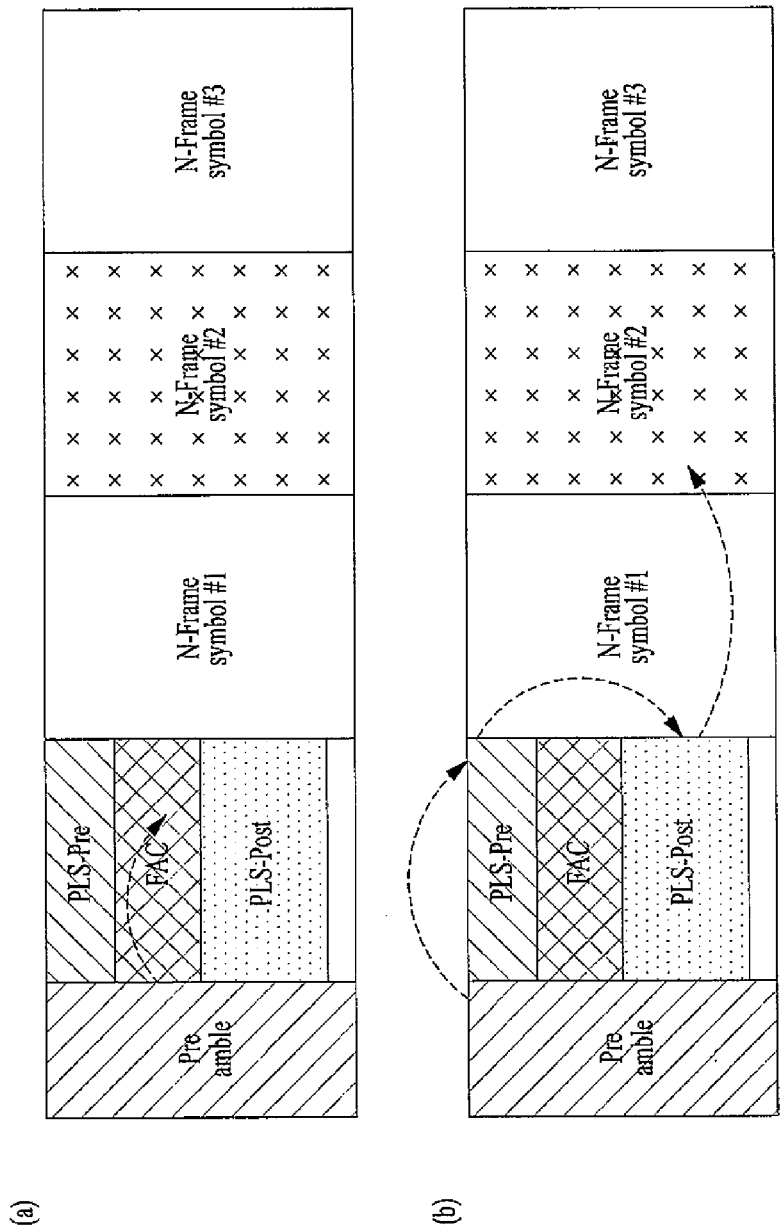
FIG. 49 illustrates operation of a broadcast signal receiver according to one embodiment of the present invention.

FIG. 49 illustrates operation of a broadcast signal receiver according to one embodiment of the present invention.

FIG. 49 illustrates operation of the broadcast signal receiver according to one embodiment which performs the FAC data decoding without performing the PLS decoding in the case in which the broadcast signal receiver receives a signal frame including a FAC. A broadcast signal transmitter according to one embodiment may build a signal frame including the FAC having a fixed size. In this case, the broadcast signal transmitter may insert (or map) the FAC between PLS-pre information and PLS-post information to build a signal frame.

According to this embodiment, the signal frame may be continuously transmitted over one RF channel in the time axis, and FIG. 49 shows a signal frame transmitted for the N-th time (indicated by N-Frame). As described above, the preamble may be positioned at the foremost end of a signal frame, and the PLS-pre information, FAC, and PLS-post information may be subsequently mapped. Thereafter, data symbol #1 (indicated by symbol #1 in FIG. 49), data symbol #2 (indicated by symbol #2 in FIG. 49), and data symbol #3 (indicated by symbol #3 in FIG. 49) may be sequentially mapped.

FIG. 49(*a*) is a diagram illustrating a process in which a broadcast signal receiver according to one embodiment decodes the FAC data included in a signal frame.

FIG. 49(*b*) is a diagram illustrating a process in which the broadcast signal receiver according to one embodiment decodes the DP data included in the signal frame.

The arrows shown in the figures represent a sequence of specific operations of the broadcast signal receiver performed in the signal frame to acquire the FAC or DP data.

Referring to FIG. 49(*a*), according to this embodiment, the PLS-pre information included in the signal frame may have a fixed size. The broadcast signal receiver may detect a preamble, thereby acquiring information for decoding the PLS-pre information. That is, according to this embodiment, the preamble may include information indicating the length of the PLS-pre information, a type of modulation (MOD) applied to the PLS-pre information, and a type of code rate (COD) applied to the PLS-pre information. Accordingly, the broadcast signal receiver may detect the preamble, thereby acquiring the length of the PLS-pre information and directly detecting the position of the FAC mapped after the PLS-pre information. That is, the broadcast signal receiver may directly decode the FAC data without decoding the PLS-pre information.

Referring to FIG. 49(b), the broadcast signal receiver of this embodiment may decode the preamble and then acquire information about the PLS-pre. Thereafter, the broadcast signal receiver may decode the PLS-pre information based on the acquired information about the PLS-pre, thereby acquiring the information about the PLS-post. The PLS-pre information may include information indicating the length of the PLS-post information, the type of modulation (MOD) applied to the PLS-post information, and the type of code rate (COD) applied to the PLS-post information and PLS-offset information indicating the length of the FAC. According to this embodiment, the PLS-offset may be set to '0' if the signal frame does not include the FAC. The PLS-post information may have a variable size. Accordingly, the broadcast signal receiver may confirm the length of the FAC using the PLS-offset information included in the PLS-pre, and then immediately decode the PLS-post information without decoding the FAC. Thereafter, the broadcast signal receiver may decode the PLS-post information to acquire information about a DP since the PLS-post includes information about a DP as described above. That is, as shown in FIG. 49(b), the broadcast signal receiver may decode the DP data mapped onto symbol #2 of the N-th frame based on the acquired information about the DP, thereby acquiring a service corresponding to the DP data.

According to one embodiment of the present invention, the PLS-pre information and the PLS-post information may be mapped only onto the preamble symbol or the signaling symbol. However, in the case in which the FAC is positioned between the PLS-pre information and the PLS-post information as shown in FIGS. 49 and 50, the FAC may be mapped onto the preamble symbol or the signaling symbol.

As described above, since the PLS-post information has a variable size, the overall size of the PLS data is variable. Accordingly, in one embodiment of the present invention, the FAC is restricted to a fixed size to efficiently map the PLS data to the signaling symbol. In this case, the size of the FAC is restricted, but fast acquisition of the FAC may be enabled by the preamble decoding alone as the FAC is mapped to the signaling symbol.

The FAC having the fixed size is simply illustrative, and embodiments of the present invention are not limited thereto.

Figure 50:
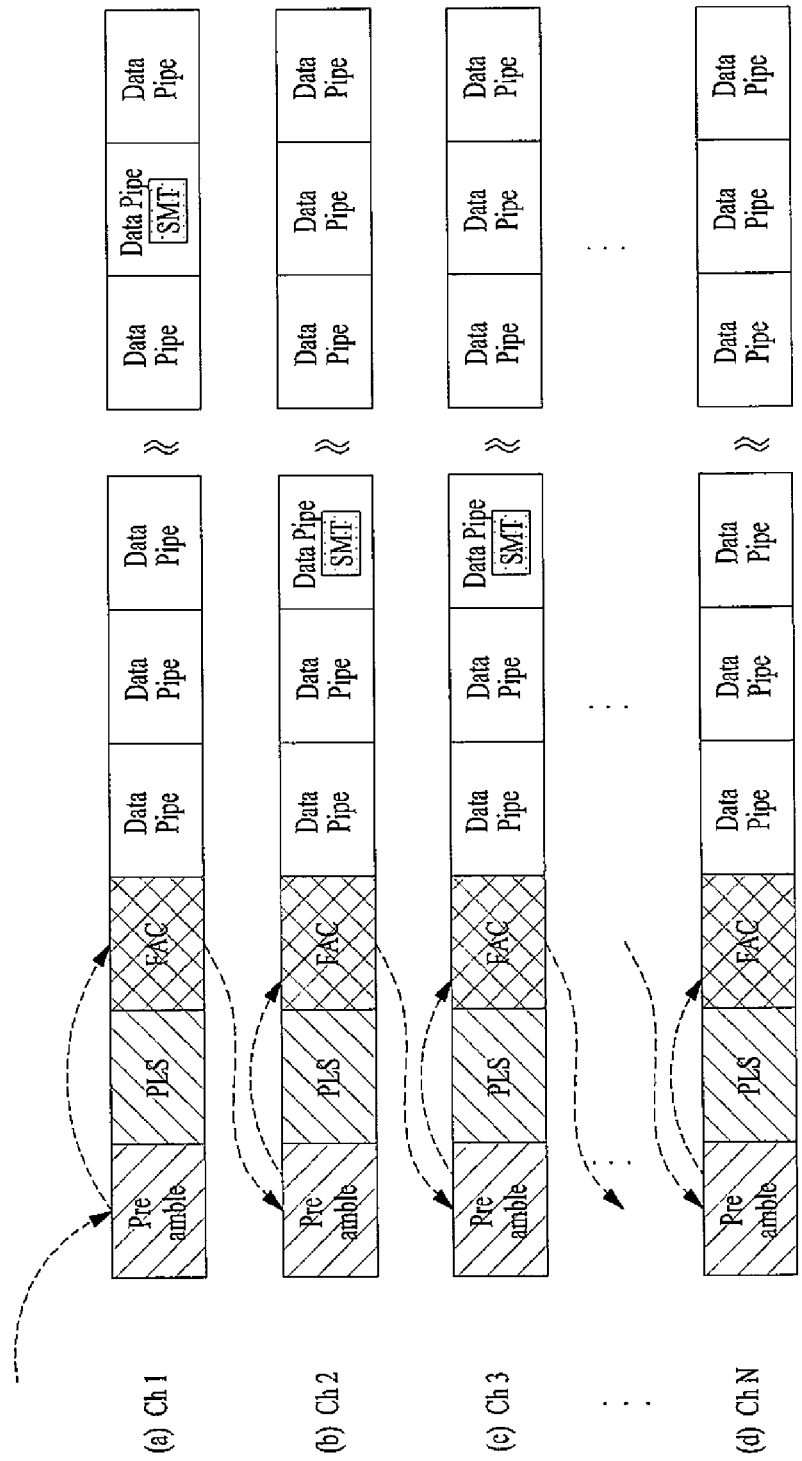
FIG. 50 illustrates a channel scanning operation of a broadcast signal receiver of one embodiment of the present invention which decodes the FAC data without decoding the PLS data when the broadcast signal receiver receives a signal frame including the FAC.

FIG. 50 illustrates a channel scanning operation of a broadcast signal receiver of one embodiment of the present invention which decodes the FAC data without decoding the PLS data when the broadcast signal receiver receives a signal frame including the FAC.

According to this embodiment, the broadcast signal receiver may perform the PLS data decoding and the FAC data decoding independently. A broadcast signal transmitter according to one embodiment of the present invention may insert the FAC between the PLS-pre and the PLS-post to allow the broadcast signal receiver to perform the PLS data decoding and the FAC data decoding independently.

The structure of a signal frame received over each channel is the same as that of the signal frame described above. DPs (indicated by Data Pipes in FIG. 50) mapped to a signal frame may represent DP data transmitted through each DP. The DP data transmitted through each DP may correspond to N-frame symbols #1, #2 and #3 described above. In this case, some DPs included in the data symbol region described above may transmit a service map table (SMT).

The SMT is a table including information indicating attributes of services mapped to a signal frame for a corresponding DP or service components. Accordingly, while the FAC includes information about services configuring a signal frame, the SMT may include fields such as service status, service protection indicator (SP_indicator), service category, essential_component_indicator indicating whether a component is an essential component, information for identifying a DP (DP_ID), which are information indicating attributes of the services.

According to one embodiment, the SMT may be transmitted through the preamble signaling region described above. In addition, the SMT may be transmitted through a specific DP. The specific DP may be the DP of a DP group (or DP cluster) which shall always be decoded in order for the receiver to play-out the service partially or fully, i.e. with part or all of the service components respectively. In this case, the specific DP may also transmit a network information table (NIT) as well as the SMT. The NIT according to an embodiment of the present invention may convey information relating to the physical organization of the multiplexes/TSs carried via a given network, and the characteristics of the network itself. The structure of a signal frame for transmitting the SMT and the NIT may be changed depending on the intention of the designer, rather than being limited to the illustrated embodiment.

In FIG. 50, for simplicity of illustration, the FAC included in the signal frame is mapped after the PLS-pre and the PLS-post, unlike the FAC described above, which has a fixed size in a signal frame and is mapped between the PLS-pre and the PLS-post. It should be noted that the illustrated signal frame including the FAC having a fixed size is for operation of the broadcast signal receiver.

The arrows shown in FIG. 50 represent a sequence of the overall channel scanning operation of the broadcast signal receiver.

Referring to FIG. 50(a), to implement fast channel scan, the broadcast signal receiver may decode the FAC immediately after decoding the preamble on channel 1 (indicated by Ch 1 in FIG. 50(a)). Thereby, the broadcast signal receiver may acquire information about the services configuring channel 1.

Thereafter, as shown in FIG. 50(b), the broadcast signal receiver may decode the FAC immediately after decoding the preamble on channel 2 (indicated by Ch 2 in FIG. 50(b)). Thereby, the broadcast signal receiver may acquire information about the services configuring channel 2.

Thereafter, as shown in FIG. 50(c), the broadcast signal receiver may decode the FAC immediately after decoding the preamble on channel 3 (indicated by Ch 3 in FIG. 50(c)). Thereby, the broadcast signal receiver may acquire information about the services configuring channel 3.

By repeating the above processes as above up to channel N (indicated by Ch N in FIG. 50(d)), the broadcast signal receiver may quickly acquire information about services configuring each of the entirety of the channels.

Figure 51:
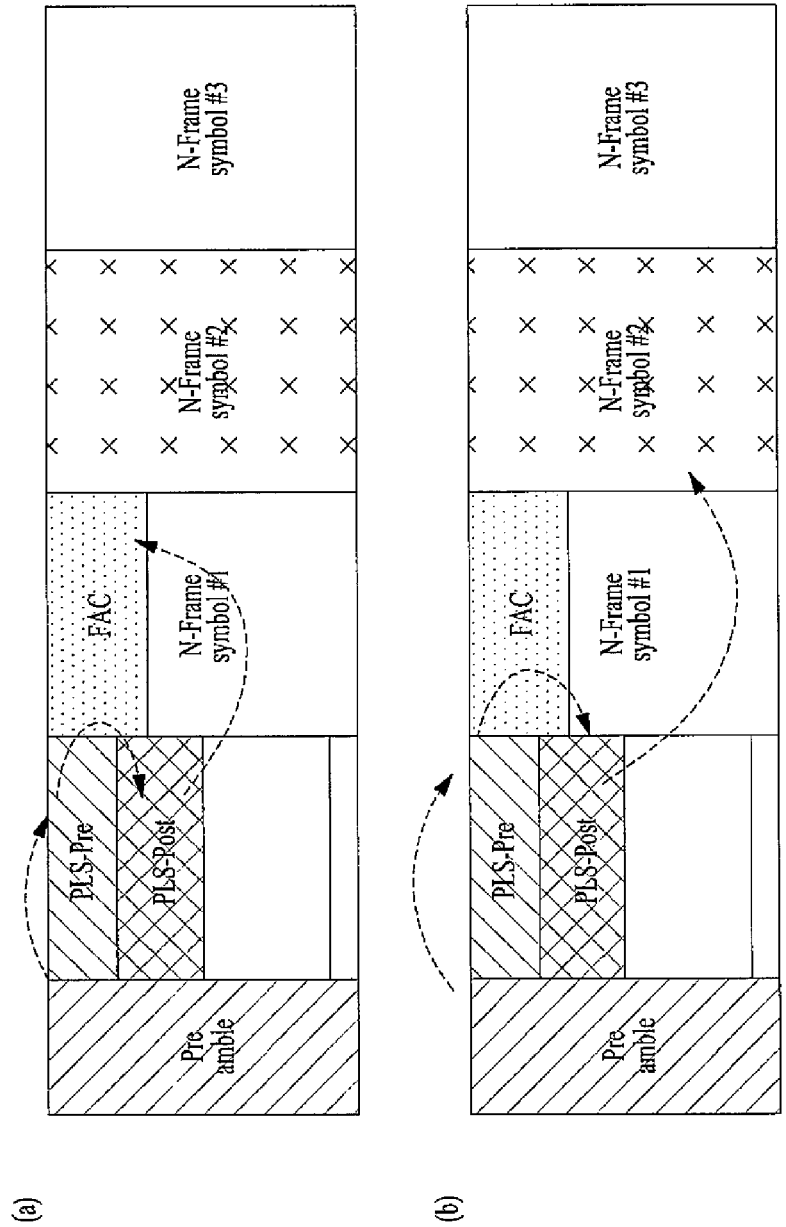
FIG. 51 illustrates operation of a broadcast signal receiver according to one embodiment of the present invention.

FIG. 51 illustrates operation of a broadcast signal receiver according to one embodiment of the present invention.

FIG. 51 illustrates the broadcast signal receiver of the broadcast signal receiver according to one embodiment which performs the FAC data decoding based on PLS data in the case in which the broadcast signal receiver receives a signal frame inducing a FAC. A broadcast signal transmitter according to one embodiment may build a signal frame including the FAC having a variable size. In this case, the broadcast signal transmitter may perform mapping of the PLS-pre information and the PLS-post information and then insert the FAC (or map), thereby generating a signal frame.

According to this embodiment, the signal frame may be continuously transmitted over one RF channel in the time axis, and FIG. 51 shows a signal frame transmitted for the N-th time (indicated by N-Frame). As described above, the preamble may be positioned at the foremost end of a signal frame, and the PLS-pre information, FAC, and PLS-post information may be subsequently mapped. Thereafter, data symbol #1 (indicated by symbol #1 in FIG. 49), data symbol #2 (indicated by symbol #2 in FIG. 49), and data symbol #3 (indicated by symbol #3 in FIG. 49) may be sequentially mapped.

FIG. 51(*a*) is a diagram illustrating a process in which a broadcast signal receiver according to one embodiment decodes the FAC data included in a signal frame.

FIG. 51(*b*) is a diagram illustrating a process in which the broadcast signal receiver according to one embodiment decodes the DP data included in the signal frame.

The arrows shown in the figures represent a sequence of specific operations of the broadcast signal receiver performed in the signal frame to acquire the FAC or DP data.

Referring to FIG. 51(*a*), according to this embodiment, the PLS-pre information included in the signal frame may have a fixed size and the size of the PLS-post information is variable. Accordingly, the broadcast signal receiver may detect the preamble and decode the PLS-pre information, thereby acquiring information for decoding the PLS-post information. The broadcast signal receiver may decode the PLS-post information using the decoded PLS-pre information.

The PLS-pre or PLS-post of the signal frame including the FAC having a variable size may information about the FAC (the size of the FAC, the type of modulation applied to the FAC, a code rate applied to the FAC, etc.).

Accordingly, the broadcast signal receiver having received a signal frame including the FAC having a variable size may sequentially decode the PLS-pre information and the PLS-post information, and then decode the FAC data.

Referring to FIG. 51(*b*), the DP data included in symbol #2 that the signal frame including the FAC having a variable size includes may be decoded through the following processes.

As described above, the broadcast signal receiver according to one embodiment may decode the PLS-pre information based on the information included in the preamble, thereby acquiring the information for decoding the PLS-post information. The broadcast signal receiver may decode PLS-post information based on the PLS-pre information. The PLS-post information may include information about DPs included in the signal frame. Accordingly, upon detecting a signal frame to which signal frame structure B is applied, the broadcast signal receiver may detect the preamble, and sequentially decode the PLS-pre information and the PLS-post information. Thereafter, the broadcast signal receiver may decode the DP data.

As described above, the broadcast signal receiver may decode the FAC data after decoding the preamble and PLS (including PLS-pre and PLS-post) information. This embodiment is the same as the previous embodiment in that the DP data is decoded after the preamble and the PLS (including PLS-pre and PLS-post) information is decoded.

As shown in FIG. 51, since the broadcast signal receiver cab acquire the FAC only after decoding both the PLS-pre information and the PLS-post information, FAC signaling may not be performed as quickly as in the case of the signal frame structure illustrated in FIG. 49. However, according to this embodiment, the PLS-pre information and the PLS-post information need to be mapped onto the preamble symbol, the FAC include various kinds of information enabling fast acquisition of services. Therefore, by mapping the FAC after the PLS-pre information and PLS-post information, this embodiment may have a higher degree of freedom in terms of the size of the FAC and the protection level. In addition, since the FAC can be mapped onto the preamble symbol, signaling symbol or data symbol region, the FAC may be flexibly designed. After the PLS data is mapped onto the preamble symbol or signaling symbol, the FAC may be continuously mapped onto the signal frame after the PLS data. In this case, the FAC may be mapped onto at least two regions from the preamble symbol region to the data symbol region.

While the FAC is illustrated as having a variable size in FIG. 51, embodiments of the present invention are not limited thereto.

Figure 52:
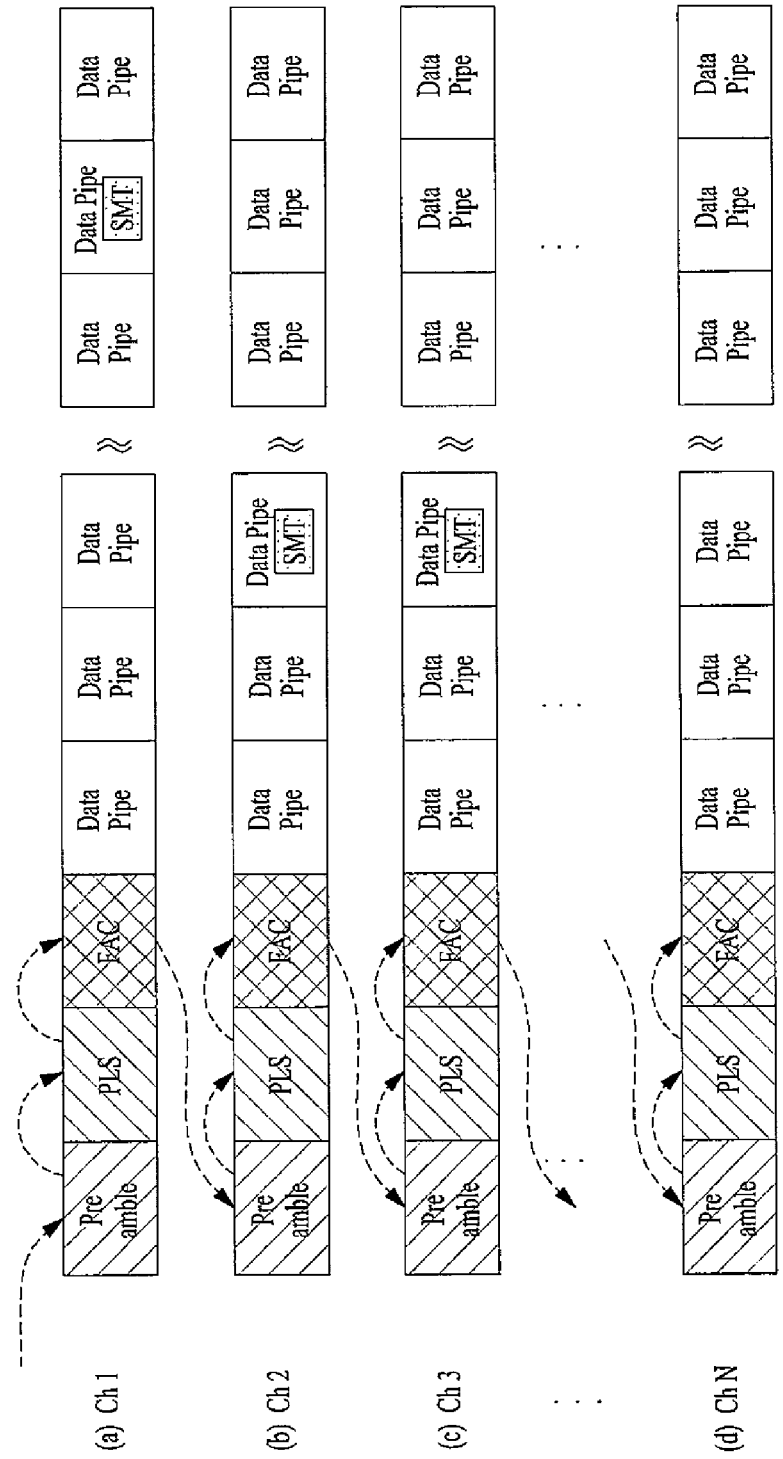
FIG. 52 illustrates a channel scanning mechanism of a broadcast signal receiver of one embodiment of the present invention which decodes the FAC data based on the PLS data when the broadcast signal receiver receives a signal frame including the FAC.

FIG. 52 illustrates a channel scanning mechanism of a broadcast signal receiver of one embodiment of the present invention which decodes the FAC data based on the PLS data when the broadcast signal receiver receives a signal frame including the FAC.

The arrows shown in FIG. 50 represent a sequence of the overall channel scanning operation of the broadcast signal receiver.

Referring to FIG. 52(*a*), to implement fast channel scan, the broadcast signal receiver may decode the PLS data after decoding the preamble on channel 1 (indicated by Ch 1 in FIG. 52(*a*)). Thereafter, the broadcast signal receiver may decode the FAC, thereby acquiring information about the services configuring channel 1.

Thereafter, as shown in FIG. 52(*b*), the broadcast signal receiver may decode the PLS data after decoding the preamble on channel 2 (indicated by Ch 2 in FIG. 52(*b*)). Thereafter, the broadcast signal receiver may decode the FAC, thereby acquiring information about the services configuring channel 2.

Thereafter, as shown in FIG. 52(*c*), the broadcast signal receiver may decode the PLS data after decoding the preamble on channel 3 (indicated by Ch 3 in FIG. 52(*c*)). Thereafter, the broadcast signal receiver may decode the FAC, thereby acquiring information about the services configuring channel 3.

By repeating the above processes as above up to channel N (indicated by Ch N in FIG. 52(*d*)), the broadcast signal receiver may quickly acquire information about services configuring each of the entirety of the channels.

In the embodiment illustrated in FIG. 52, the broadcast signal receiver may decode the FAC data after performing PLS data decoding. On the other hand, in the embodiment illustrated in FIG. 50, the broadcast signal receiver may decode the FAC data immediately after detecting the preamble without performing PLS data decoding.

FIG. 53 illustrates field information included in a FAC transmitted by a broadcast signal transmitter according to one embodiment of the present invention.

FIG. 53(*a*) shows a fast scan table including field information transmitted over the FAC.

FIG. 53(*b*) illustrates a component type table showing component types according to values of Component_type in the field information included in the FAC transmitted by a broadcast signal transmitter according to one embodiment.

The FAC may include information enabling connection between a logical channel and a physical channel so as to quickly acquire service configuration of a specific RF channel received by the broadcast signal receiver. That is, the broadcast signal receiver may acquire information about a specific RF channel and the services received over the specific RF channel from the information included in the FAC. The information about the specific RF channel and the services received over the specific RF channel may be referred to as channel information.

Referring to FIG. 53(a), details of the information included in the fast scan table transmitted on the FAC are as follows. The Num_Service field may indicate the total number of services included in a currently scanned RF channel. Thereby, information about the services may be included by the total number of the services indicated by the Num_Service field. The first "for" loop (for (i=0; i<Num_service; i++)) shown in FIG. 53(a) describes the field representing information about the services.

The Service_id field may indicate ID information for identifying a service. A broadcast signal receiver according to one embodiment may identify the services based on the Service_id field information.

The Section_DP_ID field may indicate a DP including section information (e.g., a service map table (SMT), a guide access table (GAT), etc.). According to one embodiment, the DP may transmit the section information along with or independently of a service or at least one service component. Accordingly, the broadcast signal receiver may identify a DP including the section information and quickly acquire the DP, using the Section_DP_ID field information.

The Num_Component field indicates the number of service components constituting the identified service.

The Reserved field is an undefined field for later use.

The second "for" loop (for (1=0; i<Num_component; i++)) shown in FIG. 53(a) includes information about components constituting each service.

The Component_type field may indicate the data type of a component. According to one embodiment, the component type may be any one of video, audio, section and NRT. Details of the information indicated by Component_type will be described later.

The DP_ID field may indicate an ID to identify a DP that transmits a corresponding service component.

The Reserved field is an undefined field for later use.

The CRC_32 field may indicate a value of a cyclic redundancy check result for a field transmitted over the FAC.

Hereinafter, details of the information indicated by Component_type transmitted over the FAC will be described with reference to FIG. 53(b).

If the value of the Component_type field is 0x00, the corresponding component may transmit service data. Similarly, if the value of the Component_type field is 0x01, video data may be transmitted. If the value is 0x02, audio data may be transmitted. If the value is 0x03, section data may be transmitted. If the value is 0x04, non-real time (NRT) data may be transmitted through the component. If the Component_type field has a value other than those values, the component type is undefined (reserved) for later use.

The bits may be allocated to each of the fields as show in the figure. The illustrated fields are simply illustrative, and the size and name of each field may be changed depending on the intention of the designer.

Figure 54:
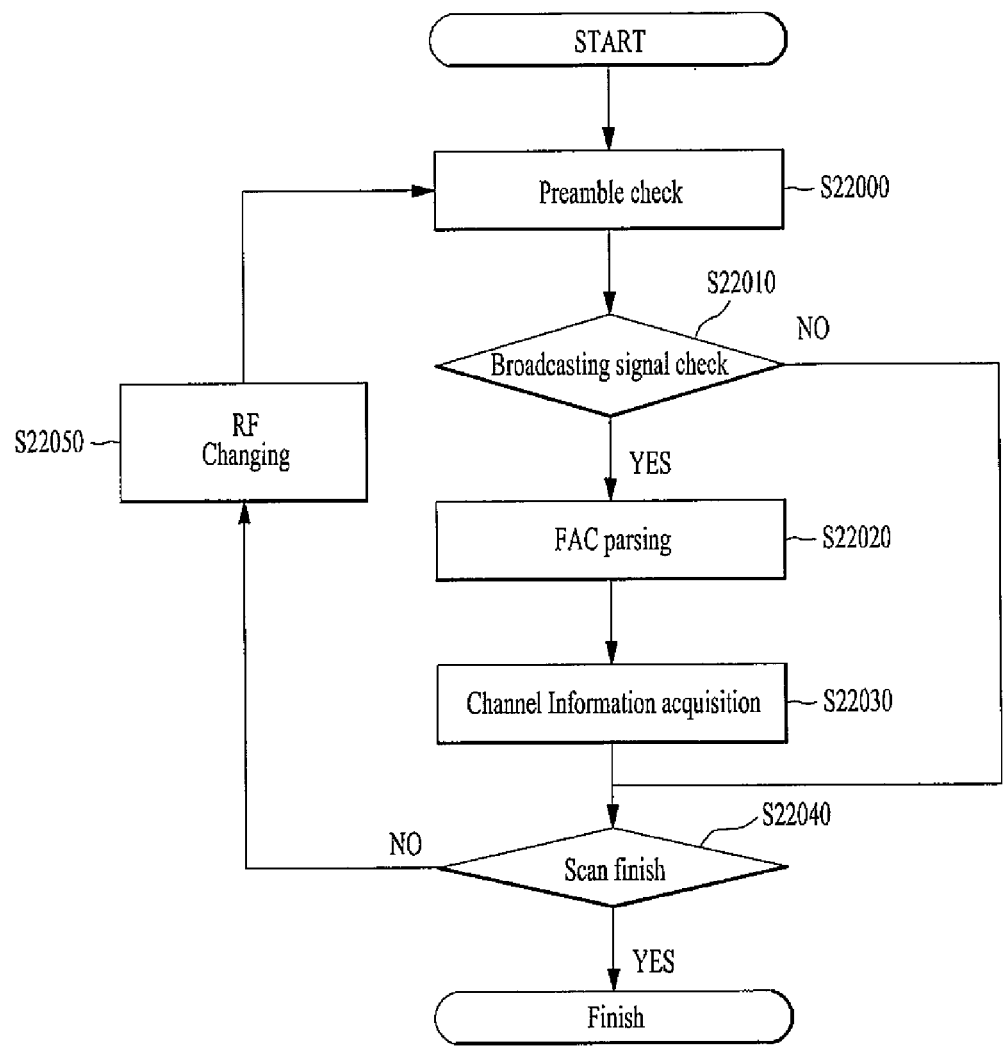
FIG. 54 shows a flowchart applicable to a case in which a broadcast signal receiver according to one embodiment of the present invention performs the fast channel scan.

FIG. 54 shows a flowchart applicable to a case in which a broadcast signal receiver according to one embodiment of the present invention performs the fast channel scan.

The broadcast signal receiver may decode a preamble included in a broadcast signal received over an RF channel (S22000). The preamble may contain information indicating whether the received broadcast signal is a broadcast signal of a next generation broadcasting system according to one embodiment of the present invention. The next generation broadcasting system may be an ATSC 3.0 system. The broadcast signal receiver checks whether the received broadcast signal is a broadcast signal of a next generation broadcasting system of one embodiment (S22010).

If the received signal is not a broadcast signal of the next generation broadcasting system, the broadcast signal receiver may finish channel scan. (S22040)

If the received signal is a broadcast signal of the next generation broadcasting system, the broadcast signal receiver may perform a process of acquiring the FAC from the signal frame. That is, the broadcast signal receiver may detect the preamble and decode FAC data according to the method in which the FAC channel is inserted in a broadcast signal frame. Alternatively, the broadcast signal receiver may detect the preamble and decode, decode PLS data, and then decode the FAC data according to the method in which the FAC channel is inserted in the broadcast signal frame (S22020).

The broadcast signal receiver may acquire connection information between a service constituting the broadcast signal and DP_ID, i.e., the channel information by decoding the FAC. (S22030)

Thereafter, the broadcast signal receiver may finish the channel scan (S22040).

In the case in which the broadcast signal receiver does not finish the channel scan, the broadcast signal receiver may repeat the processes (S22000 to S22040) of changing the RF (RF Changing) and scanning the changed RF channel (S22050).

Figure 55:
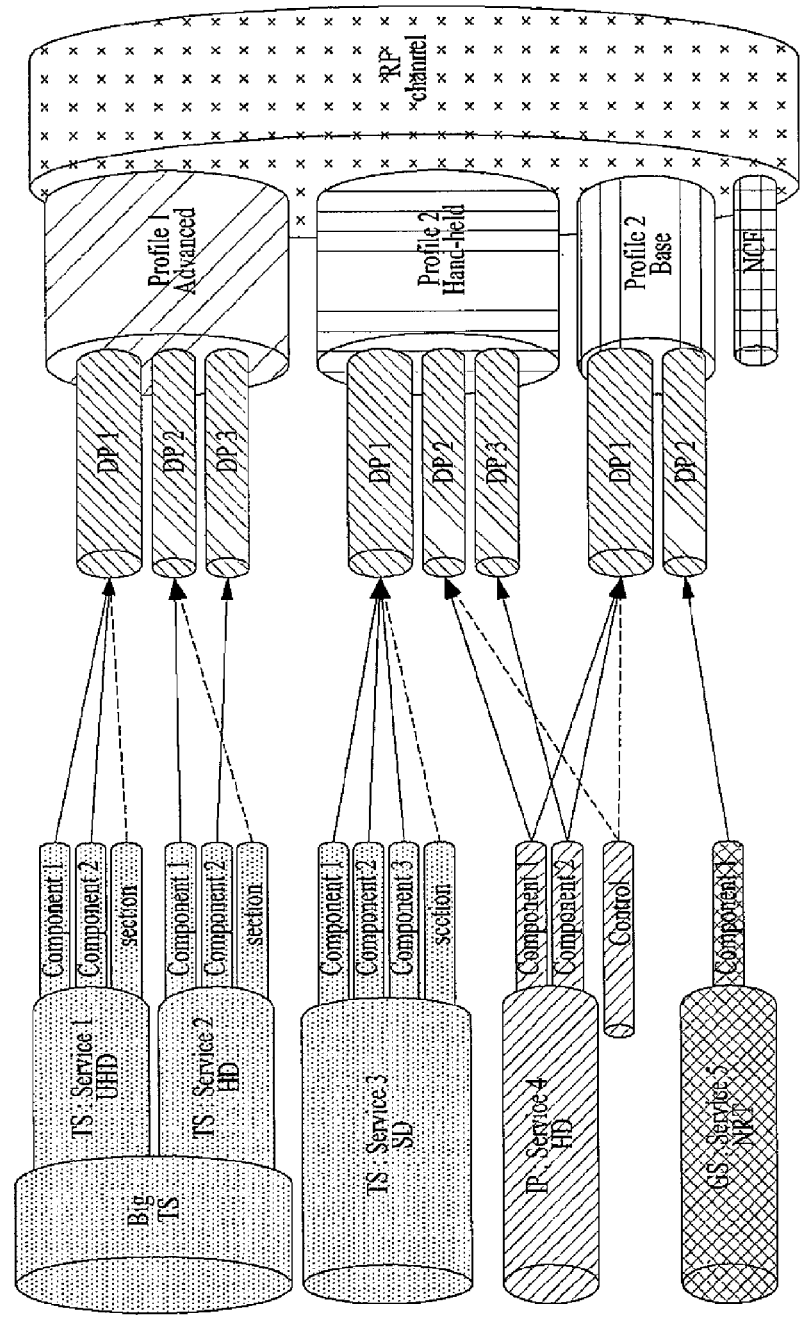
FIG. 55 is a conceptual diagram illustrating a relationship between an upper layer and a physical layer according to one embodiment of the present invention.

FIG. 55 is a conceptual diagram illustrating a relationship between an upper layer and a physical layer according to one embodiment of the present invention.

The illustrated embodiment may be an example of the relationship between a signal frame including the FAC illustrated in FIGS. 48 to 54 and an upper layer.

Specifically, FIG. 55 is a diagram each service corresponding to an upper layer and a DP of a physical layer on which the service is transmitted.

The input to the physical layer may be composed of one or multiple data streams. Each data stream is carried by one DP. A broadcast signal transmitter according to one embodiment splits the input TS, IP, GS streams into multiple service or service component (audio, video, etc.) streams. A data pipe is a logical channel in the physical layer that carries service data or related metadata, which may carry one or multiple service(s) or service component(s).

According to one embodiment, the DP may carry control data or section information. The control data may include information applicable in common to the DPs carrying service component data included in a service or sharable information. The section information may refer to tables such as the SMT and GAT including information relating to services or information itself, which may be changed depending on the intention of the designer.

Hereinafter, three physical layer profiles according to one embodiment of the present invention will be described.

The present invention may define three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

In this case, the base profile can be used as a profile for both the terrestrial broadcast service and the mobile broadcast service. That is, the base profile can be used to define a concept of a profile which includes the mobile profile. Also, the advanced profile can be divided into advanced profile for a base profile with MIMO and advanced profile for a handheld profile with MIMO. Moreover, the three profiles can be changed according to the intention of the designer.

According to one embodiment, the broadcast signal transmitter may transmit signal frames and non-compatible frames corresponding to the respective the three physical layer profiles over an RF channel (indicated by RF channel in FIG. 55). The NCF is a frame which can be used late for a new broadcasting system. The three types of signal frames transmitted over an RF channel may correspond to the advanced profile, handheld profile, and base profile as shown in FIG. 55. Each signal frame may include at least one DP data. As described above, one DP may carry one or more services or service components. Hereinafter, a structure in which a service to be transmitted over a DP is divided into service or service component units and transmitted will be described.

According to one embodiment, the broadcast signal transmitter may receive five services in the format of one of Big TS (Big Transport Stream), TS (Transport Stream), IP (Internet Protocol), and GS (General Stream). If a stream includes two or more TSs, it may be called Big TS.

A big transport stream (indicated by Big TS in FIG. 55) consists of two services. Service 1, which is an ultra high definition (UHD) service, consists of two service component data (Component 1 and Component 2) and one section data (section).

Service 2 is a high definition (HD) service. Similar to Service 1, Service 2 consists of two service component data (Component 1 and Component 2) and one section data (section).

TS consists of one service (Service 3). Service 3 is a standard definition (SD) service, and consists of three service component data (Component 1, Component 2, and Component 3) and one section data (section).

IP consists of one service (Service 4). Service 4 is a high definition (HD) service, consists of two service component data (Component 1 and Component 2).

GS consists of one service (Service 5). Service 5 is an NRT service, and consists of one service component data (Component 1).

As described above, each signal frame may include one or more DPs. A signal frame corresponding to the advanced profile may include three DPs (DP1, DP2, and DP3). A signal frame corresponding to the handheld profile may include three DPs (DP1, DP2, and DP3). A signal frame corresponding to the base profile may include two DPs (DP1 and DP2).

DP1 of the signal frame corresponding to the advanced profile may include Service 1 of Big TS.

DP2 of the signal frame corresponding to the advanced profile may include data of Component 1 and section data of Service 2 of Big TS.

DP3 of the signal frame corresponding to the advanced profile may include data of Component 2 of Service 2 of Big TS.

DP1 of the signal frame corresponding to the handheld profile may include Service 3 of TS. As described above, Service 3 consists of three service component data (Component 1, Component 2, and Component 3) and one section data (section).

DP2 of the signal frame corresponding to the handheld profile may include data of Component 1 of Service 4 of IP. DP2 of the signal frame corresponding to the handheld profile may further include Control data.

DP3 of the signal frame corresponding to the handheld profile may include data of Component 2 of Service 4 of IP.

DP1 of the signal frame corresponding to the base profile may include data of Component 1 and Component 2 of Service 4 of IP, and Control data.

DP2 of the signal frame corresponding to the base profile may include Service 5 of GS.

As described above, each of services (Service 1, Service 3, Service 5) may be transmitted over an corresponding one of the DPs, or each of services (Service 2, Service 4) may be divided according to service component data and transmitted over multiple DPs. In addition, one component data (Component 1 or Component 2 of Service 4) or control data may be transmitted over two or more DPs.

The illustrated conceptual diagram is simply illustrative, may be changed depending on the intention of the designer.

FIG. 56 shows an exemplary table of FAC field information in a case in which a broadcast signal transmitter according to one embodiment transmits signal frame having the signal frame structure described above over an RF channel.

FIG. 56 shows an example of the FAC field information illustrated in FIGS. 48 to 54 in the form of table.

Specifically, FIG. 56 shows FAC field information in the form of table in a case in which the signal frame conforms to the relationship between the upper layer and the physical layer according to the embodiment of FIG. 55.

According to one embodiment, the broadcast signal receiver may acquire information about services which may be transmitted over the respective DPs and component information through the table. The information about services may include DP information including a service, a service ID and section information. The component information may include component type and DP information carrying a corresponding component. Hereinafter, the table of FIG. 56 will be described.

The advanced profile may include the UHD service and the HD service. The service ID of the UHD service is 0x01, and the corresponding DP including the section information is DP1. The component type is AV (service), and may be transmitted over DP1.

The service ID of the HD service of the advanced profile is 0x02, and the corresponding DP including the section information is DP2. The component types constituting the HD service of the advanced profile are V (video) and A (audio). The component data having the component type of V may be transmitted over DP2, and the component data having the component type of A may be transmitted over DP3.

The handheld profile may include the SD service and the HD service. The service ID of the SD service is 0x03, and the corresponding DP including the section information is DP1. The component type constituting the SD service of the handheld profile is AV (service), and the corresponding data may be transmitted over DP1.

The service ID of the HD service of the handheld profile is 0x04, and the corresponding DP including the section information is DP2. The component types constituting the HD service of the handheld profile are V (video) and A (audio). The component data having the component type of V may be transmitted over DP2, and the component data having the component type of A may be transmitted over DP3.

The base profile may include the HD service and the NRT service. The service ID of the HD service of the base profile is 0x04, and the corresponding DP including the section information is DP1. The component type constituting the HD service of the base profile is AV (service), and the corresponding data may be transmitted over DP1.

The service ID of the NRT service of the base profile is 0x05, and the corresponding DP including the section information is DP2. The component type constituting the NRT service of the base profile is NRT, and the corresponding data may be transmitted over DP2.

Figure 57:
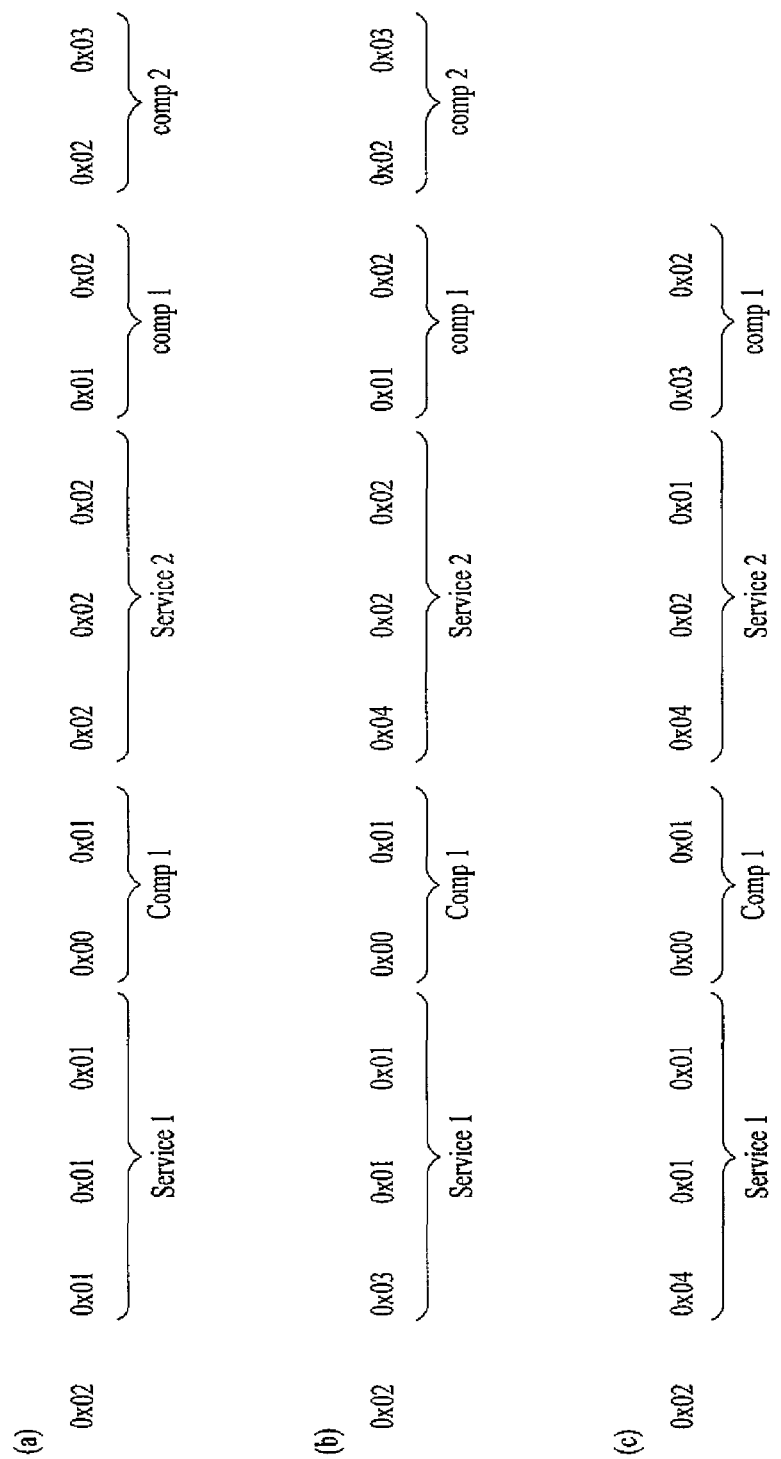
FIG. 57 shows an example of FAC field data that is actually transmitted in the case in which a broadcast signal transmitter according to one embodiment transmits a signal frame having the signal frame structure described above over an RF channel.

FIG. 57 shows an example of FAC field data that is actually transmitted in the case in which a broadcast signal transmitter according to one embodiment transmits a signal frame having the signal frame structure described above over an RF channel.

FIG. 57 shows an example of the actually transmitted FAC field data of the FAC field illustrated in FIGS. 48 to 54.

Specifically, FIG. 57 illustrates an example of FAC field data in a case in which the signal frame conforms to the relationship between the upper layer and the physical layer according to the embodiment of FIG. 55.

According to one embodiment, the broadcast signal transmitter may generate FAC field data shown in FIG. 57 and transmit the same along with a signal frame.

FIG. 57(a) shows specific values of FAC field data of the advanced profile.

FIG. 57(b) shows specific values of FAC field data of the handheld profile.

FIG. 57(c) shows specific values of FAC field data of the base profile.

Each profile transmitted over the RF channel described above may carry two services. Therefore, FAC field (Num_Service) data indicating the number of services of the respective profiles may all have the value of 0x02. Hereinafter, a field indicating the service information and a field indicating the component information will be described for each profile.

Referring to FIG. 57(a), the advanced profile may include two services, each of which may include at least one component, as described above. As described above, the field indicating the service information may include a service ID, a section DP ID, and data of the number of component types (Num_Component) that a service includes. Accordingly, Service 1 (0x01 0x01 0x01) may indicate that Service_ID is 0x01, Section_DP_ID is 0x01, Num_Component is 0x01, i.e. a case in which there is one component type.

Subsequently, comp 1 (0x00 0x01) may indicate a service (0x00) and a DP (0x01, i.e., DP1) over which a corresponding component is transmitted. The data of the component type has been described above.

Similarly, Service 2 may indicate that Service_ID is 0x02, Section_DP_ID is 0x02, and Num_Component is 0x02, i.e., a case in which there are two component types. Accordingly, the data field of each of comp 1 and comp 2 may indicate the type of a corresponding component and a DP over which the component type is transmitted. A video component (0x01) may be transmitted over DP2 (0x02), and an audio component (0x02) may be transmitted over DP3 (0x03).

Referring to FIG. 57(b), the handheld profile may include two services, each of which may include at least one component. As described above, the field indicating the service information may include a service ID, a section DP ID, and data of the number of component types (Num_Component) that a service includes. Accordingly, Service 1 (0x03 0x01 0x01) may indicate that Service_ID is 0x03, Section_DP_ID is 0x01, and Num_Component is 0x01, i.e. a case in which there is one component type.

Subsequently, comp 1 (0x00 0x01) may indicate a service (0x00) and a DP (0x01, i.e., DP1) over which a corresponding component is transmitted. The data of the component type has been described above.

Similarly, Service 2 may indicate that Service_ID is 0x04, Section_DP_ID is 0x02, and Num_Component is 0x02, i.e., a case in which there are two component types. Accordingly, the data field of each of comp 1 and comp 2 may indicate the type of a corresponding component and a DP over which the component type is transmitted. A video component (0x01) may be transmitted over DP2 (0x02), and an audio component (0x02) may be transmitted over DP3 (0x03).

Referring to FIG. 57(c), the base profile may include two services, each of which may include at least one component. As described above, the field indicating the service information may include service ID, section DP ID, a service ID, a section DP ID, and data of the number of component types (Num_Component) that a service includes. Accordingly, Service 1 (0x04 0x01 0x01) may indicate that Service_ID is 0x04, Section_DP_ID is 0x01, and Num_Component is 0x01, i.e., a case in which there is one component type.

Subsequently, comp 1 (0x00 0x01) may indicate a service (0x00) and a DP (0x01, i.e., DP1) over which a corresponding component is transmitted. The data of the component type has been described above.

Similarly, Service 2 may indicate that Service_ID is 0x04, Section_DP_ID is 0x02, and Num_Component is 0x01, i.e., a case in which there is one component types. Similarly, comp 1 (0x03 0x02) may indicate a section (0x03) and a DP (0x02, i.e., DP2) over which a corresponding component is transmitted.

Figure 58:
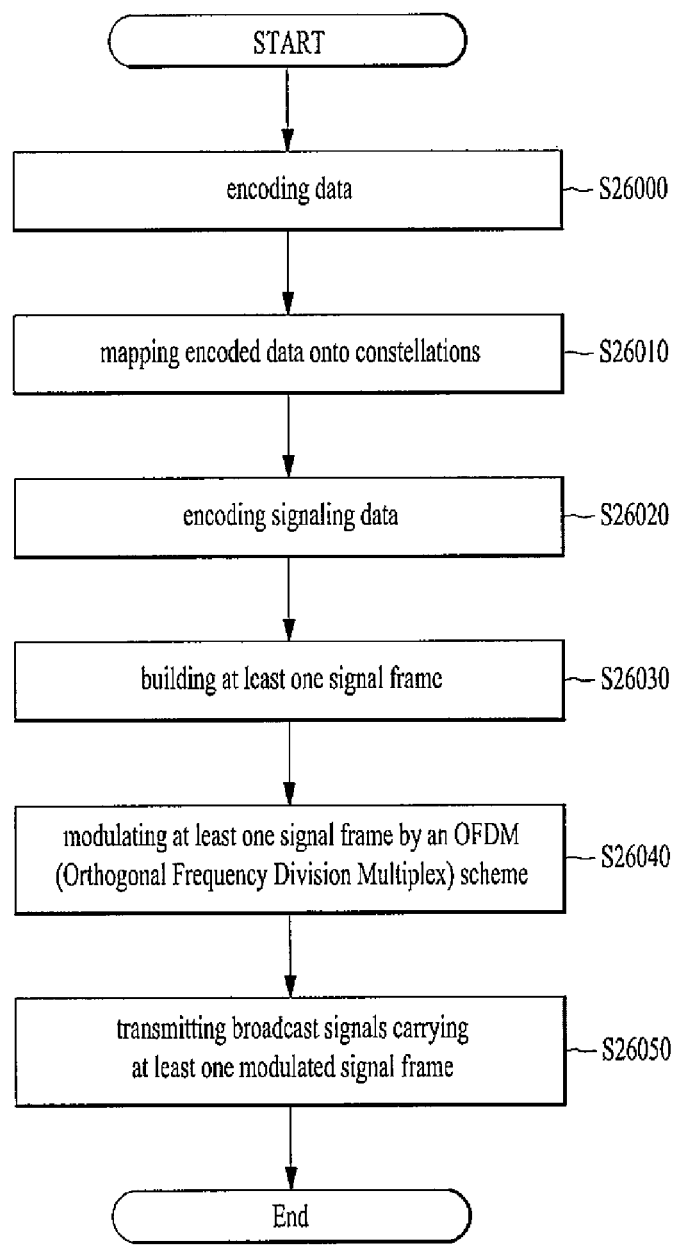
FIG. 58 is a flowchart illustrating a method for transmitting a broadcast signal according to one embodiment of the present invention.

FIG. 58 is a flowchart illustrating a method for transmitting a broadcast signal according to one embodiment of the present invention.

According to one embodiment, a broadcast signal transmitter may encode data (or service data) carrying at least one broadcast service component (S26000). The data may be processed for each DP corresponding to the data as described above. Data encoding may be performed by the coding & modulation module 1100.

Thereafter, the broadcast signal transmitter may map the encoded data (or service data) onto constellations (S26010). Data mapping may be performed by the coding & modulation module 1100.

Thereafter, the broadcast signal transmitter may encode signaling data (or physical signaling data) (S26020). According to one embodiment, the signaling data may include information relating to FAC. The signaling data may include PLS-pre information and PLS-post information, and the information relating to the FAC may be included in the PLS-post information. The information relating to the FAC may include information about the length of the FAC and information indicating whether a signal frame includes the FAC. Signaling data encoding may be performed by the signaling generation module 1400.

Thereafter, the broadcast signal transmitter may build at least one signal frame (S26030). According to one embodiment, the signal frame may include preamble data, signaling data and service data. The signal frame may include a FAC. For a broadcast signal receiver according to one embodiment, the function of the FAC and the information that the FAC can include are the same as described above. Building the signal frame may be performed by the frame structure module 1200.

Thereafter, the broadcast signal transmitter may modulate the at least one built signal frame in the OFDM scheme (S26040). The OFDM modulation of the signal frame may be performed by the waveform generation module 1300.

Thereafter, the broadcast signal transmitter may transmit at least one broadcast signal including the at least one built and modulated signal frame (26050).

Figure 59:
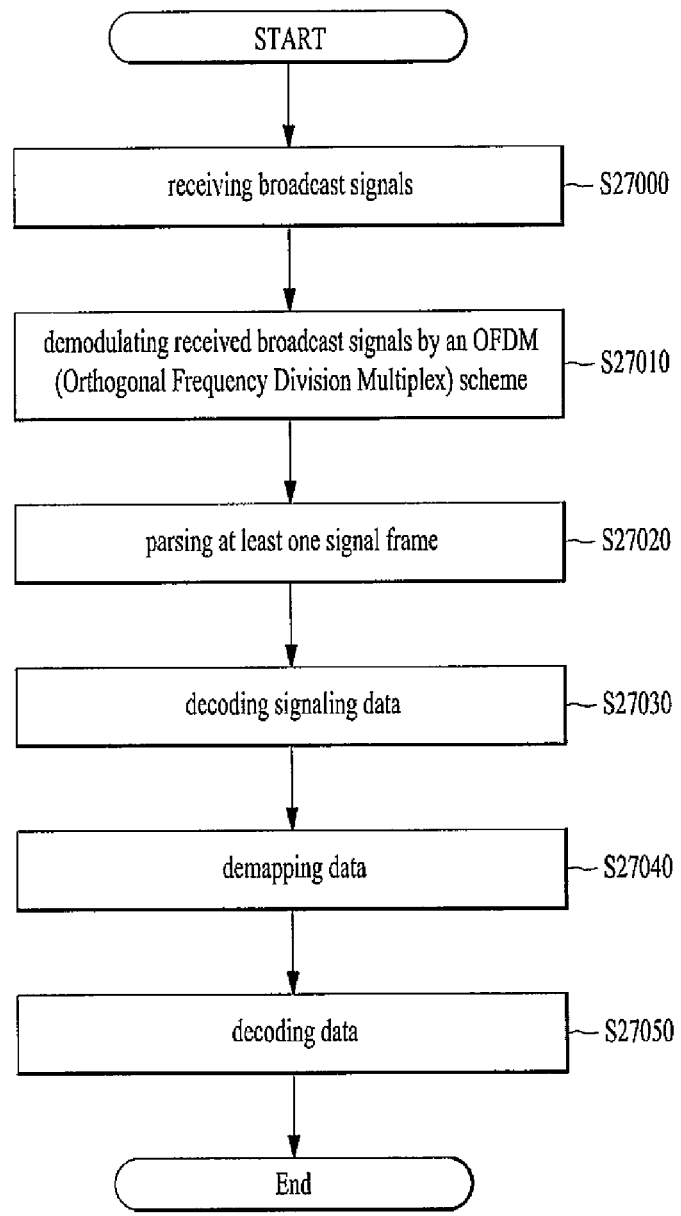
FIG. 59 is a flowchart illustrating a method for receiving a broadcast signal according to one embodiment of the present invention.

FIG. 59 is a flowchart illustrating a method for receiving a broadcast signal according to one embodiment of the present invention.

The method illustrated in FIG. 59 corresponds to the reverse processes of the method for transmitting a broadcast signal illustrated in FIG. 58.

According to one embodiment, a broadcast signal receiver may receive at least one broadcast signal (S27000). The broadcast signal may include a FAC. As described above, the broadcast signal receiver having received a plurality of broadcast signals including the FAC may further detect a preamble, quickly scan a plurality of channels, and acquire the service information included in each of the channels.

Thereafter, the broadcast signal receiver may demodulate the at least one received broadcast signal in the OFDM scheme (S27010). Demodulation of the broadcast signal may be performed by the synchronization & demodulation module 8000.

Thereafter, the broadcast signal receiver may separate at least one signal frame from the demodulated broadcast signal (S27020). Separation of the signal frame may be performed by the frame parsing module 8100.

Thereafter, the broadcast signal receiver may decode the signaling data (or physical signaling data) included in the at least one signal frame (S27030). According to one embodiment, the signaling data may include information relating to the FAC. The information relating to the FAC may include information about the length of the FAC. Decoding of the signaling data may be performed by the signaling decoding module 8400. Decoding of the FAC data may also be performed by the signaling decoding module 8400.

As illustrated in FIGS. 49 and 50, the broadcast signal receiver may perform FAC data decoding immediately after detecting the preamble.

Alternatively, as illustrated in FIGS. 51 and 52, the broadcast signal receiver may perform FAC data decoding after detecting the preamble and then decoding the PLS data.

Thereafter, the broadcast signal receiver may demap the data (or service data) included in the at least one signal frame (S27040). Demapping of the data may be performed by the demapping & decoding module 8200.

Thereafter, the broadcast signal receiver may decode service data carrying at least one broadcast service component (S27050). Decoding of the data may be performed by the demapping & decoding module 8200.

MODE FOR INVENTION

Various embodiments have been described in the best mode for carrying out the invention.

INDUSTRIAL APPLICABILITY

As described above, embodiments of the present invention can be totally or partially applied to the digital broadcast system.

The invention claimed is:

1. A method of transmitting broadcast data, the method comprising:
encoding transmission units for forward error correction, wherein the transmission units which carry a service or service component of the broadcast data; mapping the encoded transmission units on constellations; time-interleaving the mapped transmission units;
building signal frames including the time-interleaved transmission units; modulating the signal frames by Orthogonal Frequency Division Multiplexing, OF scheme; and
transmitting the modulated signal frames, wherein the transmitted signal frames include preambles, the preambles having physical signaling data for the transmission units, wherein the physical signaling data includes information indicating whether or not service information for fast service acquisition exists in a signal frame, and the service information allows receivers to quickly locate upper layer signaling information,
wherein a preamble of the preambles further includes a first preamble symbol and a second preamble symbol, and
wherein the first and second symbols include different sequences in a time domain,
wherein the first preamble symbol includes a suffix in the time domain which is obtained from a part of the first preamble symbol based on a frequency shifting method, and
wherein the second preamble symbol includes a prefix in the time domain which is obtained from a part of the second preamble symbol based on a frequency shifting method.

2. The method of claim 1, wherein the preambles include a normal preamble part or robust preamble part, wherein the normal preamble part and the robust preamble part are used for different reception modes, respectively.

3. The method of claim 2, wherein the robust preamble part is used for mobile reception.

4. The method of claim 1, the method further comprising:
Multi-Input Multi-Output (MIMO) encoding the mapped transmission units.

5. A method of receiving broadcast data, the method comprising:
receiving signal frames via broadcast signals, wherein signal frames includes preambles and transmission units, wherein the preambles includes physical signaling data for the transmission units, and wherein the transmission units which early a service or service component of the broadcast data;
demodulating the received signal frames by Orthogonal Frequency Division Multiplexing, OFDM scheme;
parsing the demodulated signal frames;
time de-interleaving the transmission units in the parsed signal frames; de-mapping the time-de-interleaved transmission units; and decoding the de-mapped transmission units using forward error correction, the physical signaling data includes information indicating whether or not service information for fast service acquisition exists in a signal frame, and the service information allows receivers to quickly locate upper layer signaling information,
wherein a preamble of the preambles further includes a first preamble symbol and a second preamble symbol,
wherein the first and second preamble symbols include different sequences in a time domain,
wherein the first preamble symbol includes a suffix in the time domain which is obtained from a part of the first preamble symbol based on a frequency shifting method and,
wherein the second preamble symbol includes a prefix in the time domain which is obtained from a part of the second preamble symbol based on a frequency shifting method.

6. The method of claim 5, wherein the preambles include a normal preamble part or robust preamble part, wherein the normal preamble part and the robust preamble part are used for different reception modes, respectively.

7. The method of claim 6, wherein the robust preamble part is used for mobile reception.

8. The method of claim 5, the method further comprising:
Multi-Input Multi-Output (MIMO) decoding the time-de-interleaved transmission units.

* * * * *